US008567899B2

(12) United States Patent
Rosati et al.

(10) Patent No.: US 8,567,899 B2
(45) Date of Patent: Oct. 29, 2013

(54) PRINTING SYSTEM WITH INDEPENDENTLY OPERABLE PRINTHEAD SERVICE MODULES

(75) Inventors: Robert Rosati, San Diego, CA (US); David Petch, San Diego, CA (US); David Burney, San Diego, CA (US); Jim Sykora, San Diego, CA (US); Kenneth A Regas, San Diego, CA (US); Andy Bound, San Diego, CA (US); Neil Doherty, San Diego, CA (US); Scott Dennis, San Diego, CA (US); Ben Jones, San Diego, CA (US); Oksana Buyda, San Diego, CA (US); Locson Tonthat, San Diego, CA (US); Andrew Buyda, San Diego, CA (US); Patrick Kirk, San Diego, CA (US); Loren Hunt, San Diego, CA (US); Jason Dewey, San Diego, CA (US); Jim Trinchera, San Diego, CA (US); Bill Cressman, San Diego, CA (US); Ron Zech, San Diego, CA (US)

(73) Assignee: Zamtec Ltd, Dublin (IE)

( * ) Notice: Subject to any disclaimer, the term of this patent is extended or adjusted under 35 U.S.C. 154(b) by 342 days.

(21) Appl. No.: 12/845,730

(22) Filed: Jul. 29, 2010

(65) Prior Publication Data

US 2011/0025754 A1 Feb. 3, 2011

Related U.S. Application Data

(60) Provisional application No. 61/230,110, filed on Jul. 31, 2009.

(51) Int. Cl.
*B41J 2/165* (2006.01)
*G01D 15/20* (2006.01)

(52) U.S. Cl.
USPC .......................................... 347/29; 346/134

(58) Field of Classification Search
None
See application file for complete search history.

(56) References Cited

U.S. PATENT DOCUMENTS

| | | | | |
|---|---|---|---|---|
| 4,933,684 A | | 6/1990 | Tasaki et al. | |
| 5,065,170 A | | 11/1991 | Rezanka et al. | |
| 5,124,728 A | | 6/1992 | Denda | |
| 5,216,442 A | * | 6/1993 | Parks et al. | 346/134 |
| 5,297,017 A | | 3/1994 | Haselby et al. | |
| 5,500,659 A | * | 3/1996 | Curran et al. | 347/28 |
| 5,717,446 A | | 2/1998 | Teumer et al. | |
| 5,757,398 A | * | 5/1998 | Anderson | 347/32 |
| 5,992,994 A | | 11/1999 | Rasmussen | |
| 6,154,240 A | | 11/2000 | Hickman | |
| 6,168,333 B1 | | 1/2001 | Merz et al. | |

(Continued)

FOREIGN PATENT DOCUMENTS

JP 08336984 12/1996

OTHER PUBLICATIONS

Cited in NonFinal Office Action, U.S. Appl. No. 12/845,762 dated Aug. 21, 2012.

*Primary Examiner* — Stephen Meier
*Assistant Examiner* — Alexander C Witkowski
(74) *Attorney, Agent, or Firm* — Cooley LLP

(57) ABSTRACT

A printing system that has a printhead assembly for printing media fed along a media path and a plurality of service modules for the printhead assembly. Each of the service modules is configured to operate in a plurality of different modes and each of the service modules are independently operable.

11 Claims, 39 Drawing Sheets

(56) References Cited

U.S. PATENT DOCUMENTS

| | | | | |
|---|---|---|---|---|
| 6,179,419 | B1 | 1/2001 | Rasmussen | |
| 6,189,995 | B1 | 2/2001 | Canfield et al. | |
| 6,270,183 | B1 * | 8/2001 | Gaarder | 347/29 |
| 6,318,854 | B1 | 11/2001 | Rasmussen | |
| 6,328,439 | B1 | 12/2001 | Rhodes | |
| 6,328,491 | B1 | 12/2001 | Beehler et al. | |
| 6,373,514 | B1 | 4/2002 | Nakatani | |
| 6,435,641 | B1 | 8/2002 | Tung et al. | |
| 6,572,294 | B2 | 6/2003 | Beehler et al. | |
| 6,592,200 | B2 * | 7/2003 | Wotton et al. | 347/22 |
| 6,672,706 | B2 | 1/2004 | Silverbrook | |
| 6,672,720 | B2 | 1/2004 | Smith | |
| 6,679,602 | B1 | 1/2004 | Bruhn | |
| 6,698,878 | B1 | 3/2004 | Roche et al. | |
| 6,874,864 | B1 | 4/2005 | Maeda et al. | |
| 7,145,588 | B2 | 12/2006 | Hawver | |
| 7,334,860 | B2 | 2/2008 | Mitsunaga | |
| 7,334,862 | B2 | 2/2008 | Kachi | |
| 2001/0021333 | A1 | 9/2001 | Fujioka et al. | |
| 2002/0097311 | A1 | 7/2002 | Hinojosa | |
| 2002/0180828 | A1 | 12/2002 | Webster et al. | |
| 2003/0007023 | A1 | 1/2003 | Barclay et al. | |
| 2003/0128253 | A1 | 7/2003 | Kitahara et al. | |
| 2004/0085425 | A1 | 5/2004 | Lewis | |
| 2004/0095450 | A1 | 5/2004 | Roche et al. | |
| 2004/0160472 | A1 * | 8/2004 | Khalid et al. | 347/22 |
| 2004/0263556 | A1 | 12/2004 | Urrutia et al. | |
| 2005/0057591 | A1 | 3/2005 | Konno | |
| 2005/0062776 | A1 | 3/2005 | Kojima | |
| 2005/0093954 | A1 | 5/2005 | Matsuo et al. | |
| 2005/0162452 | A1 | 7/2005 | Kachi | |
| 2005/0219315 | A1 | 10/2005 | Hori | |
| 2006/0012631 | A1 | 1/2006 | Niekawa | |
| 2006/0071954 | A1 | 4/2006 | Morooka et al. | |
| 2006/0092243 | A1 | 5/2006 | Langford et al. | |
| 2006/0119655 | A1 | 6/2006 | Berry et al. | |
| 2006/0170751 | A1 | 8/2006 | Yokoyama et al. | |
| 2007/0008394 | A1 | 1/2007 | Mashima | |
| 2007/0035605 | A1 | 2/2007 | Kitahara | |
| 2007/0206073 | A1 | 9/2007 | Dyer et al. | |
| 2007/0247505 | A1 | 10/2007 | Isowa et al. | |
| 2007/0268355 | A1 | 11/2007 | Sato | |
| 2008/0018691 | A1 | 1/2008 | Koase | |
| 2008/0218576 | A1 | 9/2008 | Phillips et al. | |
| 2008/0309702 | A1 | 12/2008 | Takahashi | |
| 2009/0073221 | A1 | 3/2009 | Yoda et al. | |
| 2009/0091594 | A1 | 4/2009 | Hirayama et al. | |
| 2009/0189967 | A1 | 7/2009 | Sakano | |
| 2009/0195583 | A1 | 8/2009 | Nishiyama | |
| 2009/0251507 | A1 | 10/2009 | Lai et al. | |
| 2011/0025766 | A1 | 2/2011 | Rosati et al. | |

* cited by examiner

PRINTING SYSTEM WITH INDEPENDENTLY OPERABLE PRINTHEAD SERVICE MODULES

FIELD OF THE INVENTION

The invention relates to inkjet printing and in particular, wide format printing systems.

BACKGROUND OF THE INVENTION

Inkjet printing is well suited to the SOHO (small office, home office) printer market. Each printed pixel is derived from one or more ink nozzles on a printhead. This form of printing is inexpensive, versatile and hence increasingly popular. The ejection of ink can be continuous (see U.S. Pat. No. 3,596,275 by Sweet) or the more predominant 'drop-on-demand' type in which each nozzle ejects a drop of ink as it passes across a media substrate location requiring a drop of ink. Drop on demand printheads typically have an actuator corresponding to each nozzle for ejecting ink. The actuators can be piezoelectric such as that disclosed by Kyser et al in U.S. Pat. No. 3,946,398. However, recently electro-thermally actuated printheads have become most prevalent in the field of inkjet printing. Electro-thermal actuators are favored by manufacturers such as Canon and Hewlett Packard. Vaught et al in U.S. Pat. No. 4,490,728 discloses the basic operation of this type of actuator within an inkjet printhead.

Wide format printing is another market in which inkjet use is expanding. 'Wide format' can refer to any printer with a print width greater than 17" (438.1 mm). However, most commercially available wide format printers have print widths in the range 36" (914 mm) to 54" (1372 mm). Unfortunately, wide format printers are excessively slow as the printhead prints in a series of transverse swathes across the page. To overcome this, there have been attempts to design printers that can print the entire width of the page simultaneously. Examples of known pagewidth thermal inkjet printers are described in U.S. Pat. No. 5,218,754 to Rangappan and U.S. Pat. No. 5,367,326 to Pond et al. A pagewidth printhead does not traverse back and forth across the page and thereby significantly increases printing speeds. However, proposals for a pagewidth printhead assembly have not become commercially successful because of the functional limitations imposed by standard printhead technology. A 600 dpi thermal bubble jet printhead configured to extend the entire width of a 1372 mm (54 inch) wide standard roll of paper would require 136,000 inkjet nozzles and would generate 24 kilowatts of heat during operation. This is roughly equivalent to the heat produced by 24 domestic bar heaters and would need to be actively cooled using a heat exchange system such as forced air or water cooling. This is impractical for most domestic and commercial environments, as the cooling system for the printer would probably require some type of external venting. Without external venting, the room housing the printer is likely to over heat.

As can be seen from the foregoing, many different types of printing technologies are available. Ideally, a printing technology should have a number of desirable attributes. These include inexpensive construction and operation, high speed operation, safe and continuous long term operation etc. Each technology may have its own advantages and disadvantages in the areas of cost, speed, quality, reliability, power usage, simplicity of construction operation, durability and consumables. Some of the perennial problems and ongoing design imperatives are addressed or ameliorated by aspects of the present invention. These design issues are discussed below.

1. Media Feed

Most inkjet printers have a scanning printhead that reciprocates across the printing width as the media incrementally advances along the media feed path. This allows a compact and low cost printer arrangement. However, scanning printhead based printing systems are mechanically complex and slow to maintain accurate control of the scanning motion. Time delays are also due to the incremental stopping and starting of the media with each scan. Pagewidth printheads resolve this issue by providing a fixed printhead spanning the media. Such printers are high performance but the large array of inkjet nozzles is difficult to maintain. For example wiping, capping and blotting become exceptionally difficult when the array of nozzle is as long as the media is wide. The maintenance stations typically need to be located offset from the printheads. This adds size to the printer and the complexity of translating the printheads or servicing elements in order to perform printhead maintenance. There is a need to have a page wide solution that is simpler and more compact.

2. Media Feed Encoder

Similarly, precise control of media feed is essential for print quality. The advance of media sheets past the printhead is traditionally achieved with spike wheel and roller pairs in the media feed path. Typically a spike wheel and roller monitors a sheet upstream of the printhead and another spike wheel and roller is downstream of the printhead so that the trailing edge of the sheet is printed correctly. These spike wheels can not be incorporated into any drive rollers and so add considerable bulk to the printing mechanism.

3. Printer Operation

The gap between the ink ejection nozzles and the media surface needs to remain constant in order to maintain print quantity. Precise control of media sheets as they pass the printhead is crucial. Any media buckling or lack of positional control of the leading or trailing edges within the print zone can result in visible artifacts.

4. Service Modules

Maintaining printheads (i.e. routine wiping, capping and blotting etc) requires maintenance stations that add bulk and complexity to printers. For example, scanning printhead service modules are typically located to one side of the media feed path and laterally offset from the printheads. This adds lateral size to the printer and the complexity of translating the printheads to the service modules in order to perform maintenance. Often the printheads move to these service modules when not printing. When each printhead returns to its operative position, its alignment with the other printheads is prone to drift until eventually visible artifacts demand realignment of all the printheads. In other cases, the service modules translate from the sides to service the printheads while the printheads are raised sufficiently above the media. Both of these system designs suffer from drawbacks of large printer width dimensions, complicated design and control, and difficulty in maintaining printhead alignment.

5. Aerosol Removal

Aerosol generation refers to the unintentional generation of ink drops that are small enough to be air borne particulates. Aerosols increase as the system speed and resolution increases. As the resolution increases, the drop volumes are reduced and more prone to becoming aerosol. As the system speed increases, velocity of the media increase, drop production rate increases and hence aerosols also increase.

The solution to this problem has been aerosol collection systems. The design of these systems becomes more challenging when the printing system utilizes a fixed printhead assembly spanning a media path that allows the use of varying media widths. When the media width is less than the full paper path width, only part of the printhead assembly operates. Portions of the printhead assembly that extend beyond the media can clog as water in the nozzles evaporate and the localized ink viscosity increases. Eventually the viscosity at the nozzle is too much for the ejection actuator to eject. Thus there is a problem of aerosol generation and the related problem of a need to exercise drop generators across and beyond the media. These problems have not been properly addressed. Prior solutions include: (1) aerosol collection system ducts that typically collect aerosol from a single duct; (2) spittoons that are placed out of the print zone that are only utilized when the printer is not printing—to name two examples.

6. Ink Delivery

Larger printheads help to increase print speeds regardless of whether the printhead is a traditional scanning type or a pagewidth printhead. However, larger printheads require a higher ink supply flow rate and the pressure drop in the ink from the ink inlet on the printhead to nozzles remote from the inlet can change the drop ejection characteristics.

Large supply flow rates necessitate large ink tanks which exhibit a large pressure drop when the ink level is low compared to the hydrostatic pressure generated when the ink tank is full. Individual pressure regulators integrated into each printhead is unwieldy and expensive for multicolor printheads, particularly those carrying four or more inks. A system with five inks and five printheads would require 25 regulators. Moreover long printheads tend to have large pressure drops with a single regulated source of ink. A multitude of smaller ink supply tanks creates a high replacement rate which is disruptive to the operation of the printer.

7. Priming/De-priming and Air Bubble Removal

Inkjet printers that can prime, de-prime and purge air bubbles from the printhead offer the user distinct advantages. Removing an old printhead can cause inadvertent spillage of residual ink if it has not been de-primed before decoupling from the printer. Of course, a newly installed printhead needs to be primed but this occurs more quickly if the printer actively primes the printhead rather than a passive system that uses capillary action.

Active priming tends to waste a lot of ink as the nozzles are fired into a spittoon until ink is drawn to the entire nozzle array. Forcing ink to the nozzles under pressure is prone to flood the nozzle face. Ink floods must be rectified by an additional wiping operation before printing can commence.

When the printhead is going to be inactive for an extended time, it can be beneficial to de-prime it during this standby period. De-priming will avoid clogging from dried ink in the nozzles and tiny ejection chambers. De-priming for standby necessitates an active and timely re-priming when next the printer is used.

Air bubbles trapped in printheads are a perennial problem and a common cause of print artifacts. Actively and rapidly removing air bubbles from the printhead allows the user to rectify print problems without replacing the printhead. Active priming, de-priming and air purging typically use a lot of ink particularly if the ink is drawn through the nozzles by a vacuum in the printhead capper. This is exacerbated by large arrays of nozzles because more ink is lost as the number of nozzles increases.

8. Carrier Assembly

Controlling the gap between the nozzles and the surface of the print media is crucial to print quality. Variation in this 'printing gap' as it is known affects the ink droplet flight time. As the nozzles and the media substrate move relative to each other, varying the flight time of the droplets shifts the position printed dot on the media surface.

Increasing the size of the nozzle array, or providing several different nozzle arrays will increase print speeds. However, larger nozzle arrays and multiple separate nozzle arrays greatly increase the difficulty to maintain a constant printing gap. Typically, there is a compromise between the production costs associated with fine equipment tolerances, and print quality and or print speed.

9. Ink Conduit Routing

The ink supply to all the nozzles in a nozzle array should be uniform in terms of ink pressure and refill flow rate. Changing these characteristics in the ink supply can alter the drop ejection characteristics of the nozzle. This, of course, can lead to visible artifacts in the print.

Larger nozzle arrays are beneficial in terms of print speed but problematic in terms of ink supply. Nozzles that are relatively remote from the ink feed conduit can be starved of ink because of the consumption of ink by more proximate nozzles.

At a more general level, ink feed lines from the cartridge or other supply tank, to the printhead should be as short as possible. Printhead priming operations need to be configured to the ink color with the longest flow path from the ink reservoir. This means the nozzles in the array fed by other ink reservoirs may prime for longer than needed. This can lead to nozzle floods and wasted ink.

SUMMARY OF THE INVENTION

1. Paper Feed

According to a first aspect, the present invention provides a printing system comprising:

a printhead assembly;

a drive roller for feeding media along a media path; and a vacuum platen assembly configured for movement relative to the fixed printhead assembly.

In one embodiment the printhead assembly includes a staggered array of printheads that overlap each other to collectively span the media path without gaps therebetween.

In one embodiment the printing system further comprises a vacuum actuated media transport zone configured to receive the media from the array of printheads.

In one embodiment the vacuum platen comprises a plurality of service modules, each with a vacuum platen configured for alignment with a corresponding one of the array of printheads.

In one embodiment the service modules are configured to cross the media path to engage the printhead during a capping or servicing operation.

In one embodiment the system further comprises a scanner adjacent the vacuum actuated media transport zone.

In one embodiment the vacuum actuated media transport zone has a plurality of individual vacuum belts.

In one embodiment the individual vacuum belts share a common belt drive mechanism.

In one embodiment the system further comprises a media encoder embedded within the vacuum platen assembly.

In one embodiment the vacuum platen assembly further comprises a fixed vacuum platen in which the service modules are embedded, the fixed vacuum platen being positioned adjacent a section of the media path defining a print zone, the print zone encompassing an area simultaneously printable by the printheads.

This aspect of the present invention is suited to use as a wide format printer in which the media path is greater than 432 mm (17 inches) wide.

In one embodiment the media path is between 914 mm (36 inches) and 1372 mm (54 inches) wide.

In one embodiment the print zone has an area less than 129032 square mm (200 square inches).

In one embodiment, the printing system is configured to generate less than 0.2 psi pressure difference between one surface of the media and the other as the media is fed across the fixed vacuum platen.

In one embodiment the printing system is configured to generate between 0.036 psi to 0.116 psi pressure difference between one surface of the media and the other as the media is fed across the fixed vacuum platen.

In one embodiment the vacuum platen assembly is configured to generate a normal force on the media of between 4 lbs to 13.5 lbs as the media is fed across the fixed vacuum platen.

In one embodiment wherein the individual vacuum belts are configured to transport the media at a faster speed than the drive roller.

In one embodiment the media simultaneously engages both the drive roller and the individual vacuum belts such that the media slips relative to the individual vacuum belts.

According to a second aspect, the present invention provides a printing system comprising:

a print zone;

a drive roller positioned at an input side of the print zone;

a vacuum platen assembly positioned under the print zone;

a printhead assembly overlaying and spanning the print zone; and a vacuum belt assembly configured to receive media from the print zone.

In one embodiment the printhead assembly has a staggered array of printheads that, during use, collectively span the media.

In one embodiment the vacuum platen assembly comprises a plurality of service modules, each with a vacuum platen configured for alignment with a corresponding one of the array of printheads.

In one embodiment the service modules are configured to cross the media path to engage the printhead during a capping or servicing operation.

In one embodiment the system further comprises a scanner adjacent the vacuum belt assembly.

In one embodiment wherein the vacuum belt assembly has a plurality of individual vacuum belts.

In one embodiment the individual vacuum belts share a common belt drive mechanism.

In one embodiment the system further comprises a media encoder embedded within the vacuum platen assembly.

In one embodiment the service modules are independently operable.

In one embodiment the vacuum platen assembly further comprises a fixed vacuum platen in which the service modules are embedded, the fixed vacuum platen being positioned adjacent a section of the media path defining a print zone, the print zone encompassing an area simultaneously printable by the printheads.

This aspect of the present invention is suited to use as a wide format printer in which the media path is greater than 432 mm (17 inches) wide.

In one embodiment the media path is between 36 inches and 1372 mm (54 inches) wide.

In one embodiment the print zone has an area less than 129032 square mm (200 square inches).

In one embodiment, the printing system is configured to generate less than 0.2 psi pressure difference between one surface of the media and the other as the media is fed across the fixed vacuum platen.

In one embodiment the printing system is configured to generate between 0.036 psi to 0.116 psi pressure difference between one surface of the media and the other as the media is fed across the fixed vacuum platen.

In one embodiment the vacuum platen assembly is configured to generate a normal force on the media of between 4 lbs to 13.5 lbs as the media is fed across the fixed vacuum platen.

In one embodiment wherein the individual vacuum belts are configured to transport the media at a faster speed than the drive roller.

In one embodiment the media simultaneously engages both the drive roller and the individual vacuum belts such that the media slips relative to the individual vacuum belts.

According to a third aspect, the present invention provides a printing system comprising:

a printhead assembly;

a vacuum platen assembly opposite the printhead assembly;

a media path between the printhead assembly and the vacuum platen;

a drive roller for moving media along the media path;

a vacuum belt assembly to move the media away from the vacuum platen assembly; and, a scanner adjacent the vacuum belt to capture information from the media for feedback control of the printhead assembly.

In one embodiment the printhead assembly has a staggered array of printheads that, during use, collectively span the media, and the information captured by the scanner is used to align printing from each of the printheads with that of adjacent printheads in the array.

In one embodiment the vacuum platen assembly comprises a plurality of service modules, each with a vacuum platen configured for alignment with a corresponding one of the array of printheads.

In one embodiment the service modules are configured to cross the media path to engage the printhead during a capping or servicing operation.

In one embodiment the vacuum belt zone has a plurality of individual vacuum belts.

In one embodiment the individual vacuum belts share a common belt drive mechanism.

In one embodiment the system further comprises a media encoder embedded within the vacuum platen.

In one embodiment the drive roller moves the media past the printheads along a media feed axis, the printheads being arranged in two rows that are staggered with respect to each other and overlapping in a direction transverse to the media feed axis.

In one embodiment the service modules are independently operable.

In one embodiment the vacuum platen assembly further comprises a fixed vacuum platen in which the service modules are embedded, the fixed vacuum platen being positioned adjacent a section of the media path defining a print zone, the print zone encompassing an area simultaneously printable by the printheads.

This aspect of the present invention is suited to use as a wide format printer in which the media path is greater than 432 mm (17 inches) wide.

In one embodiment the media path is between 36 inches and 1372 mm (54 inches) wide.

In one embodiment the print zone has an area less than 129032 square mm (200 square inches).

In one embodiment, the printing system is configured to generate less than 0.2 psi pressure difference between one surface of the media and the other as the media is fed across the fixed vacuum platen.

In one embodiment the printing system is configured to generate between 0.036 psi to 0.116 psi pressure difference between one surface of the media and the other as the media is fed across the fixed vacuum platen.

In one embodiment the vacuum platen assembly is configured to generate a normal force on the media of between 4 lbs to 13.5 lbs as the media is fed across the fixed vacuum platen.

In one embodiment wherein the individual vacuum belts are configured to transport the media at a faster speed than the drive roller.

In one embodiment the media simultaneously engages both the drive roller and the individual vacuum belts such that the media slips relative to the individual vacuum belts.

An input drive roller, print zone with printhead assembly and vacuum platen, and a vacuum belt enables the use of vertically activated service modules. This is a more compact configuration than systems that have laterally displaced servicing stations. Embedding the service modules into the vacuum platen further condenses the overall configuration and simplifies the automation of printhead maintenance.

2. Media Feed Encoder

According to a fourth aspect, the present invention provides an inkjet printing system comprising:

a vacuum platen assembly;

a printhead assembly spaced from the vacuum platen assembly; and a media encoder embedded within the vacuum platen assembly.

In one embodiment the inkjet printing system further comprises a media feed axis extending between the printhead assembly and the platen wherein the printhead assembly has a plurality of printheads, and the media encoder is positioned to engage media between two of the printheads.

In one embodiment the inkjet printing system further comprises a print zone between the printhead assembly and the vacuum platen assembly where, during use, media is printed with ink from the printhead assembly, wherein the media encoder is positioned to engage the media proximate an upstream side of the print zone.

In one embodiment the inkjet printing system further comprises:

a drive roller for moving media onto the vacuum platen;

a vacuum belt assembly to move the media away from the vacuum platen; and, a scanner adjacent the vacuum assembly to capture information from the media for feedback control of the printhead assembly.

In one embodiment the printhead assembly has a staggered array of printheads that, during use, collectively span the media, and the information captured by the scanner is used to align printing from each of the printheads with that of adjacent printheads in the array.

In one embodiment the drive roller moves the media past the printheads along a media feed axis, the printheads being arranged in two rows that are staggered with respect to each other and overlapping in a direction transverse to the media feed axis.

In one embodiment the vacuum platen assembly comprises a plurality of service modules, each with a vacuum platen configured for alignment with a corresponding one of the array of printheads.

In one embodiment the service modules are configured to cross the media path to engage the printhead during a capping or servicing operation.

In one embodiment the vacuum belt assembly includes a plurality of individual vacuum belts.

In one embodiment the vacuum platen assembly further comprises a fixed vacuum platen in which the service modules are embedded, the fixed vacuum platen being positioned adjacent a section of the media path defining a print zone, the print zone encompassing an area simultaneously printable by the printheads.

This aspect of the present invention is suited to use as a wide format printer in which the media path is greater than 432 mm (17 inches) wide.

In one embodiment the media path is between 36 inches and 1372 mm (54 inches) wide.

In one embodiment the print zone has an area less than 129032 square mm (200 square inches).

In one embodiment, the printing system is configured to generate less than 0.2 psi pressure difference between one surface of the media and the other as the media is fed across the fixed vacuum platen.

In one embodiment the printing system is configured to generate between 0.036 psi to 0.116 psi pressure difference between one surface of the media and the other as the media is fed across the fixed vacuum platen.

In one embodiment the vacuum platen assembly is configured to generate a normal force on the media of between 4 lbs to 13.5 lbs as the media is fed across the fixed vacuum platen.

In one embodiment wherein the individual vacuum belts are configured to transport the media at a faster speed than the drive roller.

In one embodiment the media simultaneously engages both the drive roller and the individual vacuum belts such that the media slips relative to the individual vacuum belts.

Embedding the encoder into the vacuum platen within the print zone further condenses the overall configuration by avoiding the use of star wheels and the like.

3. Printer Operation

According to a fifth aspect, the present invention provides a printing system comprising:

a print zone where droplets of ink print onto media;

a drive roller configured to translate the media into the print zone; and, a movable media engagement assembly for vacuum engagement of one side of the media to draw the media away from the print zone.

This aspect of the present invention is suited to use as a wide format printer in which the print zone is greater than 432 mm (17 inches) wide.

In one embodiment the movable media engagement assembly has an apertured surface that has a media engagement side and low pressure region at a side opposite the media engagement side.

In one embodiment the movable media engagement assembly has a vacuum belt configured to receive the media from the print zone.

In one embodiment the printing system further comprises a pagewidth printhead assembly that is fixed relative to the print zone when printing the media.

In one embodiment the pagewidth printhead assembly is a plurality of printheads positioned to be staggered with respect to each other in a direction transverse to a media feed direction.

In one embodiment the drive roller, the print zone and the vacuum belt are positioned such that the media is engaged by the driver roller but not the vacuum belt during a first time period.

In one embodiment the vacuum belt and the input drive roller are configured to engage the media during a second time period. In one embodiment the media slips relative to the vacuum belt during the second time period. In one embodiment the media is engaged by the vacuum belt but not the input drive roller during a third time period.

In one embodiment the printing system further comprises a media sensor configured to provide timing signals for operative control of the pagewidth printhead assembly.

In one embodiment the timing signals are provided during a first time interval, the first time interval spans an end portion of the first time period, all the second time period, and an initial portion of the third time period.

In one embodiment the vacuum belts rotate at a second translation speed which is greater than the first translation speed.

In one embodiment the print zone has a platen spaced from the pagewidth printhead assembly, and the media sensor is a media encoder embedded within the platen.

In one embodiment the printing system further comprises a media feed path extending between the pagewidth printhead assembly and the platen wherein the pagewidth printhead assembly has a plurality of printheads, and the media encoder is positioned to engage media between two of the printheads.

In one embodiment the media encoder is positioned to engage the media proximate an upstream side of the print zone. In one embodiment the platen is a vacuum platen.

In one embodiment the printing system further comprises a scanner adjacent the vacuum belt to capture information from the media for feedback control of the pagewidth printhead assembly.

In one embodiment the information captured by the scanner is used to align printing from each of the printheads with that of adjacent printheads in the array.

In one embodiment the vacuum platen comprises a plurality of individual vacuum platens that are each aligned with a corresponding one of the printheads, each of the individual vacuum platens being movable relative to the printheads.

In one embodiment the vacuum platen includes a plurality of service modules each corresponding to one of the printheads and configured to cross the media path to engage the printhead during a capping or servicing operation.

According to a sixth aspect, the present invention provides a method of printing comprising the steps of:

translating media across a print zone at a first speed based upon the angular velocity of a drive roller; and, subsequently translating the media at a second speed determined by a movable media engagement assembly configured to engage one side of the media.

In one embodiment the method further comprises the step of configuring the drive roller to engage the media more strongly than the engagement between the media and the movable media engagement assembly such that there is slippage between the media and the movable media engagement assembly whenever the media is simultaneously engaged with the drive roller.

In one embodiment the movable media engagement assembly has an apertured surface that has a media engagement side and low pressure region at a side opposite the media engagement side.

In one embodiment the movable media engagement assembly has a vacuum belt configured to receive the print media from the print zone. In one embodiment the second speed is based a belt speed of the vacuum belt. In one embodiment the second speed is greater than the first speed.

In one embodiment the method further comprises the steps of providing a pagewidth printhead assembly in the print zone, wherein the pagewidth printhead assembly is a plurality of printheads positioned to be staggered with respect to each other in a direction transverse to a media feed direction.

In one embodiment the method further comprises the step of positioning the drive roller, the print zone and the vacuum belt such that the media is engaged by the driver roller but not the vacuum belt during a first time period.

In one embodiment the method further comprises the step of positioning the vacuum belt and the drive roller to simultaneously engage the media during a second time period.

In one embodiment the media slips relative to the vacuum belt during the second time period.

In one embodiment the method further comprises the step of positioning the drive roller, the print zone and the vacuum belt such that the media is engaged by the vacuum belt but not the drive roller during a third time period.

In one embodiment the method further comprises the step of providing a media sensor to generate timing signals for operative control of the pagewidth printhead assembly.

In one embodiment the method further comprises the step of providing the timing signals during a first time interval, the first time interval spanning an end portion of the first time period, all the second time period, and an initial portion of the third time period.

In one embodiment the method further comprises the step of rotating the vacuum belts at a second translation speed which is greater than the first translation speed.

In one embodiment the method further comprises the step of providing a platen spaced from the pagewidth printhead assembly in the print zone wherein the media sensor is a media encoder embedded within the platen.

In one embodiment the method further comprises the step of positioning the media encoder is positioned to engage the media proximate an upstream side of the print zone.

In one embodiment the platen is a vacuum platen.

In one embodiment the method further comprises the step of providing a scanner adjacent the vacuum belt to capture information from the media for feedback control of the pagewidth printhead assembly.

In one embodiment the method further comprises the step of using the information captured by the scanner to align printing from each of the printheads with that of adjacent printheads in the array.

In one embodiment the method further comprises the step of providing service modules in the vacuum platen, the service modules each corresponding to one of the printheads and configured to cross the media path to engage the printhead during a capping or servicing operation.

The use of a vacuum belt allows some slippage with the media but draws it out of the print zone at a speed faster than the input roller feeds it into the print zone. This maintains the media flush against the platen during printing and avoids the need for precise synchronization between the input and put drive on either side of the print zone.

According to a seventh aspect, the present invention provides a printing system comprising:

a drive roller configured to engage and push media into a print zone; and, a movable media engagement assembly configured to engage one side of the media and pull the media while the drive roller remains engaged with the media.

This aspect of the present invention is suited to use as a wide format printer in which the print zone is greater than 432 mm (17 inches) wide.

In one embodiment the movable media engagement assembly has an apertured surface that has a media engagement side and low pressure region at a side opposite the media engagement side.

In one embodiment the movable media engagement assembly has a vacuum belt configured to receive the media from the print zone.

In one embodiment a leading edge of the media traverses from the drive roller to the vacuum belt during the first time period.

In one embodiment the drive roller is configured to control a media translation speed until the media disengages from the drive roller.

In one embodiment the vacuum belt is configured to control the media transport speed subsequent to disengagement of the media from the input roller.

In one embodiment the printing system further comprises:

a vacuum platen;

a printhead assembly; and, a media encoder positioned in the vacuum platen and configured to produce timing signals for operating the printhead assembly.

In one embodiment the vacuum platen is fixed and the printhead assembly overlays the vacuum platen and spans the print zone.

In one embodiment the media encoder is configured to provide the timing signals while engaged with the print media.

In one embodiment the drive roller is configured to engage the media more strongly than the movable media engagement assembly such that during use the media slips relative to the movable media engagement assembly whenever the media is simultaneously engaged with the drive roller.

In one embodiment the movable media engagement assembly has an apertured surface that has a media engagement side and low pressure region at a side opposite the media engagement side. In one embodiment the movable media engagement assembly has a vacuum belt configured to receive the print media from the print zone.

In one embodiment the media encoder is embedded within the vacuum platen. In one embodiment the printing system further comprises a media feed path extending between the pagewidth printhead assembly and the vacuum platen wherein the pagewidth printhead assembly has a plurality of printheads, and the media encoder is positioned to engage the media between two of the printheads. In one embodiment the media encoder is positioned to engage the media proximate an upstream side of the print zone. In one embodiment the platen is a vacuum platen.

In one embodiment the printing system further comprises a scanner adjacent the vacuum belt to capture information from the media for feedback control of the pagewidth printhead assembly. In one embodiment the information captured by the scanner is used to align printing from each of the printheads with that of adjacent printheads in the array.

In one embodiment the vacuum platen comprises a plurality of individual vacuum platens that are each aligned with a corresponding one of the printheads, each of the individual vacuum platens being movable relative to the printheads. In one embodiment the vacuum platen includes a plurality of service modules each corresponding to one of the printheads and configured to cross the media path to engage the printhead during a capping or servicing operation.

Using two feed mechanisms to transport media through a print zone yields a compact but high performance pagewidth printing system that effectively avoids media buckling Service modules embedded in a platen below the printhead assembly consolidate the design. Having the input drive roller control media speed until it disengages the media substrate reduces visible artifacts. The encoder wheel monitors the media substrate speed before and after media speed control switches from the input drive roller to the vacuum belts and this manages the media speed change with minimal visual impact on print quality.

4. Service Modules

According to an eighth aspect, the present invention provides a printing system comprising:

a printhead assembly for printing media fed along a media path; and, a plurality of service modules for the printhead assembly, each of the service modules being configured to operate in a plurality of different modes; wherein, each of the service modules are independently operable.

This aspect of the invention is well suited for use as a wide format printer in which the media path is wider than 432 mm (17 inches).

In one embodiment the printhead assembly has a plurality of printheads positioned to span the media path, each of the service modules configured to service one of the printheads respectively.

In one embodiment the printing system further comprises a platen having an apertured platen face, wherein the plurality of service modules are positioned for accessing the printheads through the apertured platen face. In one embodiment the apertured platen face has an aperture for each one of the plurality of service modules respectively. In one embodiment one of the modes is a platen mode for use when the aperture corresponding to the service module is completely covered by the media. In one embodiment one of the modes is a spittoon mode for use when the aperture corresponding to the service module is partially covered by the media. In one embodiment one of the modes is a capping mode for use when the printhead corresponding to the service module is inactive. In one embodiment one of the modes is a priming mode for use when the printhead corresponding to the service module is a newly installed replacement printhead.

In one embodiment the service modules that do not correspond to the newly installed replacement printhead are configured to operate in the capping mode while the newly installed replacement printhead is primed.

In one embodiment the printing system further comprises:

a drive roller configured to engage and push media into a print zone; and, a movable media engagement assembly configured to engage one side of the media and pull the media while the drive roller remains engaged with the media.

In one embodiment the movable media engagement assembly has an apertured surface that has a media engagement side and low pressure region at a side opposite the media engagement side. In one embodiment the movable media engagement assembly has a vacuum belt configured to receive the media from the print zone. In one embodiment a leading edge of the media traverses from the drive roller to the vacuum belt during the first time period. In one embodiment the drive roller is configured to control a media translation speed until the media disengages from the drive roller. In one embodiment the vacuum belt is configured to control the media transport speed subsequent to disengagement of the media from the input roller.

In one embodiment the printing system further comprises a media encoder positioned in the vacuum platen and configured to produce timing signals for operating the printhead assembly.

In one embodiment the printing system further comprises a scanner adjacent the vacuum belt to capture information from the media for feedback control of the pagewidth printhead assembly. In one embodiment the information captured by the scanner is used to align printing from each of the printheads with that of adjacent printheads in the array.

In one embodiment the vacuum platen comprises a plurality of individual vacuum platens that are each aligned with a corresponding one of the printheads, each of the individual vacuum platens being movable relative to the printheads. In one embodiment the service modules are configured to cross the media path to engage the printheads during a capping or servicing operation.

According to a ninth aspect, the present invention provides a printing system comprising:

a media transport system configured to transport media along a media path;

a printhead assembly fixed relative to the media path; and, a plurality of service modules for the printhead assembly, each of the service modules being independently movable relative to the media path.

This aspect of the invention is well suited to use as a wide format printer in which the media path is wider than 432 mm (17 inches).

In one embodiment each of the service modules is configured to operate in a plurality of different modes. In one embodiment the printhead assembly has a plurality of printheads positioned to span the media path, each of the service modules configured to service one of the printheads respectively. In one embodiment the printing system further comprises a platen having an apertured platen face, wherein the service modules are positioned for accessing the printheads through the apertured platen face. In one embodiment the apertured platen face has an aperture for each one of the plurality of service modules respectively.

In one embodiment one of the modes is a platen mode for use when the aperture corresponding to the service module is completely covered by the media. In one embodiment one of the modes is a spittoon mode for use when the aperture corresponding to the service module is partially covered by the media. In one embodiment, one of the modes is a capping mode for use when the printhead corresponding to the service module is inactive. In one embodiment one of the modes is a priming mode for use when the printhead corresponding to the service module is a newly installed replacement printhead. In one embodiment the service modules that do not correspond to the newly installed replacement printhead are configured to operate in the capping mode while the newly installed replacement printhead is primed.

In one embodiment the printing system further comprising:

a drive roller configured to engage and push media into a print zone; and, a movable media engagement assembly configured to engage one side of the media and pull the media while the drive roller remains engaged with the media.

In one embodiment the movable media engagement assembly has an apertured surface that has a media engagement side and low pressure region at a side opposite the media engagement side. In one embodiment a vacuum belt is configured to receive the media from the print zone. In one embodiment a leading edge of the media traverses from the drive roller to the vacuum belt during the first time period. In one embodiment the drive roller is configured to control a media translation speed until the media disengages from the drive roller. In one embodiment the vacuum belt is configured to control the media transport speed subsequent to disengagement of the media from the input roller.

In one embodiment the printing system further comprises a media encoder positioned in the vacuum platen and configured to produce timing signals for operating the printhead assembly.

In one embodiment the printing system further comprises a scanner adjacent the vacuum belt to capture information from the media for feedback control of the pagewidth printhead assembly.

In one embodiment the information captured by the scanner is used to align printing from each of the printheads with that of adjacent printheads in the array.

In one embodiment the vacuum platen comprises a plurality of individual vacuum platens that are each aligned with a corresponding one of the printheads, each of the individual vacuum platens being movable relative to the printheads.

According to a tenth aspect, the present invention provides a printing system comprising:

a media transport system configured to transport media of differing dimensions along a media path;

a printhead assembly for printing media transported along the media path, the media path having differing widths depending on the dimensions of the media; and, a plurality of service modules for the printhead assembly, each of the service modules being configured to operate in a plurality of different modes; wherein during use, the media path extends between the printhead assembly and at least some of the service modules configured to operate in one of the modes while any of the service modules beyond the media path operate in another of the modes.

This aspect of the invention is well suited to use as a wide format printer in which the media path is wider than 432 mm (17 inches) and typically from 36 inches to 1372 mm (54 inches).

In one embodiment the printhead assembly has a plurality of printheads positioned to span the media path, each of the service modules configured to service one of the printheads respectively.

In one embodiment the printing system further comprises a platen having an apertured platen face, wherein the service modules are positioned for accessing the printheads through the apertured platen face. In one embodiment the apertured platen face has an aperture for each one of the plurality of service modules respectively. In one embodiment one of the modes is a platen mode for use when the aperture corresponding to the service module is completely covered by the media. In one embodiment one of the modes is a spittoon mode for use when the aperture corresponding to the service module is partially covered by the media. In one embodiment one of the modes is a capping mode for use when the printhead corresponding to the service module is inactive. In one embodiment one of the modes is a priming mode for use when the printhead corresponding to the service module is a newly installed replacement printhead. In one embodiment the service modules that do not correspond to the newly installed replacement printhead are configured to operate in the capping mode while the newly installed replacement printhead is primed.

In one embodiment the printing system further comprises:

a drive roller configured to engage and push media into a print zone; and, a movable media engagement assembly configured to engage one side of the media and pull the media while the drive roller remains engaged with the media.

In one embodiment the movable media engagement assembly has an apertured surface that has a media engagement side and low pressure region at a side opposite the media engagement side. In one embodiment the movable media engagement assembly has a vacuum belt configured to receive the media from the print zone.

In one embodiment a leading edge of the media traverses from the drive roller to the vacuum belt during the first time period. In one embodiment the drive roller is configured to control a media translation speed until the media disengages from the drive roller. In one embodiment the vacuum belt is configured to control the media transport speed subsequent to disengagement of the media from the input roller.

In one embodiment the printing system further comprises a media encoder positioned in the vacuum platen and configured to produce timing signals for operating the printhead assembly. In one embodiment the printing system further comprises a scanner adjacent the vacuum belt to capture information from the media for feedback control of the pagewidth printhead assembly.

In one embodiment the information captured by the scanner is used to align printing from each of the printheads with that of adjacent printheads in the array. In one embodiment the vacuum platen comprises a plurality of individual vacuum platens that are each aligned with a corresponding one of the printheads, each of the individual vacuum platens being movable relative to the printheads. In one embodiment the service modules are configured to cross the media path to engage the printheads during a capping or servicing operation.

By maintaining the printhead assembly using a number of independently operable service modules, individual parts of the printhead assembly can be replaced without re-priming the entire printhead. Similarly, sections of the printhead can remain capped if not required for printing media of a particular size.

5. Aerosol Removal

According to an eleventh aspect, the present invention provides a printing system comprising:

a media feed assembly for feeding different sizes of media along a media path, the media path having a width corresponding to a maximum width of media that can be printed by the printing system;

a printhead assembly positioned on a first side of the media path and spanning the width of the media path;

an aerosol collection duct with an opening on the first side of the media path; and, a spittoon system positioned on a second side of the media path opposing the first side; wherein, the printhead assembly is configured to eject non-printing ink drops from any section not required to print media that is less than the maximum width, and the spittoon system is configured to collect the non-printing ink drops.

This aspect of the invention is well suited to use as a wide format printer in which the media path is wider than 432 mm (17 inches) and typically from 36 inches to 1372 mm (54 inches).

In one embodiment the media feed assembly feeds media along the media path in a media feed direction and the printhead assembly has a plurality of printheads arranged into a group of leading printheads and a group of trailing printheads, the leading printheads being upstream of the trailing printheads with respect to the media feed direction. In one embodiment the opening of the aerosol collection duct is downstream of the trailing printheads.

In one embodiment the spittoon system is at least one service module operating in a spittoon mode.

In one embodiment the printing system further comprises a plurality of the service modules, one of the service modules being provided for each of the printheads respectively wherein during use, any of the printheads not fully required to print media that is less than the maximum width, have the corresponding service module operating in the spittoon mode. In one embodiment the service modules are configured to operate in a platen mode when all the corresponding printhead is printing the media. In one embodiment the service modules are independently operable.

In one embodiment the printhead assembly has a plurality of printheads positioned to span the media path, each of the service modules configured to service one of the printheads respectively.

In one embodiment the printing system further comprises a platen having an apertured platen face, wherein the service modules are positioned for accessing the printheads through the apertured platen face. In one embodiment the apertured platen face has an aperture for each one of the plurality of service modules respectively.

In one embodiment one of the modes is a capping mode for use when the printhead corresponding to the service module is inactive. In one embodiment one of the modes is a priming mode for use when the printhead corresponding to the service module is a newly installed replacement printhead. In one embodiment the service modules that do not correspond to the newly installed replacement printhead are configured to operate in the capping mode while the newly installed replacement printhead is primed.

In one embodiment the printing system further comprises:

a drive roller configured to engage and push media into a print zone; and, a movable media engagement assembly configured to engage one side of the media and pull the media while the drive roller remains engaged with the media.

In one embodiment the movable media engagement assembly has an apertured surface that has a media engagement side and low pressure region at a side opposite the media engagement side. In one embodiment the movable media engagement assembly has a vacuum belt configured to receive the media from the print zone. In one embodiment the drive roller is configured to control a media translation speed until the media disengages from the drive roller. In one embodiment the vacuum belt is configured to control the media transport speed subsequent to disengagement of the media from the drive roller.

In one embodiment the printing system further comprises a media encoder positioned in the platen and configured to produce timing signals for operating the printhead assembly.

In one embodiment the printing system further comprises a scanner adjacent the vacuum belt to capture information from the media for feedback control of the pagewidth printhead assembly.

According to a twelfth aspect, the present invention provides a printing system comprising:

an inkjet printhead assembly for printing media fed along a media path;

an aerosol collection system for collecting ink aerosol generated by the printhead assembly; wherein, the printhead assembly is positioned on a first side of the media path and the aerosol collection system has a first aerosol collection opening positioned on the first side of the media path and a second aerosol collection opening positioned on a second side of the media path.

This aspect of the invention is well suited to use as a wide format printer in which the media path is wider than 432 mm (17 inches) and typically from 36 inches to 1372 mm (54 inches).

In one embodiment the printing system further comprises:

a platen for supporting the media during printing; wherein, the platen has a spittoon system for collecting non-printing drops of ink ejected from the inkjet printhead assembly.

In one embodiment the printhead assembly has a plurality of separate printheads fixed relative to the media path and the spittoon system has a corresponding plurality of service modules for each of the printheads respectively, the service modules being configured to operate in a spittoon mode when the corresponding printhead ejects non-printing drops of ink.

In one embodiment the printing system further comprises a media feed assembly for feeding different sizes of the media along the media path in a media feed direction, the media path having a width corresponding to a maximum width of media that can be printed by the printing system; wherein, any of the printheads not fully required to print media that is less than the maximum width, have the corresponding service module operating in the spittoon mode.

In one embodiment the service modules are configured to operate in a platen mode when all the corresponding printheads are printing the media. In one embodiment the service modules are configured to operate in a capped mode when the corresponding printhead is not required for printing the media. In one embodiment the aerosol collection system is configured to collect ink aerosol from the first and second aerosol collection openings when the media being printed is less than the maximum width.

In one embodiment the printheads are arranged into a group of leading printheads and a group of trailing printheads, the leading printheads being upstream of the trailing printheads with respect to the media feed direction. In one the first and second aerosol collection openings are downstream of the trailing printheads.

In one embodiment the service modules are independently operable. In one embodiment the printing system further comprises a vacuum platen opposite the printhead assembly, the vacuum platen having a plurality of apertures in which the services modules are positioned.

In one embodiment one of the modes is a priming mode for use when the printhead corresponding to the service module is a newly installed replacement printhead. In one embodiment the service modules that do not correspond to the newly installed replacement printhead are configured to operate in the capping mode while the newly installed replacement printhead is primed. In one embodiment the printing system further comprises:

a drive roller configured to engage and push media into a print zone; and, a movable media engagement assembly configured to engage one side of the media and pull the media while the drive roller remains engaged with the media.

In one embodiment the movable media engagement assembly has an apertured surface that has a media engagement side and low pressure region at a side opposite the media engagement side. In one embodiment the movable media engagement assembly has a vacuum belt configured to receive the media from the print zone. In one embodiment the drive roller is configured to control a media translation speed until the media disengages from the drive roller. In one embodiment the vacuum belt is configured to control the media transport speed subsequent to disengagement of the media from the drive roller.

In one embodiment the printing system further comprises a media encoder positioned in the platen and configured to produce timing signals for operating the printhead assembly.

In one embodiment the printing system further comprises a scanner adjacent the vacuum belt to capture information from the media for feedback control of the pagewidth printhead assembly.

According to a thirteenth aspect, the present invention provides a printing system comprising:

a drive roller for feeding different sizes of media along a media path;

an inkjet printhead assembly for printing the media; and, an ink aerosol collection system for removing ink aerosol from areas adjacent the media path; wherein, the ink aerosol collection system is configured to remove aerosol at a greater rate in response to an increase in the media size.

This aspect of the invention is well suited to use as a wide format printer in which the media path is wider than 432 mm (17 inches) and typically from 36 inches to 1372 mm (54 inches).

In one embodiment the printhead assembly is positioned on a first side of the media path and the aerosol collection system has a first aerosol collection opening positioned on the first side of the media path and a second aerosol collection opening positioned on a second side of the media path.

In one embodiment the media path has a width corresponding to a maximum width of media that can be printed by the printing system and the aerosol collection system is configured to collect ink aerosol from the first and second aerosol collection openings when the media being printed is less than the maximum width.

In one embodiment the printing system further comprises:

a platen for supporting the media during printing; wherein, the platen has a spittoon system for collecting non-printing drops of ink ejected from the inkjet printhead assembly.

In one embodiment the printing system further comprises a plurality of service modules, wherein the printhead assembly has a plurality of separate printheads fixed relative to the media path and one of the service modules corresponding to each of the printhead respectively, the service modules being configured to operate in a spittoon mode to provide the spittoon system. In one embodiment any of the printheads not fully required to print media that is less than the maximum width, have the corresponding service module operating in the spittoon mode. In one embodiment the service modules are configured to operate in a platen mode when all the corresponding printhead is printing the media. In one embodiment the service modules are configured to operate in a capped mode when the corresponding printhead is not required for printing the media.

In one embodiment the printheads are arranged into a group of leading printheads and a group of trailing printheads, the leading printheads being upstream of the trailing printheads with respect to the media feed direction. In one embodiment the first and second aerosol collection openings are downstream of the trailing printheads. In one embodiment the service modules are independently operable.

In one embodiment the printing system further comprises a vacuum platen opposite the printhead assembly, the vacuum platen having a plurality of apertures in which the services modules are positioned.

In one embodiment one of the modes is a priming mode for use when the printhead corresponding to the service module is a newly installed replacement printhead. In one embodiment the service modules that do not correspond to the newly installed replacement printhead are configured to operate in the capping mode while the newly installed replacement printhead is primed.

In one embodiment the further comprises a movable media engagement assembly configured to engage one side of the media and pull the media while the drive roller remains engaged with the media. In one embodiment the movable media engagement assembly has an apertured surface that has a media engagement side and low pressure region at a side opposite the media engagement side. In one embodiment the movable media engagement assembly has a vacuum belt configured to receive the media from the print zone. In one embodiment the drive roller is configured to control a media translation speed until the media disengages from the drive roller. In one embodiment the vacuum belt is configured to control the media transport speed subsequent to disengagement of the media from the drive roller.

In one embodiment the printer system further comprises a media encoder positioned configured to produce timing signals for operating the printhead assembly.

This printing system effectively removes ink aerosol from a printing system having a fixed printhead assembly that spans the media path regardless of whether the media fully spans the media width and regardless of whether the printheads are ejecting non-printing drops for the purposes of preventing the nozzles from clogging.

6. Ink Delivery

According to a fourteenth aspect, the present invention provides a printing system comprising:

a printhead assembly with nozzles for ejecting ink;

a plurality of ink containers;

a plurality accumulator reservoirs, each having an inlet for connection to one of the ink containers, an outlet for connection to the printhead assembly and a fluid level regulator for maintaining fluid levels in the reservoir within a controlled fluid level range; wherein during use, the plurality of ink accumulator reservoirs are mounted at a fixed elevation relative to the nozzles such that hydrostatic fluid pressure at the nozzles is maintained within a predetermined range.

This aspect of the invention is well suited to use as a wide format printer in which the media path is wider than 432 mm (17 inches) and typically from 36 inches to 1372 mm (54 inches).

In one embodiment the fluid level regulator has an inlet valve at the inlet to the respective accumulator reservoir, the inlet valve configured to open fluid communication with the corresponding ink container when the fluid level approaches a lower limit of the controlled fluid level range.

In one embodiment the printhead assembly has a staggered arrangement of individual printheads collectively spanning a media path. In one embodiment each of the printheads has a plurality of parallel rows of nozzles, each of the rows corresponding to one of the ink containers and one of the accumulator reservoirs. In one embodiment the inlet valve has a float mechanism for opening and closing fluid communication with the corresponding ink container in response to fluid level changes. In one embodiment each of the parallel rows of nozzles has a first end and a second end and is coupled to the outlet valve of the corresponding accumulator reservoir at both the first end and the second end.

In one embodiment the printing system further comprises a pumping system configured to prime the printheads. In one embodiment the pumping system is configured to prime the printheads sequentially. In one embodiment the pumping system has a peristaltic pump.

In one embodiment the printing system further comprises:

a drive roller for feeding different sizes of media along a media path; and, an ink aerosol collection system for removing ink aerosol from areas adjacent the media path; wherein, the ink aerosol collection system is configured to remove aerosol at a greater rate in response to an increase in the media size.

In one embodiment the printhead assembly is positioned on a first side of the media path and the aerosol collection system has a first aerosol collection opening positioned on the first side of the media path and a second aerosol collection opening positioned on a second side of the media path. In one embodiment the media path has a width corresponding to a maximum width of media that can be printed by the printing system and the aerosol collection system is configured to collect ink aerosol from the first and second aerosol collection openings when the media being printed is less than the maximum width.

In one embodiment the printing system further comprises:

a platen for supporting the media during printing; wherein, the platen has a spittoon system for collecting non-printing drops of ink ejected from the inkjet printhead assembly.

In one embodiment the printing system further comprises a plurality of service modules, wherein the printhead assembly has a plurality of separate printheads fixed relative to the media path and one of the service modules corresponding to each of the printhead respectively, the service modules being configured to operate in a spittoon mode to provide the spittoon system. In one embodiment any of the printheads not fully required to print media that is less than the maximum width, have the corresponding service module operating in the spittoon mode. In one embodiment the service modules are configured to operate in a platen mode when all the corresponding printhead is printing the media.

In one embodiment the service modules are configured to operate in a capped mode when the corresponding printhead is not required for printing the media. In one embodiment the service modules are independently operable. In one embodiment the printing system further comprises a vacuum platen opposite the printhead assembly, the vacuum platen having a plurality of apertures in which the services modules are positioned.

Using an ink container to feed an accumulator for each ink type provides practical and reliable hydrostatic pressure regulation at the nozzles. The negative ink pressure at each nozzle is created by maintaining a fixed drop in the elevation of the accumulator reservoir fluid level relative to the nozzles. The inflow from the ink container to the accumulator reservoir is feedback controlled with a float valve to keep the fluid level within a narrow control range.

The output from each accumulator reservoir is separately coupled to each end of the corresponding printhead. This feeds ink to opposing ends of each columnar group of drop generators. Priming is more reliable when ink is fed from both ends as trapped air bubbles are less likely to form. Feeding ink to both longitudinal ends also reduces any pressure drops and flow constrictions caused by long printhead. These pressure drops can be enough to deprime nozzles and starve them of refill ink.

According to a fifteenth aspect, the present invention provides a printing system comprising:

an ink supply;

a feed line coupled to the ink supply;

a return line coupled to the ink supply;

a plurality of printheads each fluidically coupled to the feed and the return lines via separate couplings; wherein during printing, each of the printheads receives ink from both the feed and the return lines.

This aspect of the invention is well suited to use as a wide format printer in which the printheads span a media path that is wider than 432 mm (17 inches) and typically from 36 inches to 1372 mm (54 inches).

In one embodiment the printing system further comprises a valve for selectively opening or closing fluid communication between the feed and return lines.

In one embodiment the printing system further comprises a plurality of ink containers and a plurality accumulator reservoirs, wherein each of the printheads have nozzles for ejecting ink and each of the accumulator reservoirs has an inlet for connection to one of the ink containers, an outlet for connection to the printheads and a fluid level regulator for maintaining fluid levels in the reservoir within a controlled fluid level range; wherein during use, the plurality of ink accumulator reservoirs are mounted at a fixed elevation relative to the nozzles such that hydrostatic fluid pressure at the nozzles is maintained within a predetermined range.

In one embodiment the fluid level regulator has an inlet valve at the inlet to the respective accumulator reservoir, the inlet valve configured to open fluid communication with the corresponding ink container when the fluid level approaches a lower limit of the controlled fluid level range.

In one embodiment wherein the printheads have a staggered arrangement that collectively spans a media path. In one embodiment each of the printheads has a plurality of parallel nozzle rows, one of the nozzle rows corresponding to each of the ink containers respectively and one of the accumulator reservoirs respectively.

In one embodiment the printing system further comprises a pumping system configured to prime the printheads. In one embodiment the pumping system is configured to prime the printheads sequentially. In one embodiment the pumping system has a peristaltic pump.

In one embodiment the printing system further comprises:

a drive roller for feeding different sizes of media along a media path; and, an ink aerosol collection system for removing ink aerosol from areas adjacent the media path; wherein, the ink aerosol collection system is configured to remove aerosol at a greater rate in response to an increase in the media size.

In one embodiment the printhead assembly is positioned on a first side of the media path and the aerosol collection system has a first aerosol collection opening positioned on the first side of the media path and a second aerosol collection opening positioned on a second side of the media path. In one embodiment the media path has a width corresponding to a maximum width of media that can be printed by the printing system and the aerosol collection system is configured to collect ink aerosol from the first and second aerosol collection openings when the media being printed is less than the maximum width.

In one embodiment the printing system further comprises:

a platen for supporting the media during printing; wherein, the platen has a spittoon system for collecting non-printing drops of ink ejected from the inkjet printhead assembly.

In one embodiment the printing system further comprises a plurality of service modules, wherein the printhead assembly has a plurality of separate printheads fixed relative to the media path and one of the service modules corresponding to each of the printhead respectively, the service modules being configured to operate in a spittoon mode to provide the spittoon system. In one embodiment any of the printheads not fully required to print media that is less than the maximum width, have the corresponding service module operating in the spittoon mode. In one embodiment the service modules are configured to operate in a platen mode when all the corresponding printhead is printing the media. In one embodiment the service modules are configured to operate in a capped mode when the corresponding printhead is not required for printing the media. In one embodiment the service modules are independently operable. In one embodiment the printing system further comprises a vacuum platen opposite the printhead assembly, the vacuum platen having a plurality of apertures in which the services modules are positioned.

According to a sixteenth aspect, the present invention provides a printing system comprising:

an ink supply;

a feed line coupled to the ink supply;

a return line coupled to the ink supply;

a plurality of printheads each fluidically coupled to the first and return lines; and, a bypass line coupling the feed line to the return line.

This aspect of the invention is well suited to use as a wide format printer in which the printheads span a media path that is wider than 432 mm (17 inches) and typically from 36 inches to 1372 mm (54 inches).

In one embodiment the return line is configured to receive ink from the ink supply through the bypass line during a printing operation.

In one embodiment, each of the printheads receives ink from both the feed and the return lines.

In one embodiment the printing system further comprises a valve in the bypass line for selectively opening or closing fluid communication between the feed and return lines.

In one embodiment the printing system further comprises a plurality of ink containers and a plurality accumulator reservoirs, wherein each of the printheads have nozzles for ejecting ink and each of the accumulator reservoirs has an inlet for connection to one of the ink containers, an outlet for connection to the printheads and a fluid level regulator for maintaining fluid levels in the reservoir within a controlled fluid level range; wherein during use, the plurality of ink accumulator reservoirs are mounted at a fixed elevation relative to the nozzles such that hydrostatic fluid pressure at the nozzles is maintained within a predetermined range.

In one embodiment the fluid level regulator has an inlet valve at the inlet to the respective accumulator reservoir, the inlet valve configured to open fluid communication with the corresponding ink container when the fluid level approaches a lower limit of the controlled fluid level range.

In one embodiment the printing system further comprises a pumping system configured to prime the printheads. In one embodiment the pumping system is configured to prime the printheads sequentially. In one embodiment the pumping system has a peristaltic pump.

In one embodiment the printing system further comprises:

a drive roller for feeding different sizes of media along a media path; and, an ink aerosol collection system for removing ink aerosol from areas adjacent the media path; wherein, the ink aerosol collection system is configured to remove aerosol at a greater rate in response to an increase in the media size.

In one embodiment the printheads are positioned on a first side of the media path and the aerosol collection system has a first aerosol collection opening positioned on the first side of the media path and a second aerosol collection opening positioned on a second side of the media path. In one embodiment the media path has a width corresponding to a maximum width of media that can be printed by the printing system and the aerosol collection system is configured to collect ink aerosol from the first and second aerosol collection openings when the media being printed is less than the maximum width.

In one embodiment the printing system further comprises:

a platen for supporting the media during printing; wherein, the platen has a spittoon system for collecting non-printing drops of ink ejected from the printheads.

In one embodiment the printing system further comprises a plurality of service modules, one of the service modules corresponding to each of the printheads respectively, the service modules being configured to operate in a spittoon mode to provide the spittoon system. In one embodiment any of the printheads not fully required to print media that is less than the maximum width, have the corresponding service module operating in the spittoon mode. In one embodiment the service modules are configured to operate in a platen mode when all the corresponding printhead is printing the media. In one embodiment the service modules are configured to operate in a capped mode when the corresponding printhead is not required for printing the media. In one embodiment the service modules are independently operable.

In one embodiment the printing system further comprises a vacuum platen opposite the printhead assembly, the vacuum platen having a plurality of apertures in which the services modules are positioned.

According to a seventeenth aspect, the present invention provides a printing system comprising:

an ink supply;

an accumulator reservoir;

a valve coupling the accumulator reservoir to the ink supply, the valve being configured to open when the ink level in the accumulator reservoir reaches a lower limit of a predetermined ink level range, and close when the ink level in the accumulator reservoir reaches an upper limit of the ink level range; and, a plurality of printheads in fluid communication with the accumulator reservoir, each of the printheads having nozzles for ejecting ink onto media; wherein during printing, the accumulator reservoir is fixed relative to the printheads such that hydrostatic ink pressure at the nozzles is generated by the elevation of the ink level in the accumulator reservoir relative to the elevation of the of the nozzles.

This aspect of the invention is well suited to use as a wide format printer in which the printheads span a media path that is wider than 432 mm (17 inches) and typically from 36 inches to 1372 mm (54 inches).

In one embodiment the valve is a float valve with a float that is buoyant on the ink in the accumulator reservoir to open the valve when the ink level reaches the lower limit and close the valve as the ink level approaches the upper limit.

In one embodiment the printing system further comprises a feed line coupled to the accumulator reservoir and a return line coupled to the accumulator reservoir, each of the printheads being connected to both the feed line and the return line via separate couplings.

In one embodiment the printing system further comprises a bypass line coupling the feed line to the return line. In one embodiment the return line is configured to receive ink from the ink supply through the bypass line during a printing operation.

In one embodiment the printing system further comprises a bypass valve in the bypass line for selectively opening or closing fluid communication between the feed and return lines.

In one embodiment each of the accumulator reservoirs has an inlet for connection to one of the ink containers, an outlet for connection to the printheads and a fluid level regulator for maintaining fluid levels in the reservoir within a controlled fluid level range; wherein during use, the plurality of ink accumulator reservoirs are mounted at a fixed elevation relative to the nozzles such that hydrostatic fluid pressure at the nozzles is maintained within a predetermined range.

In one embodiment the valve is an inlet valve at the inlet to the respective accumulator reservoir, the inlet valve configured to open fluid communication with the corresponding ink container when the fluid level approaches a lower limit of the controlled fluid level range.

In one embodiment the printing system further comprises a pumping system configured to prime the printheads sequentially.

In one embodiment the printing system further comprises:

a drive roller for feeding different sizes of media along a media path; and, an ink aerosol collection system for removing ink aerosol from areas adjacent the media path; wherein, the ink aerosol collection system is configured to remove aerosol at a greater rate in response to an increase in the media size.

In one embodiment the printheads are positioned on a first side of the media path and the aerosol collection system has a first aerosol collection opening positioned on the first side of the media path and a second aerosol collection opening positioned on a second side of the media path.

In one embodiment the media path has a width corresponding to a maximum width of media that can be printed by the printing system and the aerosol collection system is configured to collect ink aerosol from the first and second aerosol collection openings when the media being printed is less than the maximum width.

In one embodiment the printing system further comprises:

a platen for supporting the media during printing; wherein, the platen has a spittoon system for collecting non-printing drops of ink ejected from the printheads.

In one embodiment the printing system further comprises a plurality of service modules, one of the service modules corresponding to each of the printheads respectively, the service modules being configured to operate in a spittoon mode to provide the spittoon system.

In one embodiment any of the printheads not fully required to print media that is less than the maximum width, have the corresponding service module operating in the spittoon mode. In one embodiment the service modules are configured to operate in a platen mode when all the corresponding printhead is printing the media. In one embodiment the service modules are configured to operate in a capped mode when the corresponding printhead is not required for printing the media. In one embodiment the service modules are independently operable.

In one embodiment the printing system further comprises a vacuum platen opposite the printhead assembly, the vacuum platen having a plurality of apertures in which the services modules are positioned.

Using an accumulator reservoir intermediate the ink tank and the printhead allows a depleted tank to be 'hot swapped' for a fresh tank while the printer is in operation. Hot swapping avoids printer downtime.

7. Priming/De-Priming and Air Bubble Removal

According to an eighteenth aspect, the present invention provides a printing system comprising:

an ink supply;

a feed line coupled to the ink supply;

a return line coupled to the ink supply;

a plurality of printheads each coupled to the feed line and the return line; and, a pumping system configured to generate fluid flow from the feed line to the return line via the printheads to prime the printheads.

This aspect of the invention is well suited to use as a wide format printer in which the printheads span a media path that is wider than 432 mm (17 inches) and typically from 36 inches to 1372 mm (54 inches).

In one embodiment the printing system further comprises a plurality of variable flow constrictors configured to allow the pumping system to prime the printheads sequentially. In one embodiment the variable flow constrictors are pinch valves. In one embodiment the printing system further comprises an accumulator reservoir and a valve coupling the accumulator reservoir to the ink supply, the valve being configured to open when the ink level in the accumulator reservoir reaches a lower limit of a predetermined ink level range, and close when the ink level in the accumulator reservoir reaches an upper limit of the ink level range, wherein the printheads are in fluid communication with the accumulator reservoir, each of the printheads having nozzles for ejecting ink onto media; wherein during printing, the accumulator reservoir is fixed relative to the printheads such that hydrostatic ink pressure at the nozzles is generated by the elevation of the ink level in the accumulator reservoir relative to the elevation of the of the nozzles.

In one embodiment the valve is a float valve with a float that is buoyant on the ink in the accumulator reservoir to open the valve when the ink level reaches the lower limit and close the valve as the ink level approaches the upper limit.

In one embodiment the printing system further comprises a feed line coupled to the accumulator reservoir and a return line coupled to the accumulator reservoir, each of the printheads being connected to both the feed line and the return line via separate couplings. In one embodiment the further comprises a bypass line coupling the feed line to the return line. In one embodiment the return line is configured to receive ink from the ink supply through the bypass line during a printing operation. In one embodiment the printing system further comprises a bypass valve in the bypass line for selectively opening or closing fluid communication between the feed and return lines.

In one embodiment the printing system further comprises:

a drive roller for feeding different sizes of media along a media path; and, an ink aerosol collection system for removing ink aerosol from areas adjacent the media path; wherein, the ink aerosol collection system is configured to remove aerosol at a greater rate in response to an increase in the media size.

In one embodiment the printheads are positioned on a first side of the media path and the aerosol collection system has a first aerosol collection opening positioned on the first side of the media path and a second aerosol collection opening positioned on a second side of the media path.

In one embodiment the media path has a width corresponding to a maximum width of media that can be printed by the printing system and the aerosol collection system is configured to collect ink aerosol from the first and second aerosol collection openings when the media being printed is less than the maximum width.

In one embodiment the printing system further comprises:

a platen for supporting the media during printing; wherein, the platen has a spittoon system for collecting non-printing drops of ink ejected from the printheads.

In one embodiment the printing system further comprises a plurality of service modules, one of the service modules corresponding to each of the printheads respectively, the service modules being configured to operate in a spittoon mode to provide the spittoon system. In one embodiment any of the printheads not fully required to print media that is less than the maximum width, have the corresponding service module operating in the spittoon mode. In one embodiment the service modules are configured to operate in a platen mode when all the corresponding printhead is printing the media. In one embodiment the service modules are configured to operate in a capped mode when the corresponding printhead is not required for printing the media. In one embodiment the service modules are independently operable.

In one embodiment the printing system further comprises a vacuum platen opposite the printhead assembly, the vacuum platen having a plurality of apertures in which the services modules are positioned.

According to a nineteenth aspect, the present invention provides a printing system comprising:

an ink supply;

a feed line coupled to the ink supply;

a return line coupled to the ink supply;

a plurality of printheads each coupled to the feed line and the return line; and, a pumping system to generate a pressure difference between the feed line and the return line during a printhead replacement operation.

This aspect of the invention is well suited to use as a wide format printer in which the printheads span a media path that is wider than 432 mm (17 inches) and typically from 36 inches to 1372 mm (54 inches).

In one embodiment the pumping system is inoperative during a printing operation.

In one embodiment the pumping system is configured to individually de-prime a printhead prior to removal of the printhead from the printing system. In one embodiment the pumping system is configured to individually prime any one of the printheads after installation. In one embodiment the pumping system is configured to purge bubbles from any of the printheads through the return line. In one embodiment the printing system further comprises a plurality of accumulator reservoirs, one of the accumulator reservoirs being connected to each of the printheads respectively, wherein during use, the accumulator reservoirs receive air from the respective printheads during a priming operation.

In one embodiment the printing system further comprises a bypass line connecting the feed and the return lines such that ink can bypass the printheads when flowing from the feed line to the return line.

In one embodiment the printing system further comprises a bypass valve for closing the bypass line such that any fluid communication between the feed line and the return line is via one or more of the printheads. In one embodiment the printing system further comprises a plurality of variable flow constrictors to allow the pumping system to prime the printheads sequentially. In one embodiment the variable flow constrictors are pinch valves.

In one embodiment the printing system further comprises valves coupling each of the accumulator reservoirs to the ink supply, each of the valves being configured to open when the ink level in the accumulator reservoir reaches a lower limit of a predetermined ink level range, and close when the ink level in the accumulator reservoir reaches an upper limit of the ink level range, wherein each of the printheads has nozzles for ejecting ink onto media and the accumulator reservoir is fixed relative to the printheads such that hydrostatic ink pressure at the nozzles is generated by the elevation of the ink level in the accumulator reservoir relative to the elevation of the of the nozzles.

In one embodiment the valves are float valves with a float that is buoyant on the ink in the accumulator reservoir to open the valve when the ink level reaches the lower limit and close the valve as the ink level approaches the upper limit. In one embodiment the feed line and the return line are coupled to each of the accumulator reservoirs via separate couplings.

In one embodiment the printing system further comprises:

a drive roller for feeding different sizes of media along a media path; and, an ink aerosol collection system for removing ink aerosol from areas adjacent the media path; wherein, the ink aerosol collection system is configured to remove aerosol at a greater rate in response to an increase in the media size.

In one embodiment the printheads are positioned on a first side of the media path and the aerosol collection system has a first aerosol collection opening positioned on the first side of the media path and a second aerosol collection opening positioned on a second side of the media path. In one embodiment the media path has a width corresponding to a maximum width of media that can be printed by the printing system and the aerosol collection system is configured to collect ink aerosol from the first and second aerosol collection openings when the media being printed is less than the maximum width.

In one embodiment the printing system according to claim 16 further comprises:

a platen for supporting the media during printing; wherein, the platen has a spittoon system for collecting non-printing drops of ink ejected from the printheads.

In one embodiment the printing system further comprises a plurality of service modules, one of the service modules corresponding to each of the printheads respectively, the service modules being configured to operate in a spittoon mode to provide the spittoon system.

In one embodiment any of the printheads not fully required to print media that is less than the maximum width, have the corresponding service module operating in the spittoon mode. In one embodiment the service modules are configured to operate in a platen mode when all the corresponding printhead is printing the media.

According to a twentieth aspect, the present invention provides a printing system comprising:

an ink supply;

a feed line coupled to the ink supply;

a return line coupled to the ink supply;

a plurality of printheads each fluidically coupled to the feed and the return lines;

a bypass line coupling the feed line to the return line; and, a pumping system configured to initially prime ink through the feed line, the return line, and the bypass line before priming each of the printheads.

This aspect of the invention is well suited to use as a wide format printer in which the printheads span a media path that is wider than 432 mm (17 inches) and typically from 36 inches to 1372 mm (54 inches).

In one embodiment the printing system further comprises a feed valve for closing fluid communication between the feed line and the ink supply as well as the return line and the ink supply. In one embodiment the printing system further comprises a bypass valve in the bypass line. In one embodiment the feed line, the return line, and the bypass line form a closed loop when the bypass valve is open and the feed valve is closed. In one embodiment the pumping system is configured to purge bubbles from any of the printheads through the return line.

In one embodiment the printing system further comprises an accumulator reservoir connected to each of the printheads respectively, wherein during use, the accumulator reservoir receives air from the respective printheads during a priming operation.

In one embodiment the printing system further comprises a bypass line connecting the feed and the return lines such that ink can bypass the printheads when flowing from the feed line to the return line. In one embodiment fluid communication between the feed line and the return line is via one or more of the printheads when the bypass valve is closed.

In one embodiment the printing system further comprises a plurality of variable flow constrictors to allow the pumping system to prime the printheads sequentially. In one embodiment the variable flow constrictors are pinch valves. In one embodiment the feed valve fluidically connects the accumulator to the ink supply, the feed valve being configured to open when the ink level in the accumulator reservoir reaches a lower limit of a predetermined ink level range, and close when the ink level in the accumulator reservoir reaches an upper limit of the ink level range. In one embodiment each of the printheads has nozzles for ejecting ink onto media and the accumulator reservoir is fixed relative to the printheads such that hydrostatic ink pressure at the nozzles is generated by the elevation of the ink level in the accumulator reservoir relative to the elevation of the of the nozzles. In one embodiment the feed valve is a float valve with a float that is buoyant on the ink in the accumulator reservoir to open the feed valve when the ink level reaches the lower limit and close the valve as the ink level approaches the upper limit.

In one embodiment the feed line and the return line are coupled to the accumulator reservoir via separate couplings.

In one embodiment the printing system further comprises:

a drive roller for feeding different sizes of media along a media path; and, an ink aerosol collection system for removing ink aerosol from areas adjacent the media path; wherein, the ink aerosol collection system is configured to remove aerosol at a greater rate in response to an increase in the media size.

In one embodiment the printheads are positioned on a first side of the media path and the aerosol collection system has a first aerosol collection opening positioned on the first side of the media path and a second aerosol collection opening positioned on a second side of the media path. In one embodiment the media path has a width corresponding to a maximum width of media that can be printed by the printing system and the aerosol collection system is configured to collect ink aerosol from the first and second aerosol collection openings when the media being printed is less than the maximum width.

In one embodiment the printing system further comprises:

a platen for supporting the media during printing; wherein, the platen has a spittoon system for collecting non-printing drops of ink ejected from the printheads.

In one embodiment the printing system further comprises a plurality of service modules, one of the service modules corresponding to each of the printheads respectively, the service modules being configured to operate in a spittoon mode to provide the spittoon system. In one embodiment any of the printheads not fully required to print media that is less than the maximum width, have the corresponding service module operating in the spittoon mode. In one embodiment the service modules are configured to operate in a platen mode when all the corresponding printhead is printing the media.

This ink supply configuration allows individual removal and replacement of the printheads in a multiple printhead system. Individual priming and de-priming is also accommodated.

8. Carrier Assembly

According to a twenty-first aspect, the present invention provides a printing system comprising:

a print zone;

a media path extending through the print zone along a paper axis;

a printhead carriage for mounting a plurality of printhead modules adjacent the print zone such that the printhead modules collectively span the media path and are staggered with respect to the paper axis, the printhead modules each having nozzles arranged in parallel rows; and, a plurality of datum features for holding the printhead carriage such that the parallel rows extend normal to the paper feed axis.

This aspect of the invention is well suited to use as a wide format printer in which the media path is wider than 432 mm (17 inches) and typically from 36 inches to 1372 mm (54 inches).

In one embodiment the printhead carriage has a floor section for supporting the printhead modules and the datum features are secured to the floor section. In one embodiment the printheads modules are staggered with respect to the paper feed axis as well as a direction transverse to the paper feed axis to span the media path. In one embodiment each of the printhead modules has a series of elongate printhead integrated circuits positioned end to end and extending parallel to the direction transverse to the paper axis. In one embodiment the printhead cartridge has three of the datum features, two of the datum features being positioned to one side of the printhead modules and the remaining datum feature being positioned on the opposing side of the printhead modules with respect to the direction transverse to the paper axis. In one embodiment the printing system further comprises three datum points for engaging the datum features, two of the datum points are positioned on one side of the media path and the remaining datum point positioned on the opposite side of the media path.

In one embodiment the printing system further comprises:

an ink supply;

a feed line coupled to the ink supply;

a return line coupled to the ink supply; wherein, the printhead modules are each fluidically coupled to the feed and the return lines;

a bypass line coupling the feed line to the return line; and, a pumping system configured to initially prime ink through the feed line, the return line, and the bypass line before priming each of the printhead modules.

In one embodiment the printing system further comprises a feed valve for closing fluid communication between the feed line and the ink supply as well as the return line and the ink supply. In one embodiment the printing system further comprises a bypass valve in the bypass line. In one embodiment the feed line, the return line, and the bypass line form a closed loop when the feed valve is closed and the bypass valve is open.

In one embodiment the pumping system is configured to purge bubbles from any of the printheads through the return line.

In one embodiment the printing system further comprises an accumulator reservoir connected to each of the printheads respectively, wherein during use, the accumulator reservoir receives air from the respective printheads during a priming operation.

In one embodiment fluid communication between the feed line and the return line is via one or more of the printheads when the bypass valve is closed.

In one embodiment the printing system further comprises a plurality of variable flow constrictors to allow the pumping system to prime the printheads sequentially. In one embodiment the variable flow constrictors are pinch valves. In one embodiment the feed valve fluidically connects the accumulator to the ink supply, the feed valve being configured to open when the ink level in the accumulator reservoir reaches a lower limit of a predetermined ink level range, and close when the ink level in the accumulator reservoir reaches an upper limit of the ink level range. In one embodiment each of the printheads has nozzles for ejecting ink onto media and the accumulator reservoir is fixed relative to the printheads such that hydrostatic ink pressure at the nozzles is generated by the elevation of the ink level in the accumulator reservoir relative to the elevation of the of the nozzles. In one embodiment the feed valve is a float valve with a float that is buoyant on the ink in the accumulator reservoir to open the feed valve when the ink level reaches the lower limit and close the valve as the ink level approaches the upper limit.

In one embodiment the feed line and the return line are coupled to the accumulator reservoir via separate couplings.

In one embodiment the printing system further comprises:

a drive roller for feeding different sizes of media along a media path; and, an ink aerosol collection system for removing ink aerosol from areas adjacent the media path; wherein, the ink aerosol collection system is configured to remove aerosol at a greater rate in response to an increase in the media size.

In one embodiment the printheads are positioned on a first side of the media path and the aerosol collection system has a first aerosol collection opening positioned on the first side of the media path and a second aerosol collection opening positioned on a second side of the media path. In one embodiment the media path has a width corresponding to a maximum width of media that can be printed by the printing system and the aerosol collection system is configured to collect ink aerosol from the first and second aerosol collection openings when the media being printed is less than the maximum width.

In one embodiment the printing system further comprises:

a platen for supporting the media during printing; wherein, the platen has a spittoon system for collecting non-printing drops of ink ejected from the printheads.

In one embodiment the printing system further comprises a plurality of service modules, one of the service modules corresponding to each of the printheads respectively, the service modules being configured to operate in a spittoon mode to provide the spittoon system.

In one embodiment any of the printheads not fully required to print media that is less than the maximum width, have the corresponding service module operating in the spittoon mode.

In one embodiment the service modules are configured to operate in a platen mode when all the corresponding printhead is printing the media.

The use of datum features provides accurate control of the print gap across the entire pagewidth printhead while allowing the printheads to be periodically moved away from the platen for access to paper jams and so on.

9. Carriage Assembly Tube Routing

According to a twenty-second aspect, the present invention provides an inkjet printer comprising:

a print zone;

a media path extending through the print zone along a paper axis;

a printhead carriage with a plurality of printhead mounting sites for mounting a plurality of printhead modules adjacent the print zone such that the printhead modules collectively span the media path; and, a plurality of interfaces for supplying ink to, and receiving ink from each of the printhead modules respectively.

In one embodiment each of the interfaces are configured to supply different ink colors to the printhead modules. In one embodiment each of the interfaces has two separate fluid couplings, each of the fluid couplings has a plurality of conduits, each of the conduits being for one of the different ink colors only. In one embodiment one of the fluid couplings supplies ink to the printhead module and the other receives ink from the printhead module. In one embodiment the mounting sites each have electrodes for engaging contact pads on each of the printhead modules respectively, the electrodes engaging the contact pads along a first longitudinal side of the printhead module and the interface engaging a second longitudinal side of the printhead module, the first longitudinal side being opposite the second longitudinal side.

In one embodiment the fluid couplings are movable between a retracted position and an extended position, the extended position being closer to the first longitudinal side than the retracted position.

In one embodiment the inkjet printer further comprises a plurality of printhead driver printed circuit boards (PCB's) for each of the printhead modules respectively, each of the printhead driver PCB's having a print engine controller for controlling the operation of the nozzles on the printhead module to which it is connected during use.

In one embodiment the inkjet printer further comprises a supervising driver PCB connected to the plurality of printhead driver PCB's for transferring print data to each of the printhead modules. In one embodiment the printhead modules each have an array of nozzles for ejecting ink, and each of the mounting sites has a datum surface for engaging the printhead module at that mounting site to control relative positioning of the nozzle arrays on all the printhead modules. In one embodiment the mounting sites are staggered with respect to the paper axis. In one embodiment the nozzles on each of the printhead modules overlaps the nozzles on at least one other of the printhead modules in a direction transverse to the paper axis. In one embodiment the supervising PCB apportions the print data corresponding to the overlaps between the printhead modules. In one embodiment the printhead carriage has a rear wall that extends in the direction transverse to the paper axis, the rear wall having a plurality of openings each corresponding to one of the fluid couplers.

In one embodiment the printhead modules each have nozzles arranged in parallel rows and the printhead carriage has a plurality of datum features for holding the printhead carriage such that the parallel rows extend normal to the paper feed axis. In one embodiment the printhead carriage has a floor section for supporting the printhead modules and the datum features are secured to the floor section. In one embodiment the printheads modules are staggered with respect to the paper feed axis as well as a direction transverse to the paper feed axis to span the media path. In one embodiment each of the printhead modules has a series of elongate printhead integrated circuits positioned end to end and extending parallel to the direction transverse to the paper axis. In one embodiment the printhead carriage has three of the datum features, two of the datum features being positioned to one side of the printhead modules and the remaining datum feature being positioned on the opposing side of the printhead modules with respect to the direction transverse to the paper axis.

In one embodiment the inkjet printer further comprising three datum points for engaging the datum features, two of the datum points are positioned on one side of the media path and the remaining datum point positioned on the opposite side of the media path.

In one embodiment the inkjet printer further comprises:

an ink supply;

a feed line coupled to one of the fluid couplings on each of the interfaces; and, a return line coupled to the other of the fluid couplings on the interfaces.

Individual ink supply interfaces for each of the printhead modules allows individual removal and replacement of any defective modules. This eliminates the need to replace an entire pagewidth printhead which consumes a lot of ink when primed.

According to a twenty-third aspect, the present invention provides a printing system comprising:

a print zone;

a media path extending through the print zone along a paper axis;

a printhead carriage with a plurality of printhead mounting sites for mounting a plurality of printhead modules adjacent the print zone such that the printhead modules collectively span the media path, the printhead carriage having a long side extending transverse to the paper axis, the long side having access formations for ink conduits; and, a plurality of interfaces for connection to the ink conduits to supply ink to each of the printhead modules respectively; wherein, all ink for the plurality of printhead modules is supplied by ink conduits extending through the access formations on said long side of the printhead carriage.

This aspect of the invention is well suited to use as a wide format printer in which the media path is wider than 432 mm (17 inches) and typically from 36 inches to 1372 mm (54 inches).

In one embodiment each of the interfaces has a fluid coupler configured to supply different inks to the printhead modules. In one embodiment the ink conduits are a plurality of tube bundles each coupled to a corresponding fluid coupler and configured to route ink from a single side of the printhead carriage. In one embodiment the ink interfaces are also configured to receive ink from the printhead modules. In one embodiment each of the interfaces has two separate fluid couplings, each of the fluid couplings has a plurality of conduits, each of the conduits being for one of the different ink colors only. In one embodiment one of the fluid couplings supplies ink to the printhead module and the other receives ink from the printhead module.

In one embodiment the mounting sites each have electrodes for engaging contact pads on each of the printhead modules respectively, the electrodes engaging the contact pads along a first longitudinal side of the printhead module and the interface engaging a second longitudinal side of the printhead module, the first longitudinal side being opposite the second longitudinal side. In one embodiment the fluid couplings are movable between a retracted position and an extended position, the extended position being closer to the first longitudinal side than the retracted position.

In one embodiment the printer system further comprises a plurality of printhead driver printed circuit boards (PCB's) for each of the printhead modules respectively, each of the printhead driver PCB's having a print engine controller for controlling the operation of the nozzles on the printhead module to which it is connected during use. In one embodiment the printer system further comprises a supervising driver PCB connected to the plurality of printhead driver PCB's for transferring print data to each of the printhead modules. In one embodiment the printhead modules each have an array of nozzles for ejecting ink, and each of the mounting sites has a datum surface for engaging the printhead module at that mounting site to control relative positioning of the nozzle arrays on all the printhead modules. In one embodiment the mounting sites are staggered with respect to the paper axis. In one embodiment the nozzles on each of the printhead modules overlaps the nozzles on at least one other of the printhead modules in a direction transverse to the paper axis. In one embodiment the supervising PCB apportions the print data corresponding to the overlaps between the printhead modules.

In one embodiment the printhead modules each have nozzles arranged in parallel rows and the printhead carriage has a plurality of datum features for holding the printhead carriage such that the parallel rows extend normal to the paper feed axis. In one embodiment the printhead carriage has a floor section for supporting the printhead modules and the datum features are secured to the floor section. In one embodiment the printheads modules are staggered with respect to the paper feed axis as well as a direction transverse to the paper feed axis to span the media path. In one embodiment each of the printhead modules has a series of elongate printhead integrated circuits positioned end to end and extending parallel to the direction transverse to the paper axis.

In one embodiment the printhead carriage has three of the datum features, two of the datum features being positioned to one side of the printhead modules and the remaining datum feature being positioned on the opposing side of the printhead modules with respect to the direction transverse to the paper axis.

In one embodiment the printer system further comprises three datum points for engaging the datum features, two of the datum points are positioned on one side of the media path and the remaining datum point positioned on the opposite side of the media path.

According to a twenty-fourth aspect, the present invention provides a print engine for an inkjet printer defining a media path extending past a printhead assembly along a paper axis, the print engine comprising:

an elongate printhead carriage extending transverse to the paper axis;

a series of interfaces for supplying ink to respective printhead modules spaced along the printhead carriage such that during use, the printhead modules span the media path; and, ink conduits connected to the interfaces for feeding ink to the printhead modules; wherein, the printhead carriage has a series formations to position the ink conduits such that they all extend away from the interfaces in a direction transverse to the long axis to a common side of the printhead carriage.

This aspect of the invention is well suited to use as a wide format printer in which the media path is wider than 432 mm (17 inches) and typically from 36 inches to 1372 mm (54 inches).

In one embodiment the common side of the printhead carriage is a side wall and the formations are apertures in the side wall. In one embodiment each the interfaces are spaced from an adjacent one of the interfaces along the paper axis. In one embodiment the interfaces are divided into two groups, a first group that is relatively upstream with respect to the paper axis and a second group that is relatively downstream with respect to the paper axis, the interfaces in each group being aligned with each other on a line normal to the paper axis. In one embodiment\ each of the interfaces is configured to feed ink into and receive ink from the printhead module to which it is connected. In one embodiment each of the interfaces has a plurality of fluid couplers, each fluid coupler corresponds to one of the apertures in the side wall.

In one embodiment the ink conduits are flexible tubes and the flexible tubes that connect to any one of the fluid couplers are gathered into a tube bundle, each of the tube bundles extending through one of the apertures in the side wall respectively. In one embodiment the fluid couplings are movable between a retracted position and an extended position, the extended position being closer to the first longitudinal side than the retracted position.

In one embodiment the print engine further comprises a plurality of printhead driver printed circuit boards (PCB's) for each of the printhead modules respectively, each of the printhead driver PCB's having a print engine controller for controlling the operation of the nozzles on the printhead module to which it is connected during use.

In one embodiment the print engine further comprises a supervising driver PCB connected to the plurality of printhead driver PCB's for transferring print data to each of the printhead modules. In one embodiment the printhead modules each have an array of nozzles for ejecting ink, and each of the mounting sites has a datum surface for engaging the printhead module at that mounting site to control relative positioning of the nozzle arrays on all the printhead modules. In one embodiment the mounting sites are staggered with respect to the paper axis. In one embodiment the nozzles on each of the printhead modules overlaps the nozzles on at least one other of the printhead modules in a direction transverse to the paper axis. In one embodiment the supervising PCB apportions the print data corresponding to the overlaps between the printhead modules.

In one embodiment the printhead modules each have nozzles arranged in parallel rows and the printhead carriage has a plurality of datum features for holding the printhead carriage such that the parallel rows extend normal to the paper feed axis. In one embodiment the printhead carriage has a floor section for supporting the printhead modules and the datum features are secured to the floor section. In one embodiment the printheads modules are staggered with respect to the paper feed axis as well as a direction transverse to the paper feed axis to span the media path. In one embodiment each of the printhead modules has a series of elongate printhead integrated circuits positioned end to end and extending parallel to the direction transverse to the paper axis.

In one embodiment the printhead carriage has three of the datum features, two of the datum features being positioned to one side of the printhead modules and the remaining datum feature being positioned on the opposing side of the printhead modules with respect to the direction transverse to the paper axis. In one embodiment the print engine further comprises three datum points for engaging the datum features, two of the datum points are positioned on one side of the media path and the remaining datum point positioned on the opposite side of the media path.

Using several ink interfaces for a pagewidth printhead can ensure that none of the nozzles are so far from an ink feed line that they will be starved during a print job. Configuring the ink supply lines to extend laterally from the printhead modules to a common side of the housing shortens some of the feed lines and reduces the length variation across all the feed lines.

BRIEF DESCRIPTION OF THE DRAWINGS

Preferred embodiments of the invention will now be described by way of example only with reference to the accompanying drawings in which.

DETAILED DESCRIPTION OF THE PREFERRED EMBODIMENTS

Overview

Figure 1:
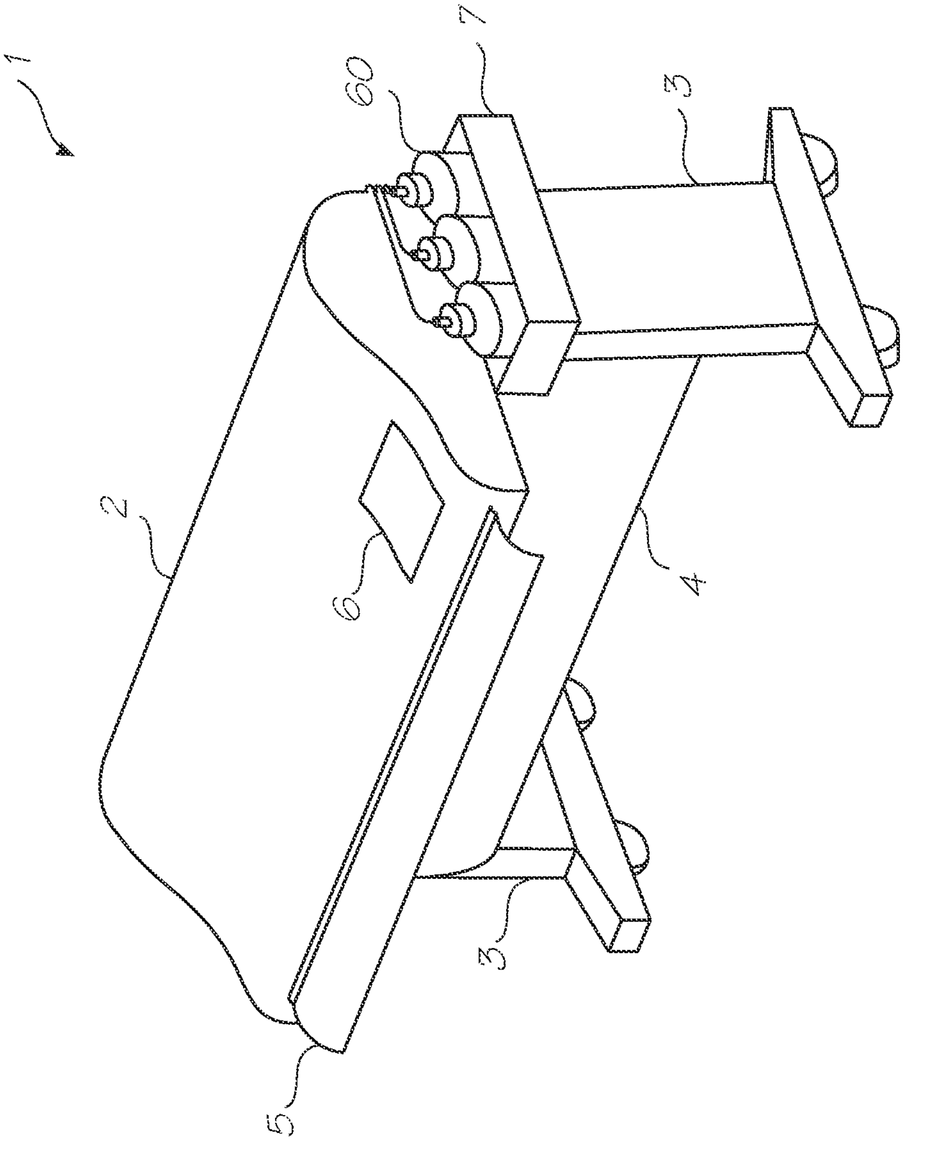
FIG. 1 is perspective of a roll fed wide format printer.

FIG. 1 shows a wide format printer 1 of the type fed by a media roll 4. However, as discussed above, for the purposes of this specification, a wide format printer is taken to mean any printer with a print width exceeding 17" (438.1 mm) even though most commercially available wide format printers have print widths in the range 36" (914 mm) to 54" (1372 mm). The print engine (that is, the primary functional components of the printer) are housed in an elongate casing 2 supported at either end by legs 3. The roll of media 4 (usually paper) extends between the legs 3 underneath the casing 2. A leading edge 8 of the media 5 is fed through a fed slot (not shown) in the rear of the casing 2, through the paper path of the print engine (described below) and out an exit slot 9 to a collection tray (not shown). At the sides of the casing 2 are ink tank racks 7 (one only shown). Ink tanks 60 store the different colors of ink that are fed to the printhead modules (described below) via a tubing system 10. User interface 6 is a touch screen or keypad and screen for operator control and diagnostic feedback to the operator.

For the purposes of this specification, references to 'ink' will be taken to include liquid colorant for creating images and indicia on a media substrate as well as any functionalized fluid such as infra red inks, surfactants, medicaments and so on.

Figure 2:
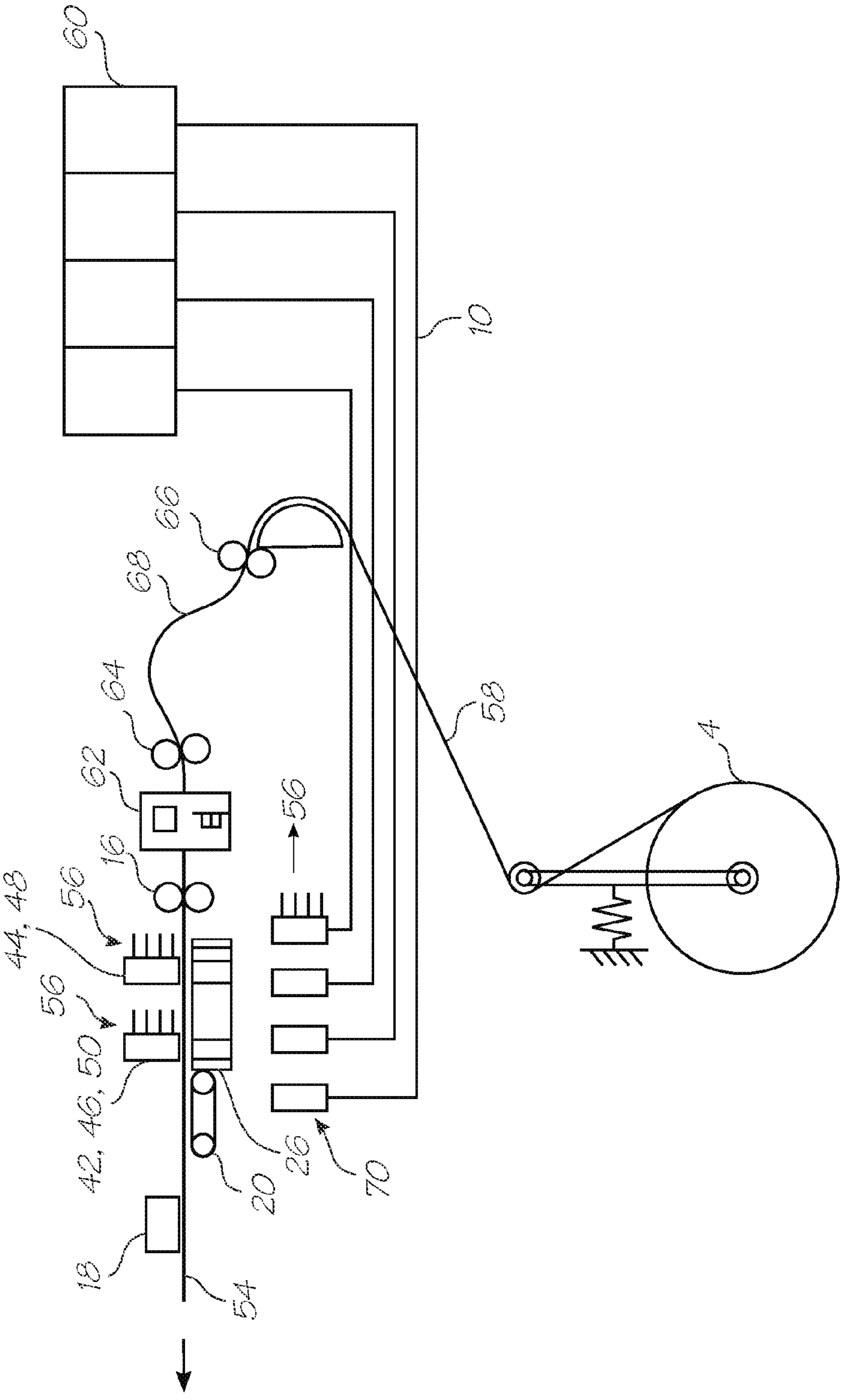
FIG. 2 is a diagrammatic representation of the primary components of a roll fed wide format printer according to the invention.

FIG. 2 is a diagrammatic representation of components within the print engine. Media feed rollers 64 and 66 unwind media 58 from the roll 4. Media cutter 62 slices the continuous media 58 to form a separate sheet 54 of desired length. As the media is being cut, it needs to be stationary within the cutter 62 (so as not to create a diagonal cut). However, the roll 4 is to keep rotating to maintain angular momentum. In light of this, the unwinder feed rollers 66 operate at a constant speed while the cutter feed rollers 64 momentarily stop during the cutting process. This creates a delay loop 68 between rollers 66 and 64 as the media bows upwards. After cutting, the continuous media 58 momentarily feeds through the cutter 62 faster than the speed of the unwinder feed rollers 66 to return the delay loop 68 to its initial position.

The media sheet 16 feeds through a grit-coated drive roller 16 and over a fixed vacuum platen 26. The vacuum holds the media path 54 flush with the top of the platen to accurately retain the media in the media path 54.

Opposite the fixed vacuum platen 26 are five printhead modules 42, 44, 46, 48 and 50 which span the width of the media path 54. The printhead modules are not end-to-end but rather staggered with two of the printhead modules 44, 48 upstream of the printhead modules 42, 46 and 50.

Immediately downstream of the fixed vacuum platen 26 is a vacuum belt assembly 20. The vacuum belt assembly provides a second media transport zone (the first being the input drive roller 16). The vacuum belt assembly 20 creates a movable platen that engages the non-printed side of the media 5 and pulls it out of the print zone 14 (see FIG. 3) once the trailing edge of the media 5 disengages from the input drive rollers 16.

A scanning head 18 is downstream of the vacuum belt assembly 20. When a new printhead module is installed, a test print is fed passed the scanning head 18. The dot pattern in the test print is scanned and the supervising driver PCB (described below) digitally aligns the print from each of the printhead modules.

Figure 3:
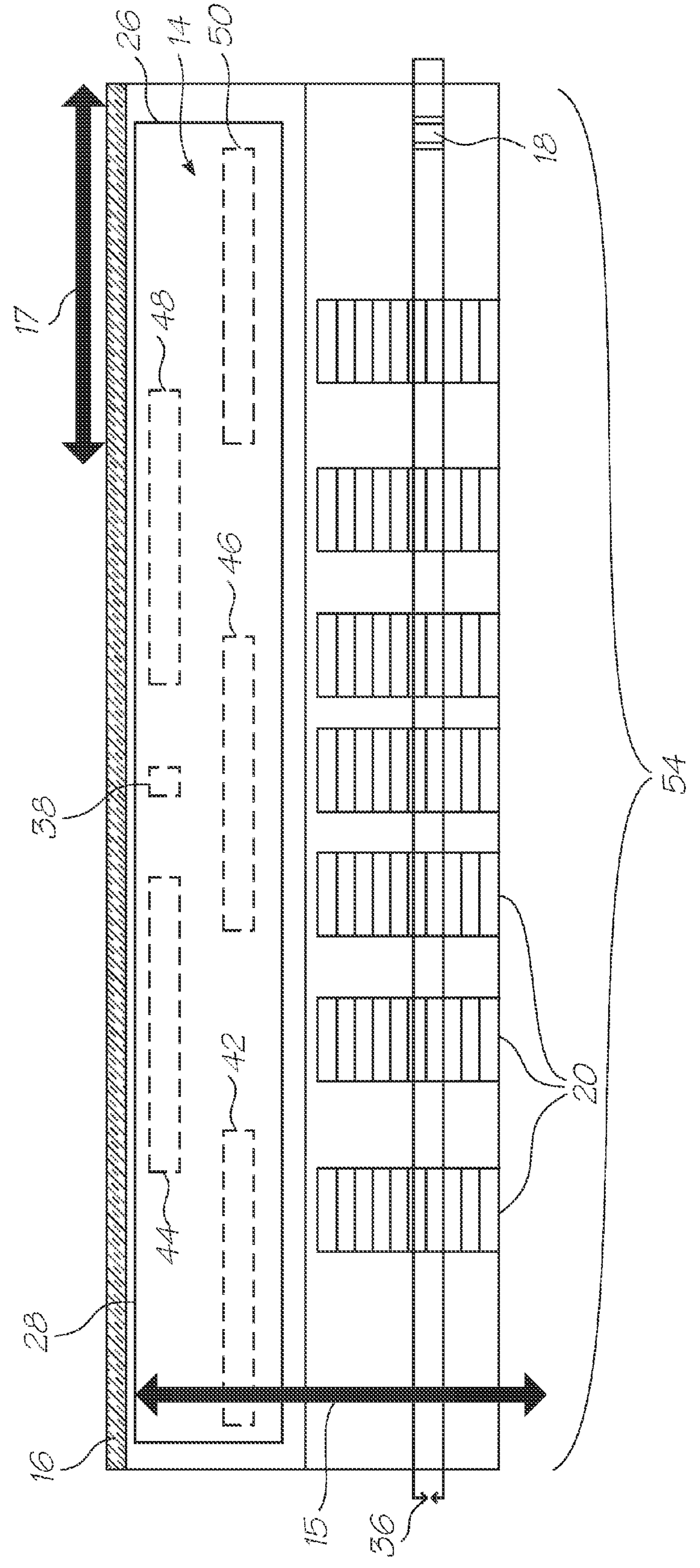
FIG. 3 is a diagrammatic representation of the print zone, printhead modules, vacuum belts and input drive roller.

FIG. 3 is a schematic representation of the platen assembly 28. The five printhead modules 42-50 staggered across the 42" wide media path 54. The printhead modules are staggered because their respective service modules 22 can not be aligned flush end-to-end. Drive mechanisms (described below) extend from the longitudinal ends of each service module 22. Furthermore, the printhead modules need to overlap with each other in a direction 17 transverse to the paper feed axis 15. Printing in the overlap between adjacent printhead modules is controlled by the supervising driver PCB to 'stitch' the print together without artifacts.

Figure 4:
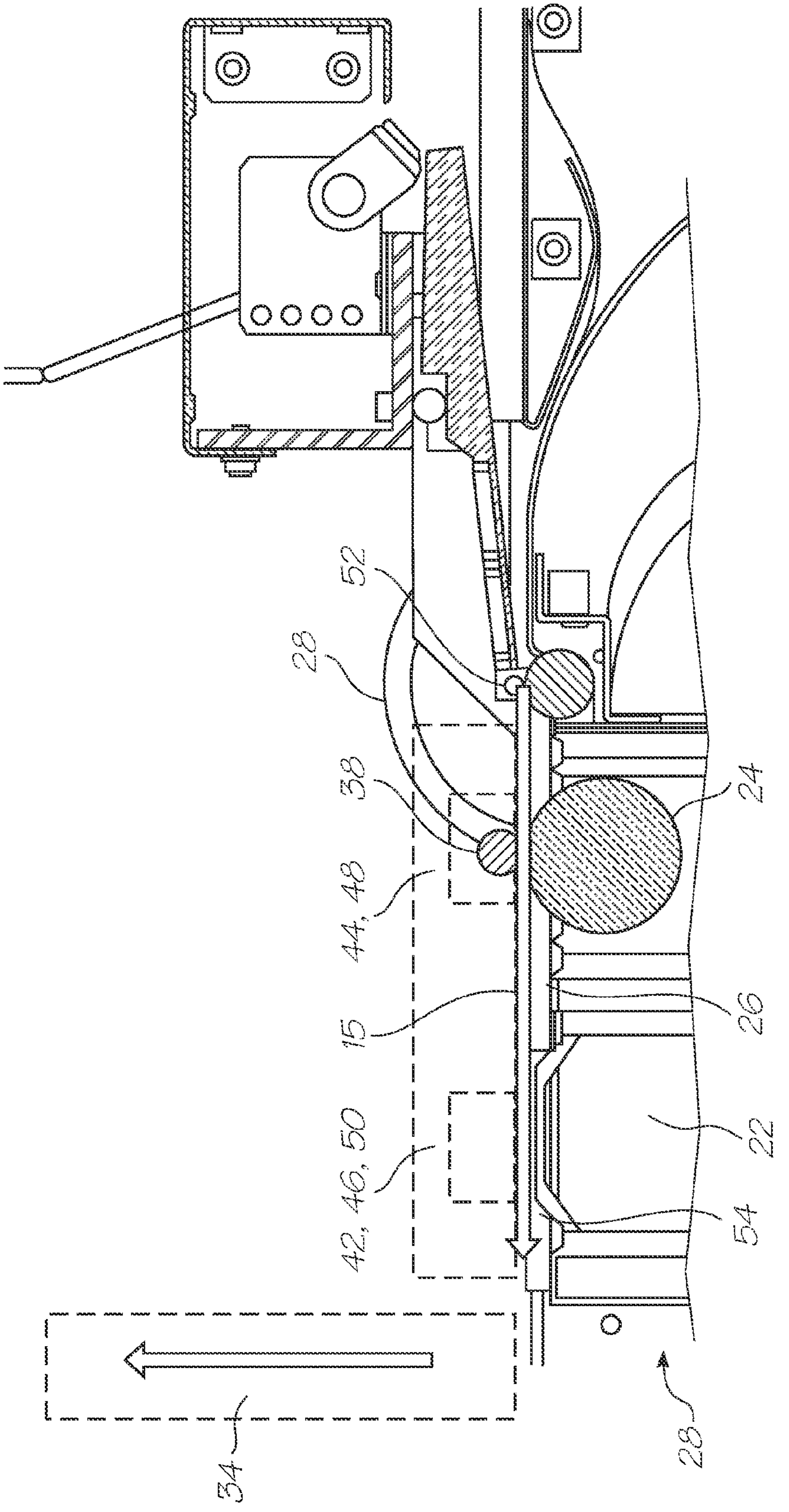
FIG. 4 is section 4-4 indicated in FIG. 3.

FIG. 4 shows the location of one of the service modules 22 embedded with the fixed vacuum platen 26. Their structure and operation is described more fully below. These modules can extend through the media feed path 54 to cap or wipe the nozzles on their respective printhead modules 42 to 50. They can also retract away from the printhead modules to provide a spittoon, vacuum platen, and/or aerosol collector.

Staggering the printhead modules increases the size of the print zone 14 which is not ideal. Maintaining a uniform printing gap (the gap between the nozzles and the surface of the media substrate) becomes more difficult as the area of the print zone increases. However, as the printhead IC's (described below) have a narrow nozzle array (less than 2 mm wide) that prints five channels, the full color printhead assembly for 42" wide media, has a print zone less than 129032 square mm (200 square inches). In the particular embodiment described, the print zone 14 has a total area of 114.5 square inches. A relatively small print zone 14 allows the fixed vacuum platen 26 to be smaller and less force is required by the input drive roller 16 to push the media through the print zone. For a print zone less than 129032 square mm (200 square inches), the vacuum pressure exerted on the media can be less than 0.2 psi. In the specific example shown, the fixed vacuum platen 26 operates a vacuum in the range of 0.036 psi to 0.116 psi. This equates to a normal force on the media of between 4 lbs and 13.5 lbs.

The input driver roller 16 is a grit shaft that pushes the media into the print zone 14. Opposite the input drive roller 16 is an input drive pinch roller to ensure sufficient friction between the media surface and the surface grit of the input drive roller.

The scanning zone 36 is the strip traversed by the scanning head 18 over the vacuum belt assembly 20. The vacuum belts keep precise control of the media position during the optical scan. By scanning the print of a test dot pattern, the scanning head 18 sends feedback to the supervising driver PCB to align drop ejections from adjacent printhead modules, update a dead nozzle map, compensate for misfiring nozzles, and other purposes directed toward optimizing system print quality.

The encoder wheel 24 is embedded in the fixed vacuum platen 26 between the two leading printhead modules 44 and 48. The area between the leading printhead modules 44 and 48 is an unprinted location so the encoder wheel 24 can roll against an encoder pinch roller 38. This also allows the media encoder to be as close as possible to the printheads, allowing for more accurate timing signals. The supervisor driver PCB uses the timing signal output from the encoder wheel 38 to time the drop ejections from the printhead modules. However, timing is also derived from encoders (described in more detail below) on the input drive shaft 16 and the vacuum belt drive shaft (see below) for periods when the media has not reached the encoder wheel 38 or the trailing edge has disengaged the encoder wheel 38.

The vacuum belt assembly 20 has a belt speed marginally higher than the media feed speed provided by the input drive roller 16. However, the engagement between the input drive roller 16 and the media is stronger than the engagement between the media and the vacuum belts. Consequently, there is slippage between the media and the belts until the trailing edge of the media disengages from the input drive roller. The vacuum belts provide a moving platen that engages one side of the media only so there is no risk to the print quality. Furthermore, the period of transport across the vacuum belts provides the ink with drying time.

The leading edge of the media 8 (see FIG. 1) is held flush on the belts by the vacuum so that the scanner head 18 can properly image the printed dot pattern. Having the vacuum belt assembly 20 pulling the media from the print zone 14 is another mechanism by which the media is kept flush on the fixed vacuum platen 26.

In the wide format printer described below, the vacuum belt area, when printing 42" wide media is 42.5 square inches. The vacuum pressure is between 0.036 psi and 0.45 psi which is relatively small. This keeps the normal force on the media below a maximum of 20 lbs.

Aerosol is collected using an upper aerosol collector 34 from above the media path 54 and the service modules 22 from below the media path. With the printhead modules ejecting droplets of less than 2 pico-liters at fast print speeds, there is a high production of aerosol which is misfired droplets that become airborne particulate. This needs to be removed to prevent aerosol build up on components and eventual smearing on the media surface.

Print Engine

Figure 5:
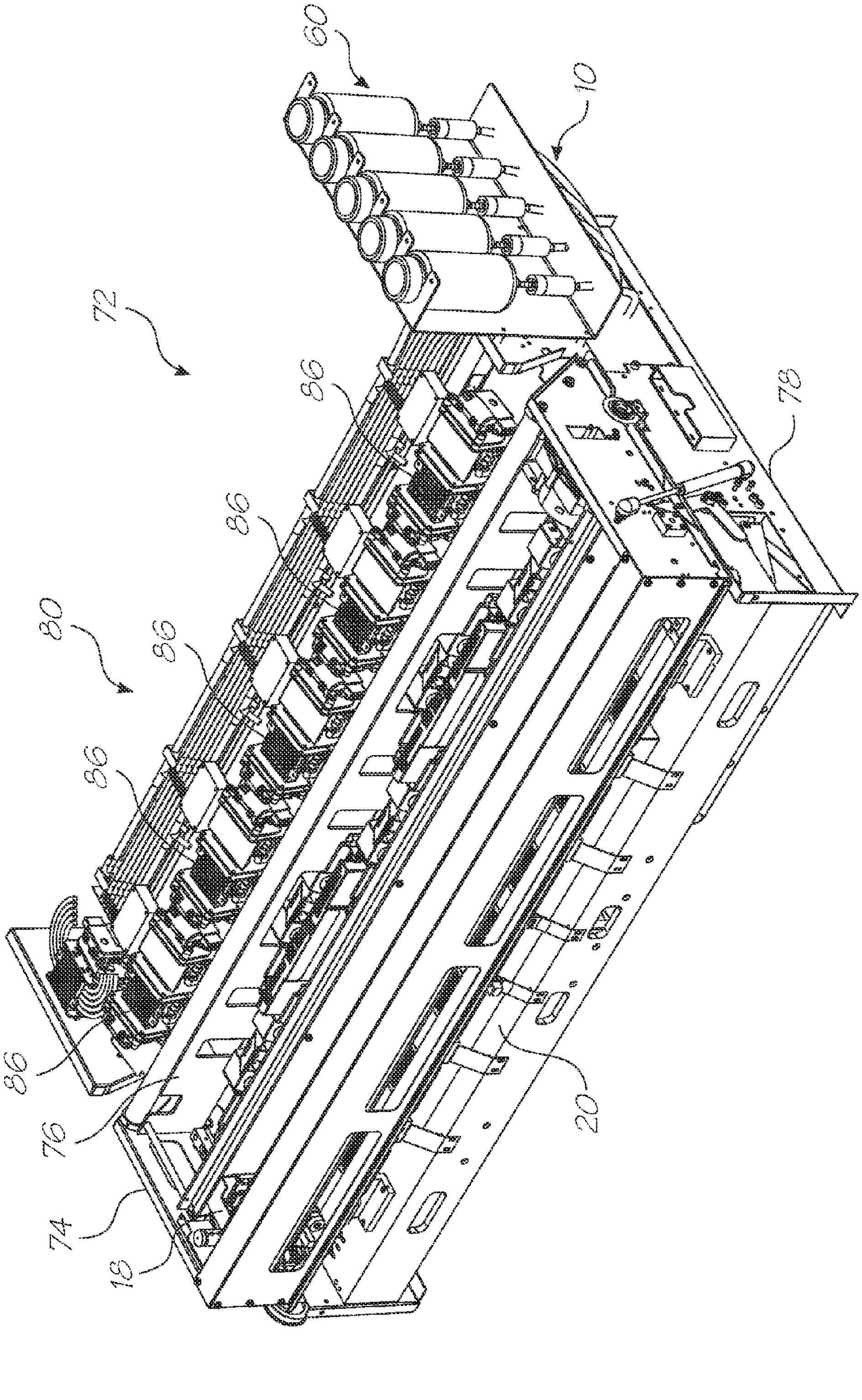
FIG. 5 is a front and top perspective of a print engine.
Figure 6:
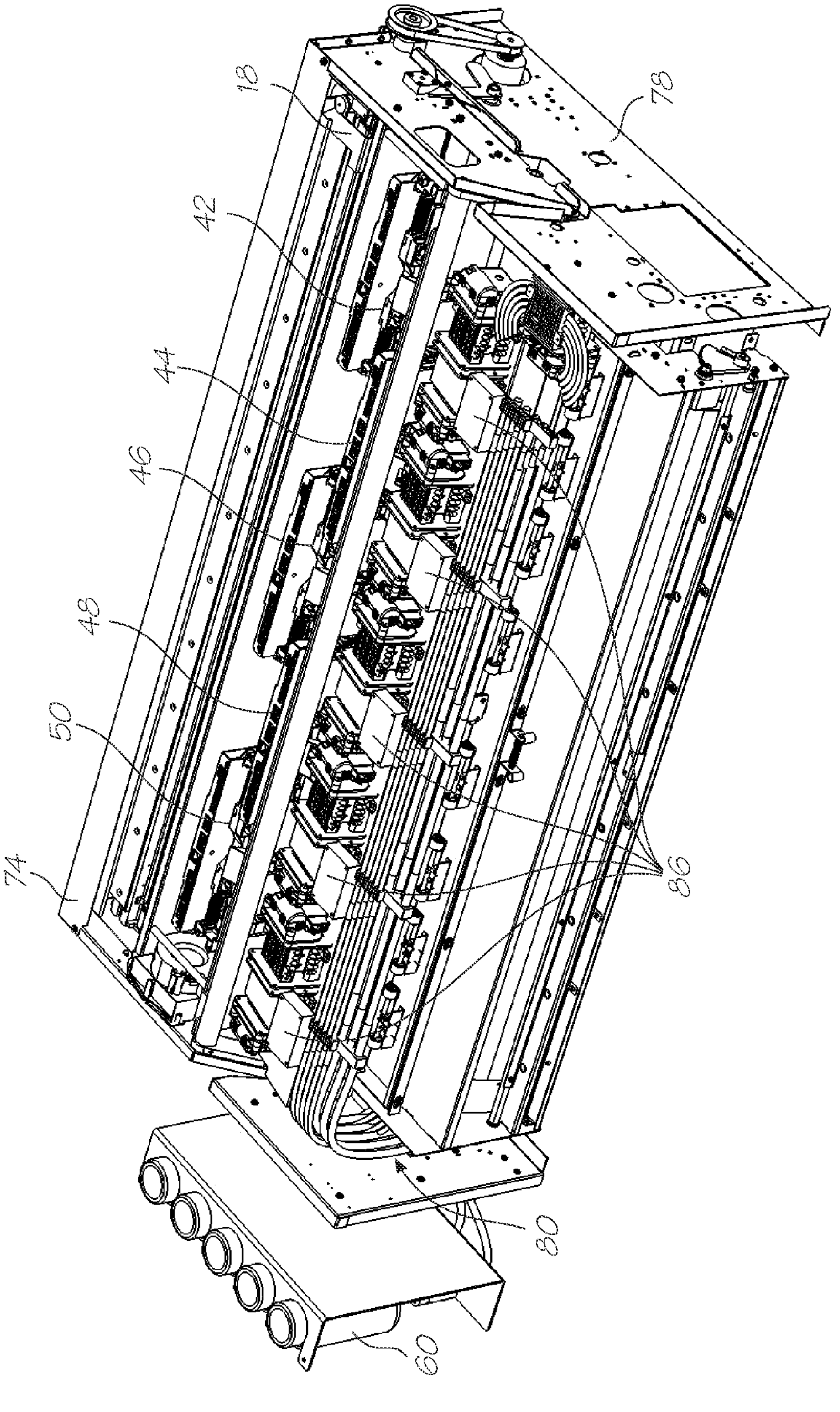
FIG. 6 is a side and top perspective of a print engine.
Figure 7:
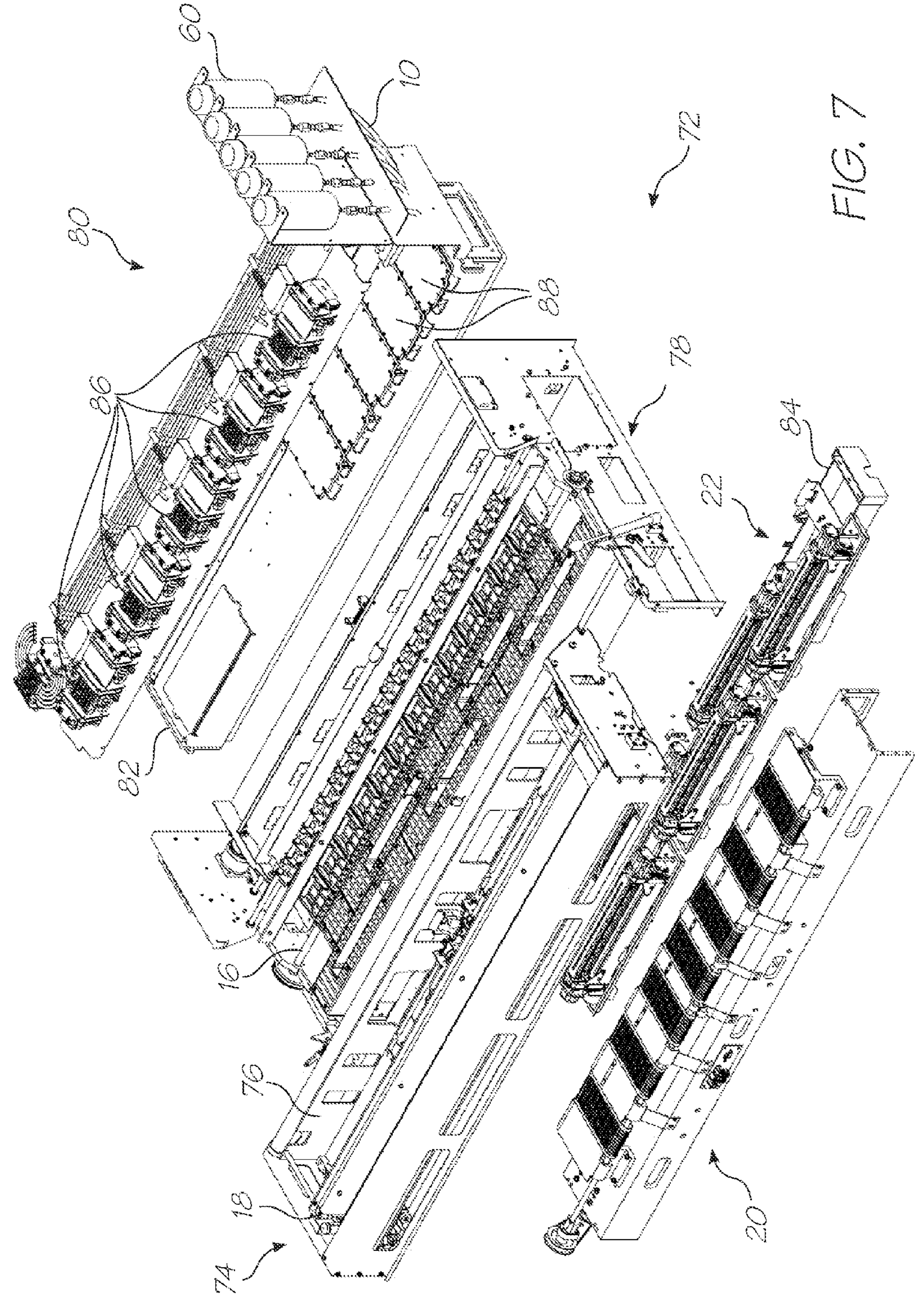
FIG. 7 is an exploded perspective of the print engine shown in FIG. 5.

FIGS. 5 and 6 are perspectives of the wide format print engine 72 in its entirety. FIG. 7 is an exploded perspective of the wide format print engine 72. The major components of the print engine 72 are the upper path assembly 74 including the datum printhead carriage 76, the lower paper path assembly 78 including the vacuum belt assembly 20, the upper ink distribution assembly 80 including the ink bottles 60 and pinch valves 86, and the lower ink distribution assembly 82 including the ink tanks 88.

Lower Paper Path Assembly

Figure 8:
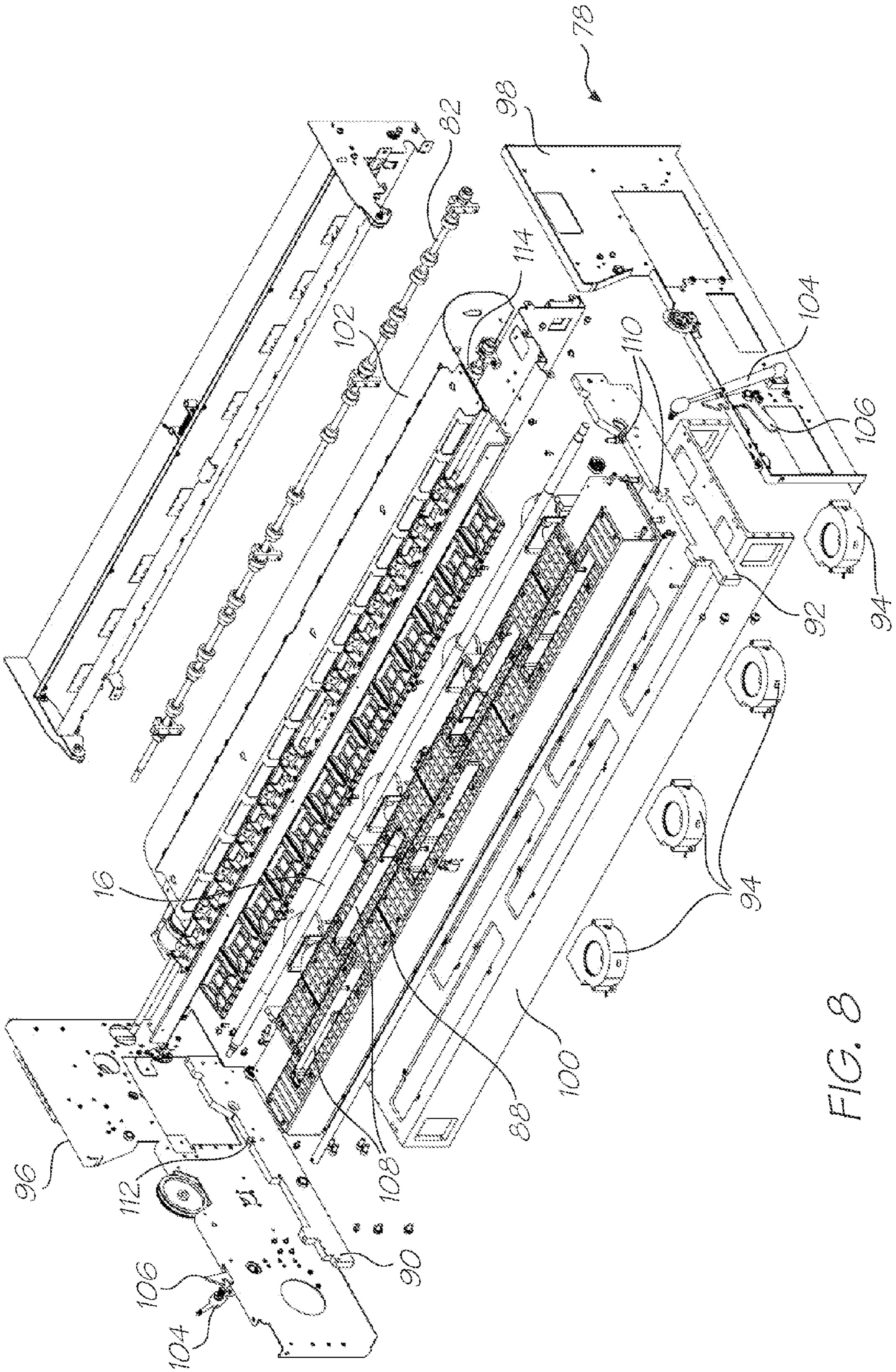
FIG. 8 is an exploded perspective of the lower paper path assembly.

FIG. 8 is an exploded perspective of the lower paper path assembly 78 without the vacuum belt assembly 20 or the service modules 22. The input drive shaft 16 and pinch roller 52 are supported between a left side chassis plate 96 and a right side chassis plate 98. The bale feed roller 114 drives the media over the input paper guide 102 and through the nip between the input drive roller 16 and pinch roller 52. Vacuum table 88 is directly downstream of the input drive roller 16. Service apertures 108 in the vacuum table 88 house the five service modules 22 (see FIG. 5). The vacuum table 88 is mounted directly on a datum C-channel 100 mounted between the chassis plates 96 and 98. Vacuum blowers 94 create a low pressure beneath the vacuum table 88 to hold the non-printed side media.

On both sides of the datum C-channel 100 is a left datum plate 90 and a right datum plate 92. The left datum plate 90 has a single datum location 112 and the right datum plate has two datum locations 110. The datum features on the printhead carriage (described below) sit in the datum locations 110 and 112 to hold the printhead modules 42-50 at the correct printing gap. Latches 106 hold the upper paper path assembly 74 in position on the lower paper path assembly 78. Unlocking the latches 106 allows the upper paper path assembly 74 to be lifted up from the lower paper path assembly 78 and held in an elevated position by spring loaded gas struts 104.

Upper Paper Path Assembly

Figure 9:
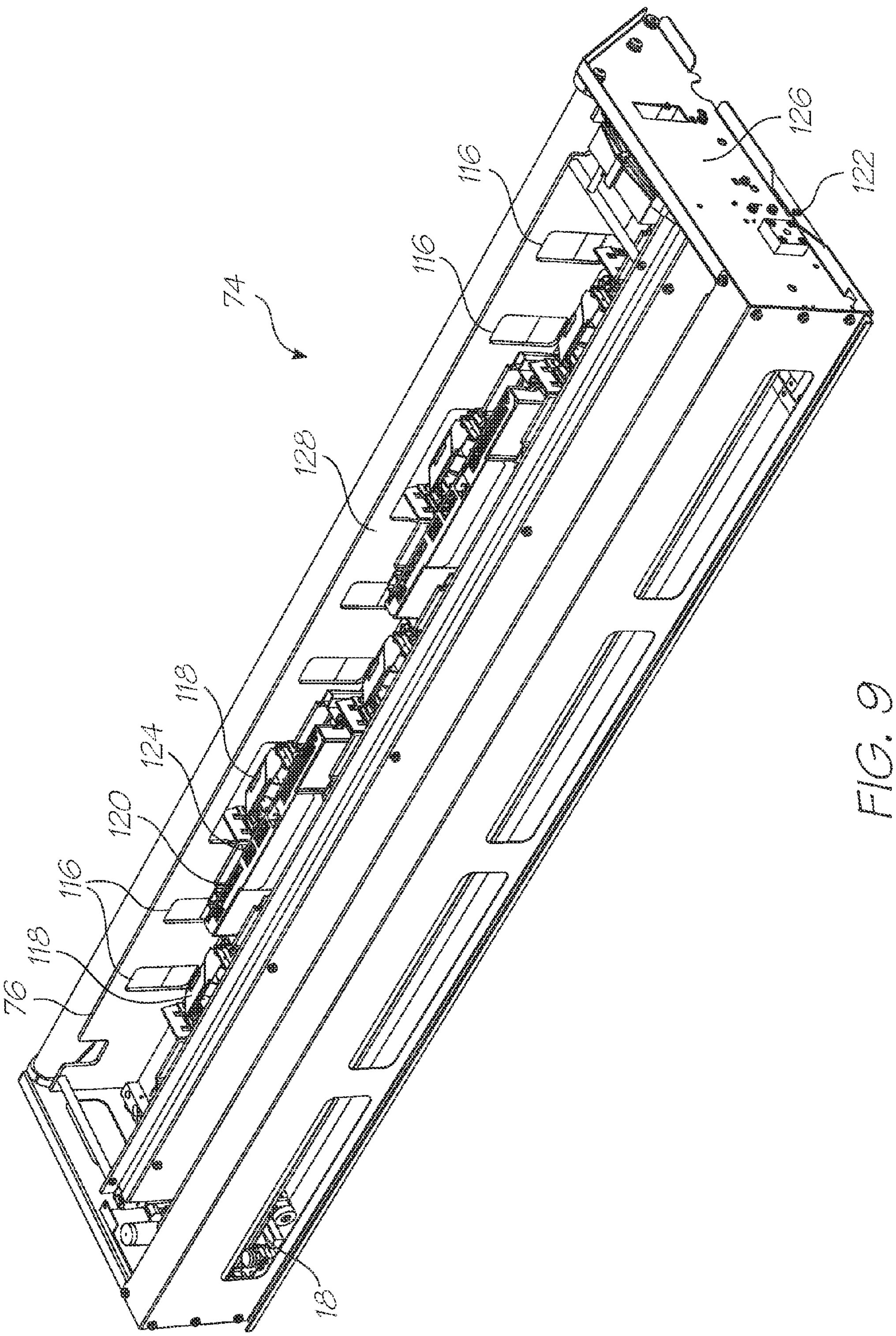
FIG. 9 is a perspective of the upper paper path assembly.

FIG. 9 is a perspective of the upper paper path assembly 74. The chassis frame 126 holds the printhead carriage 76 and the scanner assembly 18. At either side of the chassis frame 126 are gas strut mounting points 122 where the gas struts 104 (see FIG. 8) connect. The printhead carriage 76 is a housing for the five printhead modules 42-50 (see FIG. 3), their respective ink interfaces 124 and electrical connection units 120. The rear wall 128 of the printhead carriage 76 has tubing apertures 116 for ink supply tubes. Electrical cabling plugs into the cable sockets 124 on the top side of each electrical connection unit 120.

Printhead Carriage

Figure 10:
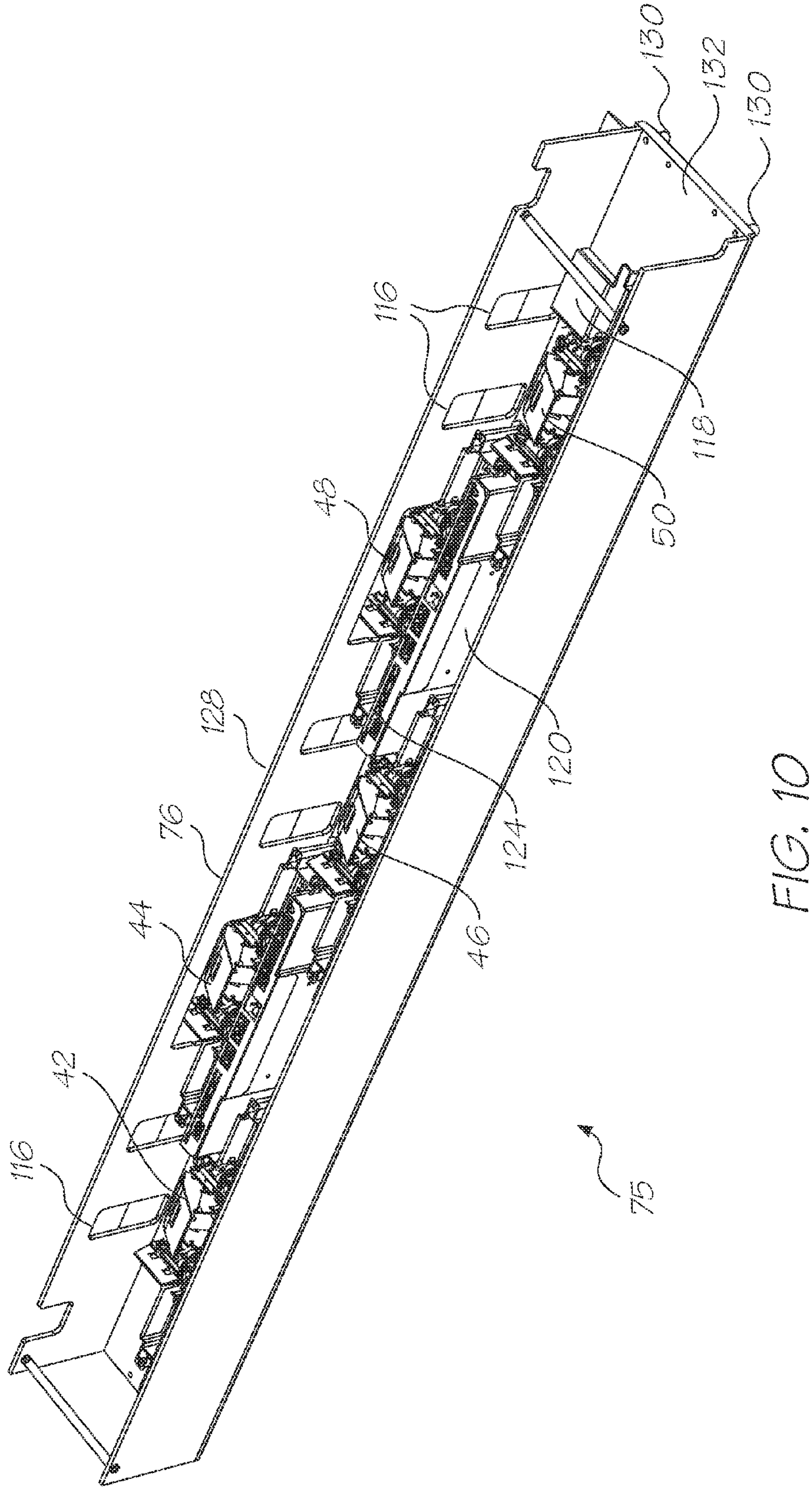
FIG. 10 is a perspective of the pagewidth printhead assembly.

FIG. 10 is a perspective of the printhead assembly 75 in which the printhead carriage 76 supports the five printhead modules 42-50. Also shown are the conventional XYZ axes oriented in their usual manner in the field of printer design. The printhead carriage 76 is a machined extrusion with three datum features 130 fixed to the underside of the floor section 132 (only the two right hand side datum features 130 are visible). The floor section has apertures (not shown) to expose the nozzles on the printhead modules 42-50 to the media or the service modules 22. The printhead modules (described below) abut the top side of the floor section 132 and use it as a Z-datum. The datum features 130 sit in the left and right Z datum point 110 and 112 (FIG. 8) fixed to the datum C-channel 100. The datum features 130 hold the printhead carriage 76 such that the parallel rows 270 of nozzles 271 (see FIG. 27) extend normal to the paper axis. This provides a relatively simple construction that maintains precise tolerances in the printing gap across all the printhead modules. Alignment of the printhead modules in the X direction is less critical as the transverse overlap between adjacent modules is an area where the print from each module is 'stitched' together under the control of the supervising driver PCB.

Printhead Modules and Printhead Cradles

Figure 11:
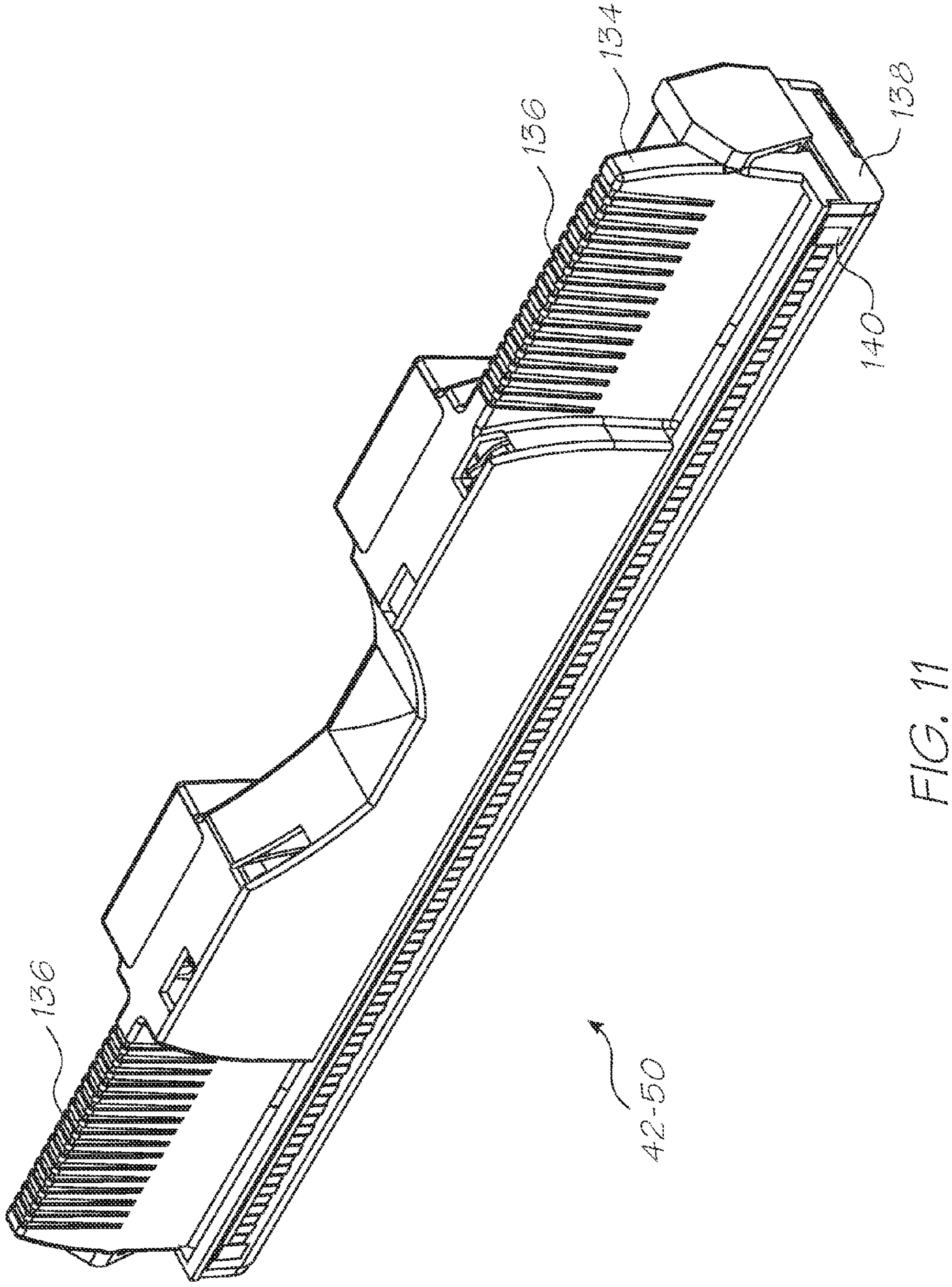
FIG. 11 is a front perspective of a printhead module.
Figure 12:
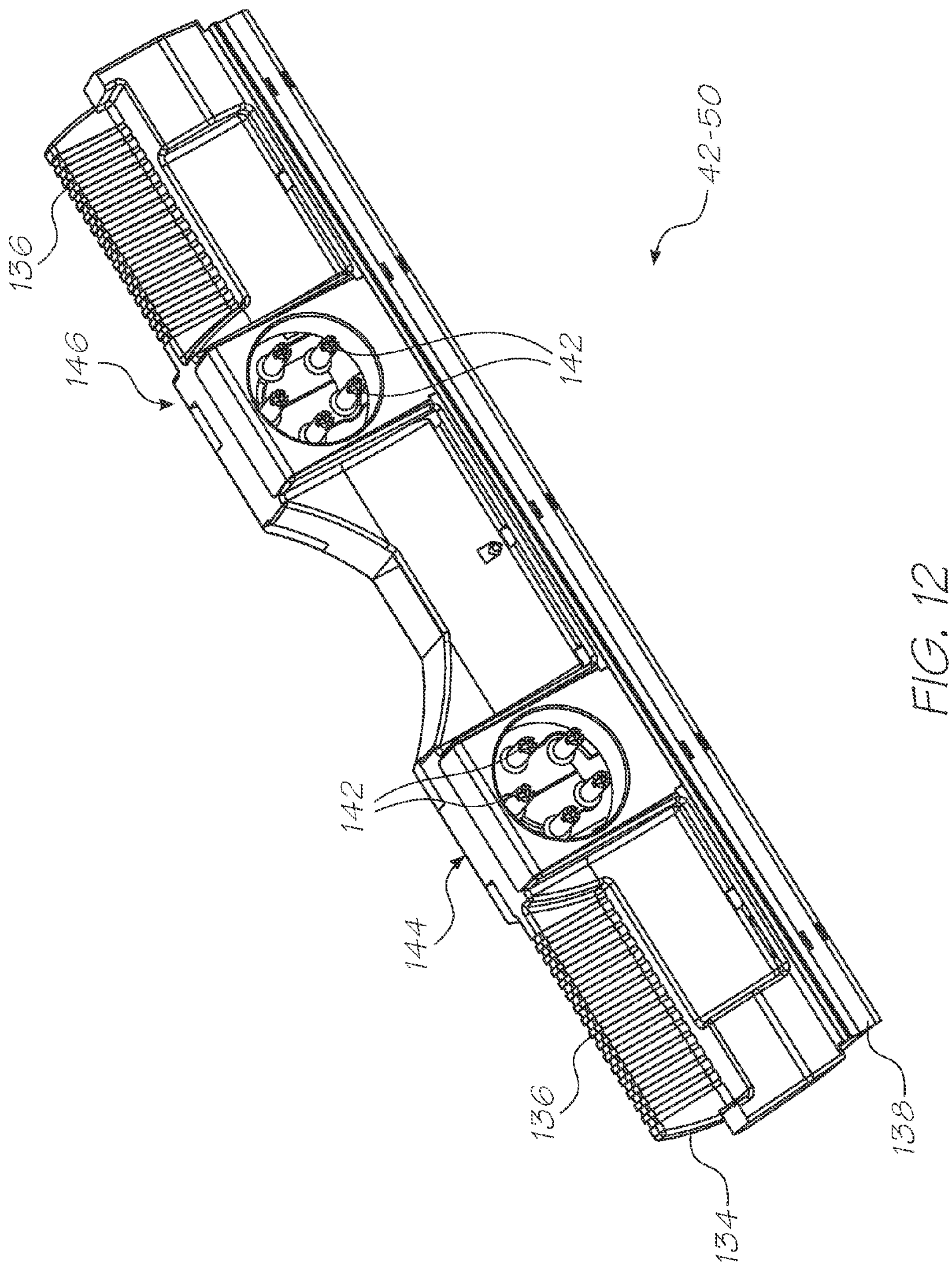
FIG. 12 is a rear perspective of a printhead module.
Figure 13:
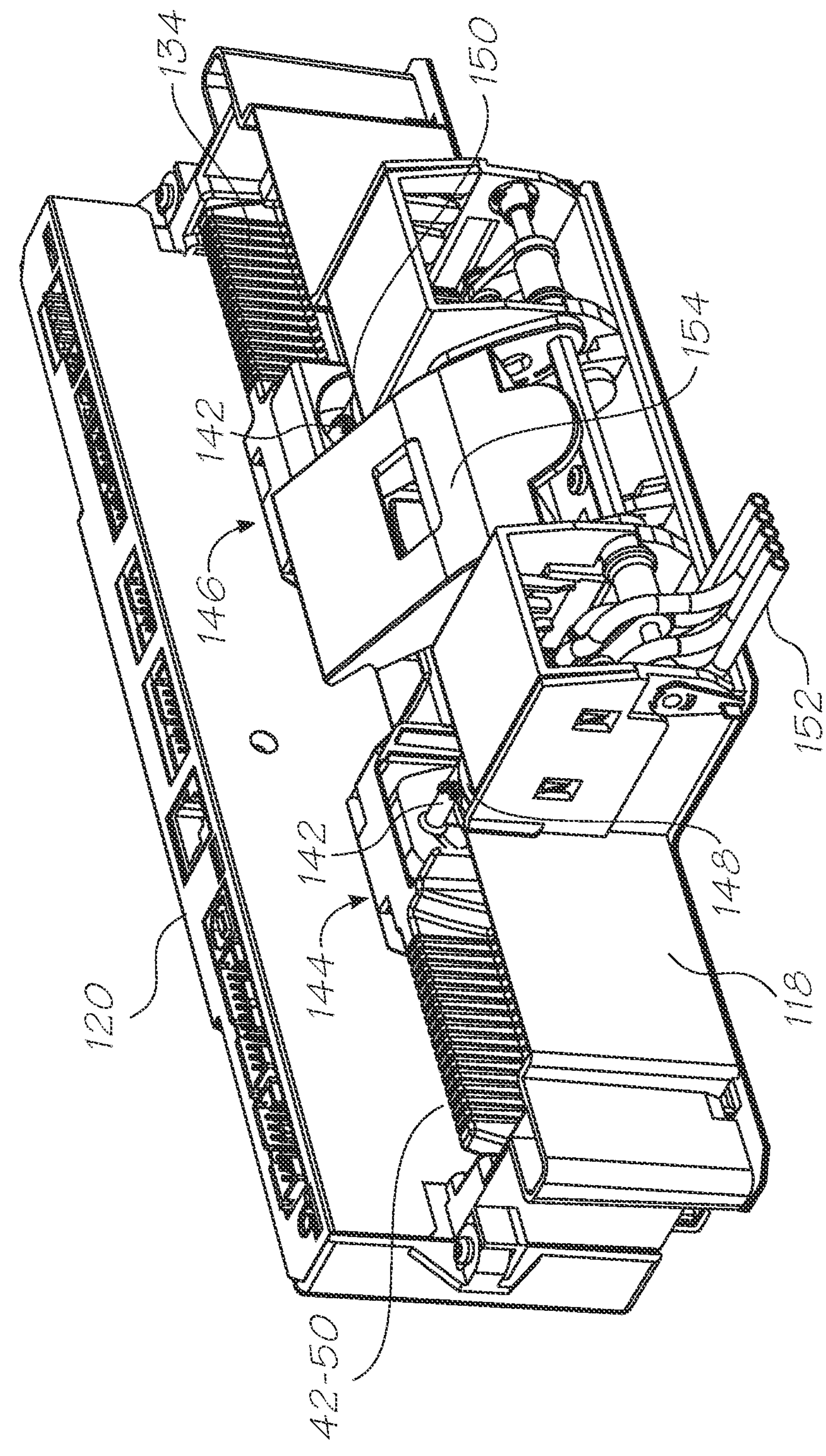
FIG. 13 is a rear perspective of a printhead cradle and printhead module.
Figure 14:
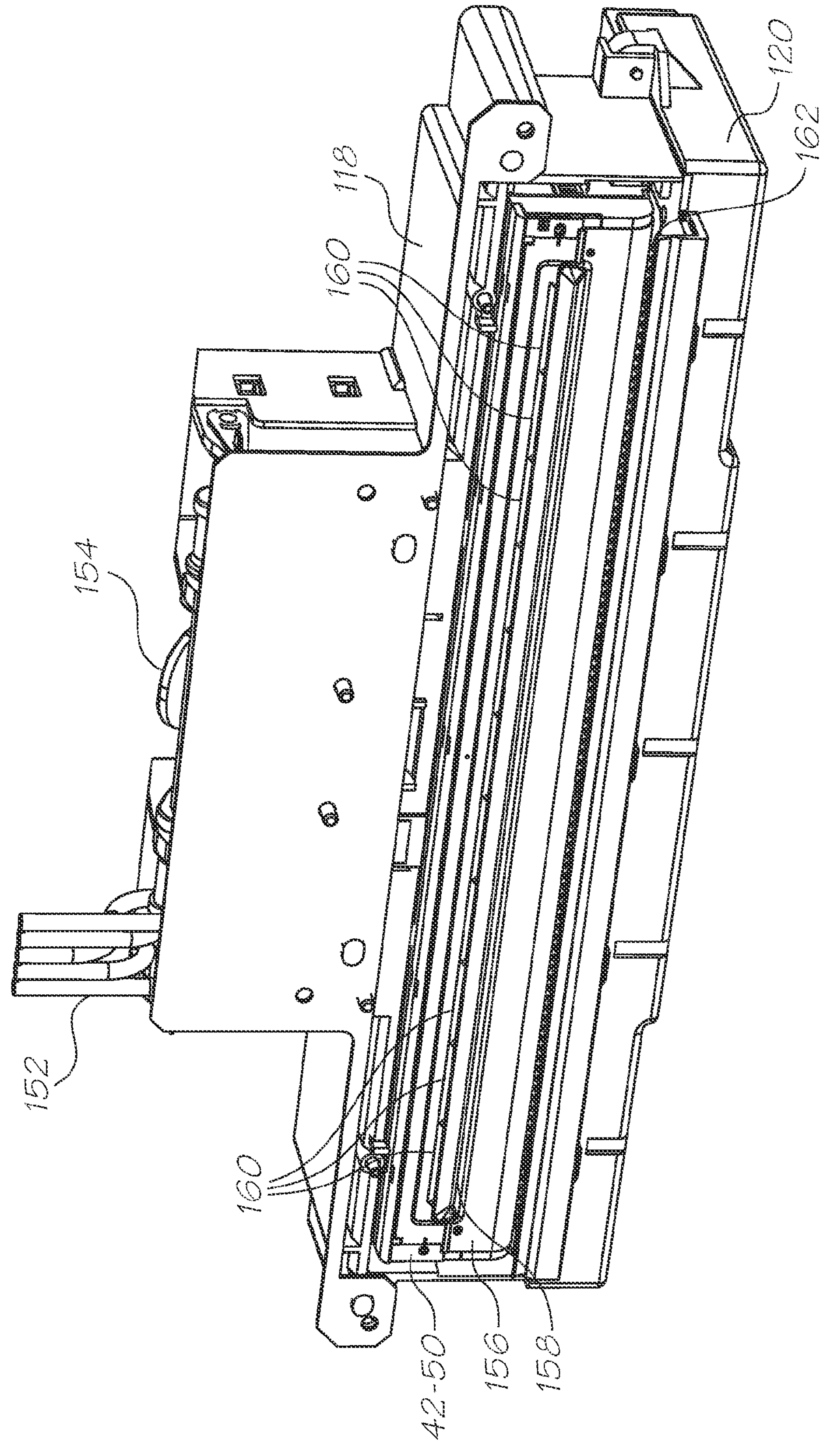
FIG. 14 is a bottom perspective of a printhead cradle and the printhead module.

FIGS. 11 and 12 are perspectives of one the printhead modules 42-50. FIGS. 13 and 14 show a printhead module installed between its respective ink supply interface 118 and electrical connection unit 120. The printhead modules are a user replaceable component of the printer and very similar to the printhead modules disclosed in U.S. Ser. No. 12/339,039 filed Dec. 19, 2008 the contents of which are incorporated herein by reference. The printhead module is for an A4 SOHO (Small Office/Home Office) printer whereas the printhead module shown in FIGS. 11 and 12 has the inlet and outlet sockets 144 and 146 shifted towards the middle of the module for unobstructed ink tube routing to the multiple printhead modules of a pagewidth wide format printer.

The printhead modules 42-50 have a polymer top moulding 134 on an LCP (liquid crystal polymer) moulding 138 which support the printhead ICs (described below). The top moulding 134 has an inlet socket 144 and an outlet socket 146 in fluid communication with ink feed channels through the LCP moulding 138. The top moulding 134 also has a grip flange 136 at either end for manipulating the module during installation and removal. The ink inlet and outlet sockets (144 and 146) each have five ink spouts 142—one spout for each available ink channel. In this case, the printer has five channels; CMYKK (cyan, magenta, yellow, black and black).

The ink spouts 142 are arranged in a circle for engagement with the fluid couplings 148 and 150 in the ink interface 118. FIG. 13 shows the printhead module between the ink interface 118 and the electrical connection unit 120. The fluid coupling 148 and 150 are in a retracted position where they are disengaged from the ink spouts 142. Ink is fed to the fluid couplings via tube bundles 152 (only the tube bundle to the input fluid coupling is shown for clarity). By depressing the fluid coupling actuation lever 154, both the fluid couplings simultaneously advance to an extended position where they form a sealed fluid connection with each of the ink spouts 142. The ink interface 118, the electrical connector 120 and the floor 132 of the datum C-channel 100 create a cradle for each of the printhead modules 42-50. To remove a printhead module, the fluid couplings 148 and 150 are retracted and the user grips the flange 136 to lift it out.

FIG. 14 shows the underside of the printhead module 42 between the ink interface 118 and the electrical connection unit 120. The electrical connection unit 120 provides power and data to the printhead module though a line of sprung electrodes 162. The electrodes 162 are positioned to resiliently engage contact pads 140 on a flex PCB (flexible printed circuit board) 156 secured to the LCP moulding 138. Conductive traces in the flex PCB 156 lead to a series of wire bonds sealed in a bead of encapsulant 158. The wire bonds connect the flex PCB 156 to the line of eleven printhead IC's 160. Each printhead IC 160 has a nozzle array with nozzles arranged in parallel rows extending normal to the paper axis (i.e. the paper feed direction in the print zone). The lithographic etching and deposition steps to fabricate suitable printhead IC's 160 are disclosed in U.S. Ser. No. 11/482,953 filed Jul. 10, 2006, the contents of which are incorporated herein in its entirety. The printhead ICs 160 are less than 2 mm wide and each have at least one nozzle row for each color channel. Consequently, the wide format printer needs only two staggered rows of printhead modules to provide a pagewidth printhead assembly. This in turn allows the print zone and fixed vacuum platen 26 to have a small surface area.

Figure 15:
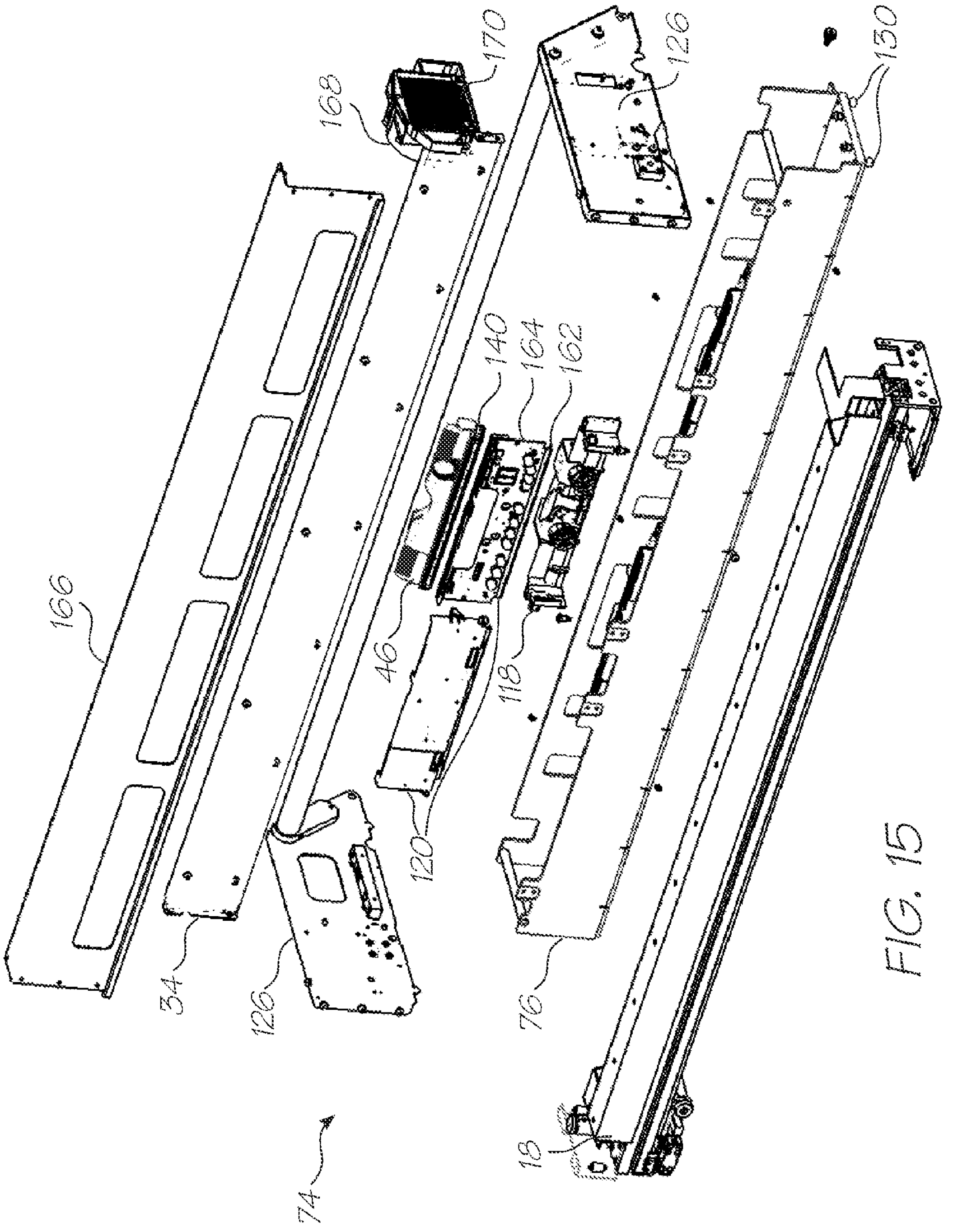
FIG. 15 is an exploded rear perspective of the upper paper path assembly.
Figure 16:
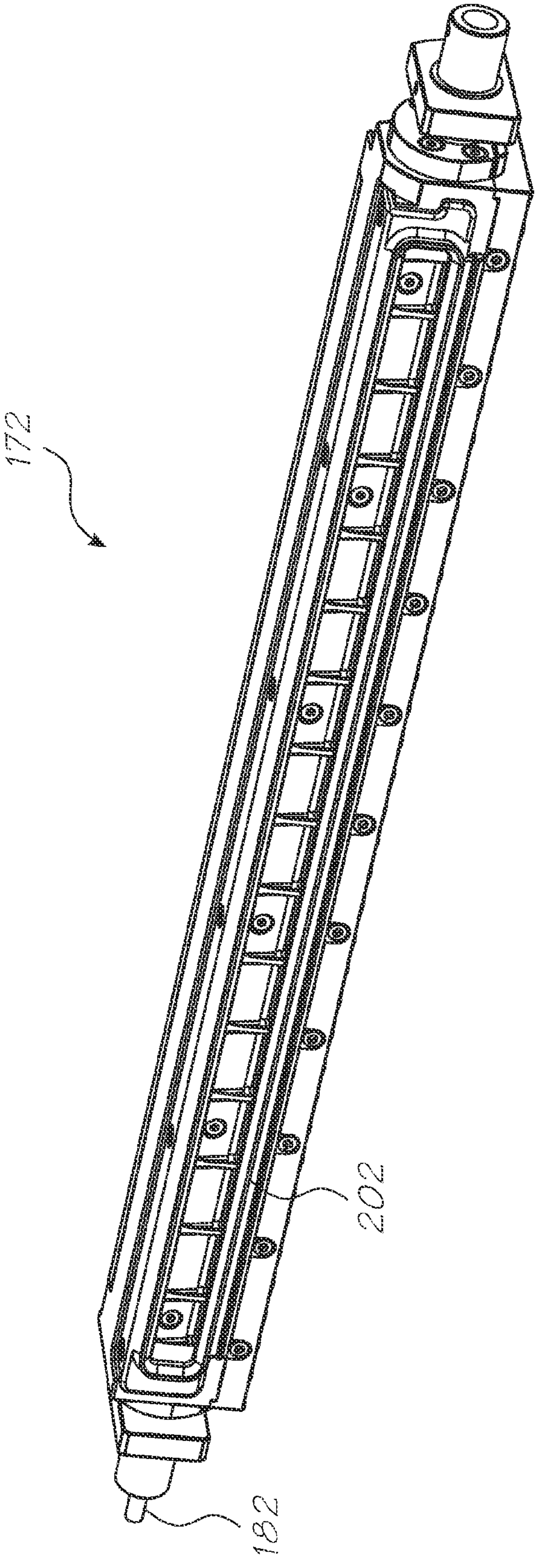
FIG. 16 is a perspective of the servicing carousel in isolation.
Figure 17:
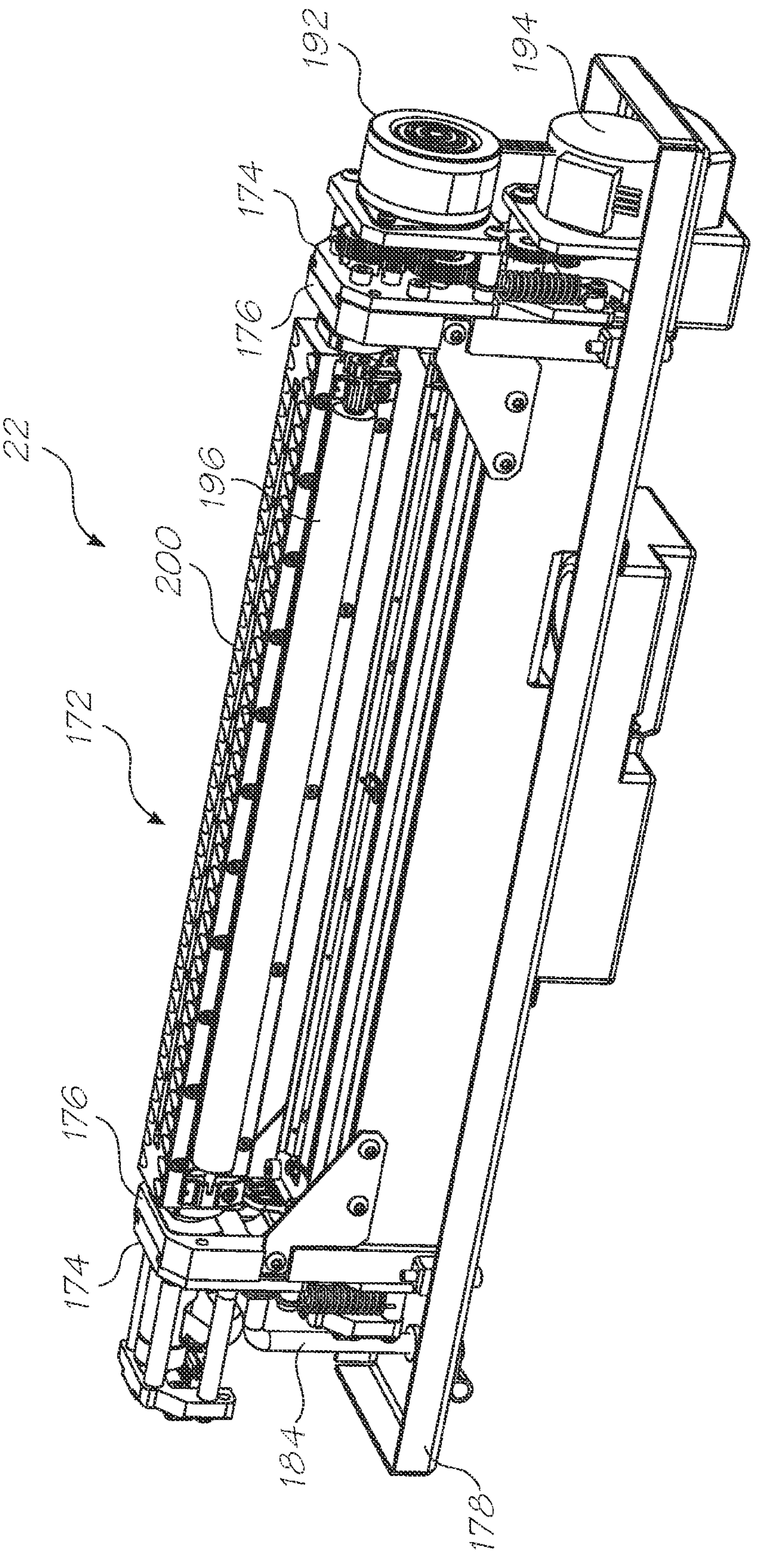
FIG. 17 is a top perspective of a service module.
Figure 18:
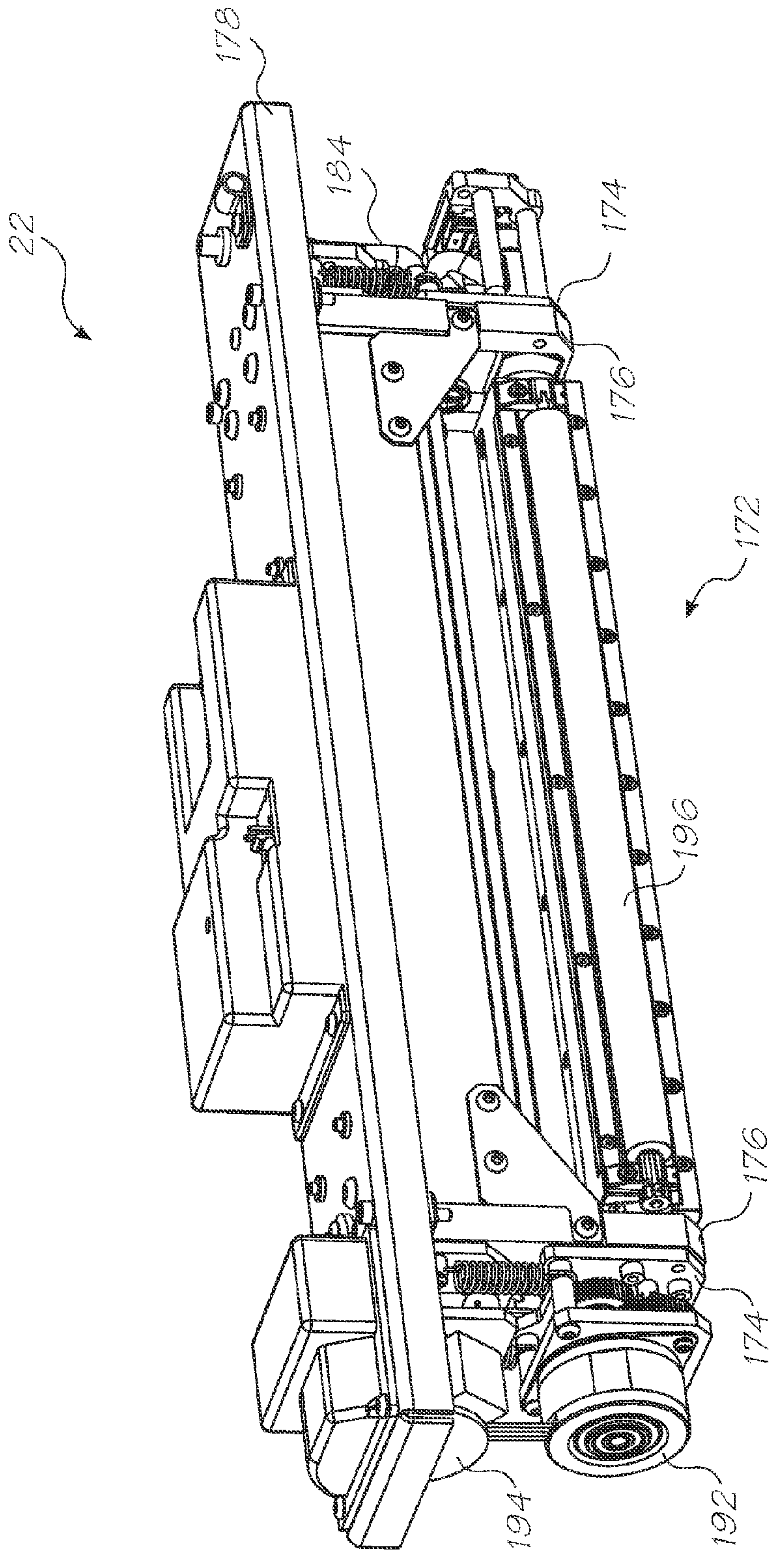
FIG. 18 is a bottom perspective of a service module.

FIG. 15 is an exploded perspective showing the printhead module 46, electrical connector 120 and ink interface 118 in the broader perspective of the upper paper path assembly 74. Inside each of the electrical connectors 120 is a printhead driver PCB 164 with traces to the line of sprung electrodes 162. The printhead driver PCB 164 controls the printing operation of the printhead module 46 to which it is connected. All the printhead driver PCBs 164 collectively operate under the overriding control of the supervising driver PCB described in more detail below.

Upper Aerosol Collector

FIG. 15 also shows the upper aerosol collector 34 which mounts to the chassis 126 in front of the cover 166 for scanner 18. The aerosol exhaust fan 168 creates airflow away from the printed surface of the media and vents though the filter 170. Airborne ink particulates are entrained in the airflow and collected in the filter 170.

Printhead Service Modules

FIGS. 16 to 20 show one of the service modules 22 in detail. The rotating carousel 172 has three separate printhead maintenance stations—a capper 202, a spittoon/vacuum platen 200 and a microfiber wiping roller 196. The carousel 172 is mounted for rotation between two sliding mounts 174. The carousel motor 192 rotates the carousel 172 until the appropriate maintenance station is presented to the printhead. The carousel 172 is lifted and lowered by the lift cams 188 bearing against the sliding mounts 174 which slide within the block guides 176. The block guides 176 are mounted to the base tray 178 which in turn sits in one of the apertures in the top of the datum C-channel 100 (see FIG. 8).

The lift cams 188 are keyed to the cam shaft 190 mount for rotation in the block guides 176. The cam shaft is driven by the lift motor 194. The angular rotation of the cam shaft 190 is sensed by a lift cam sensor 186 and the rotation of the carousel 172 is monitored by the carousel sensor 198. The outputs from these sensors report to the service PCB 204 which coordinates the operation of the lift motor 194 and the carousel motor 192 to provide the various service functions under the over-riding control of the supervisor driver PCB (see FIG. 39). For example, capping requires the carousel motor 192 to rotate the carousel 172 such that the capper 202 presents to the printhead, and then the lift motor 194 to rotate the lift cams 188 to their lifted angular displacement such that the capper extends proud of the vacuum table 88, through the media path 54 and into contact with the printhead module 42-50.

The carousel motor 192 also rotates the wiping roller 196 during a wiping operation to clean away flooded ink and paper dust. Microfiber is a suitably absorbent roller material which readily removes ink and contaminants from the printhead ICs 160 without damage to the delicate nozzle structures themselves. Microfiber also readily releases the ink it accumulates when the wiper roller 196 is drawn across the doctor blade 180 fixed between the block guides 176.

The core of the carousel 172 can also hold a quantity of waste ink. By forming the core from a porous material such as Porex™ and incorporating cavities gives the carousel capacity for ink ejected as 'keep wet drops' (i.e. ink drops ejected for the purposes of preventing a nozzle from drying out) or ink purges (i.e. high frequency overdrive ejections) for removing air bubbles, dried ink deposits and so on. The waste ink drains from the carousel 172 through the ink outlet 182 and into the sump feed tube 184.

Lower Aerosol Removal

Figure 19:
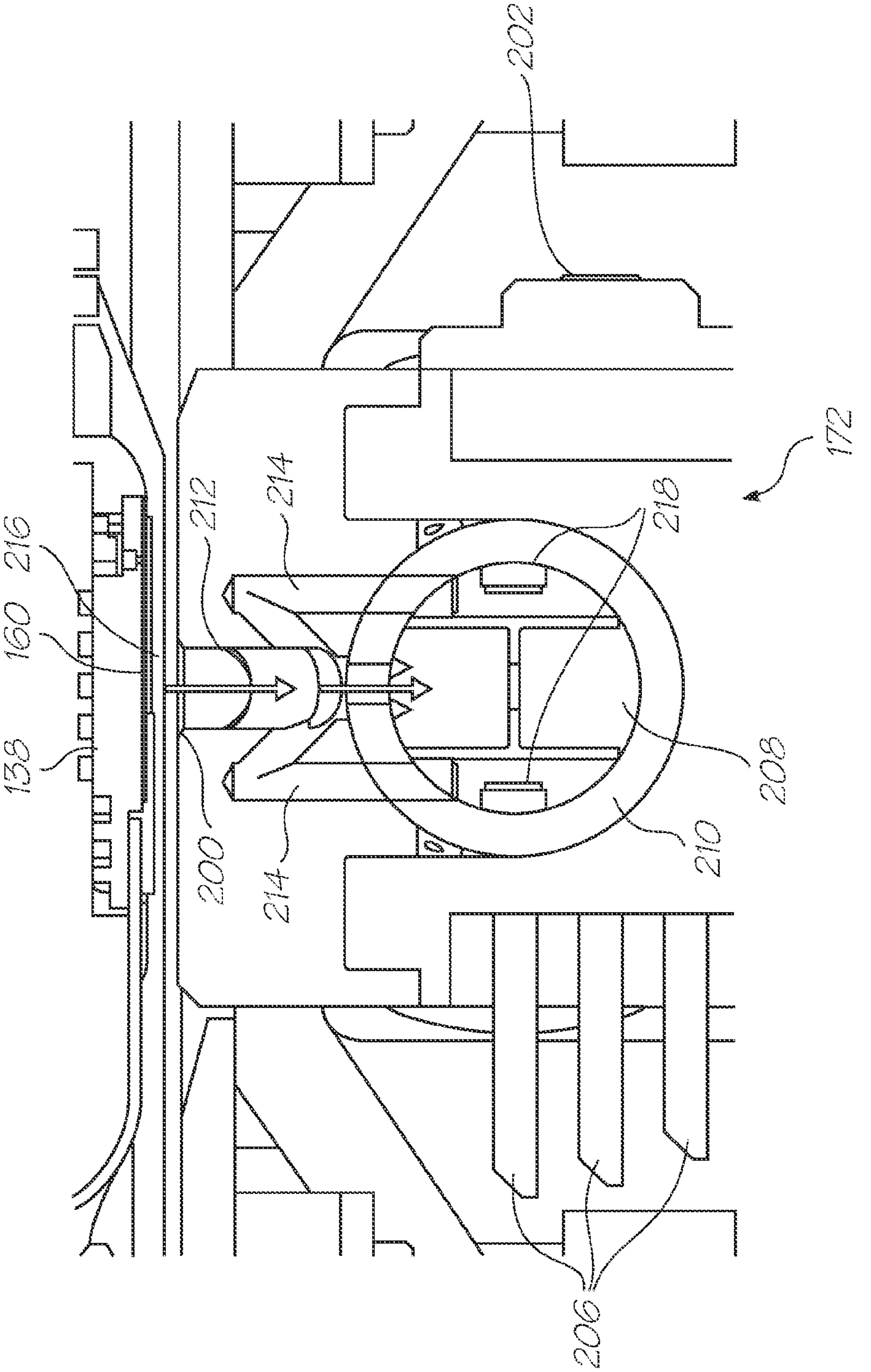
FIG. 19 is partial section view of another embodiment of the service module.
Figure 20:
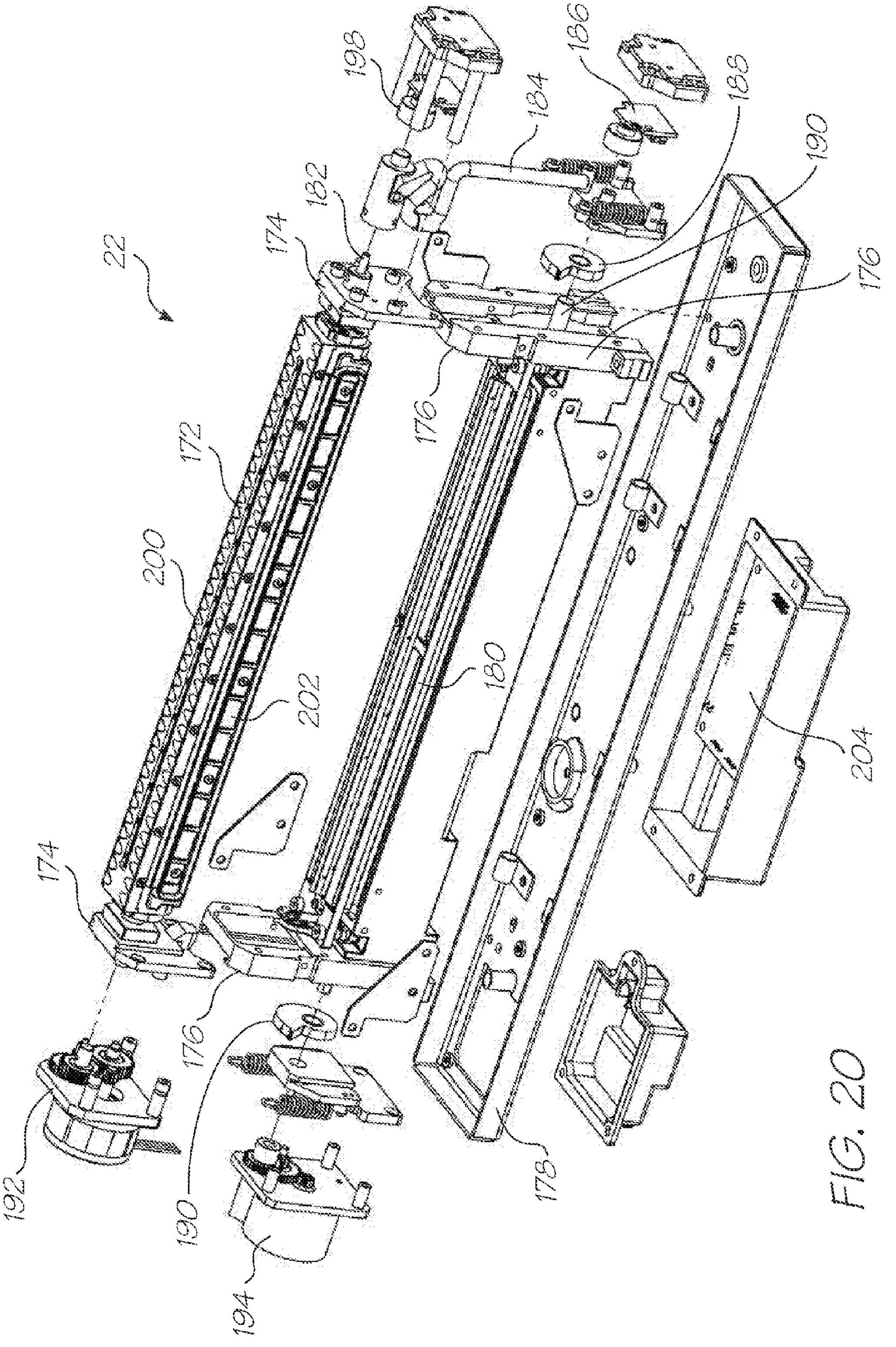
FIG. 20 is an exploded perspective of the service module of FIGS. 17 and 18.

FIG. 19 is a schematic section view of an alternative carousel 172. Instead of a wiper roller, the carousel 172 wipes the printhead ICs 160 a series of soft polymer blades 206. The operation of the vacuum platen 200 is also illustrated. Air is drawn from the central cavity 208 in the carousel core 210. This generates an air flow from the printing gap 216, down a series of central bores 212 into the central cavity 208. Make-up air bores 214 connect the central cavity 208 to an intermediate point along the central bore 212. Make-up air passages 218 into the central cavity 208 provide make-air that is entrained into the flow from the printing gap 216. Keep wet drops and aerosols are also entrained into the air flow to the central cavity 208.

Multiple Mode Printhead Servicing

Figure 21:
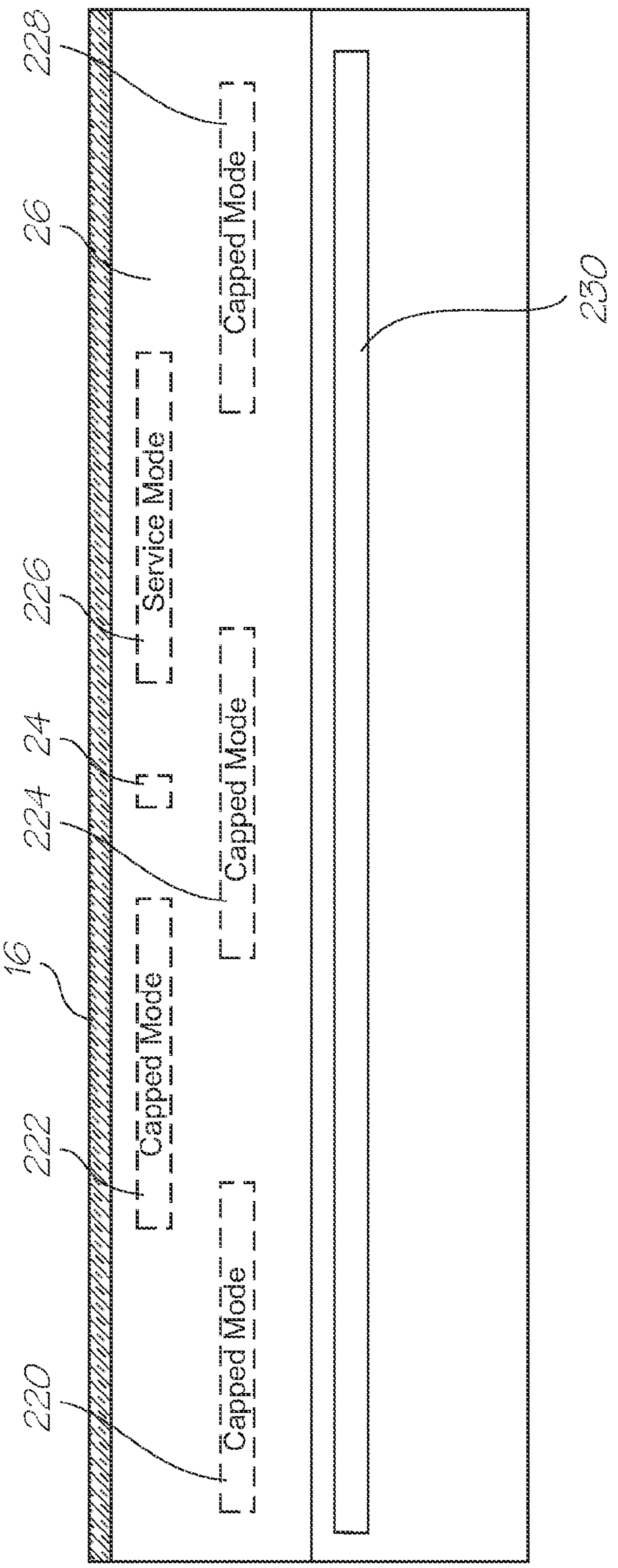
FIG. 21 is a diagram of the service modules in the vacuum platen.
Figure 22:
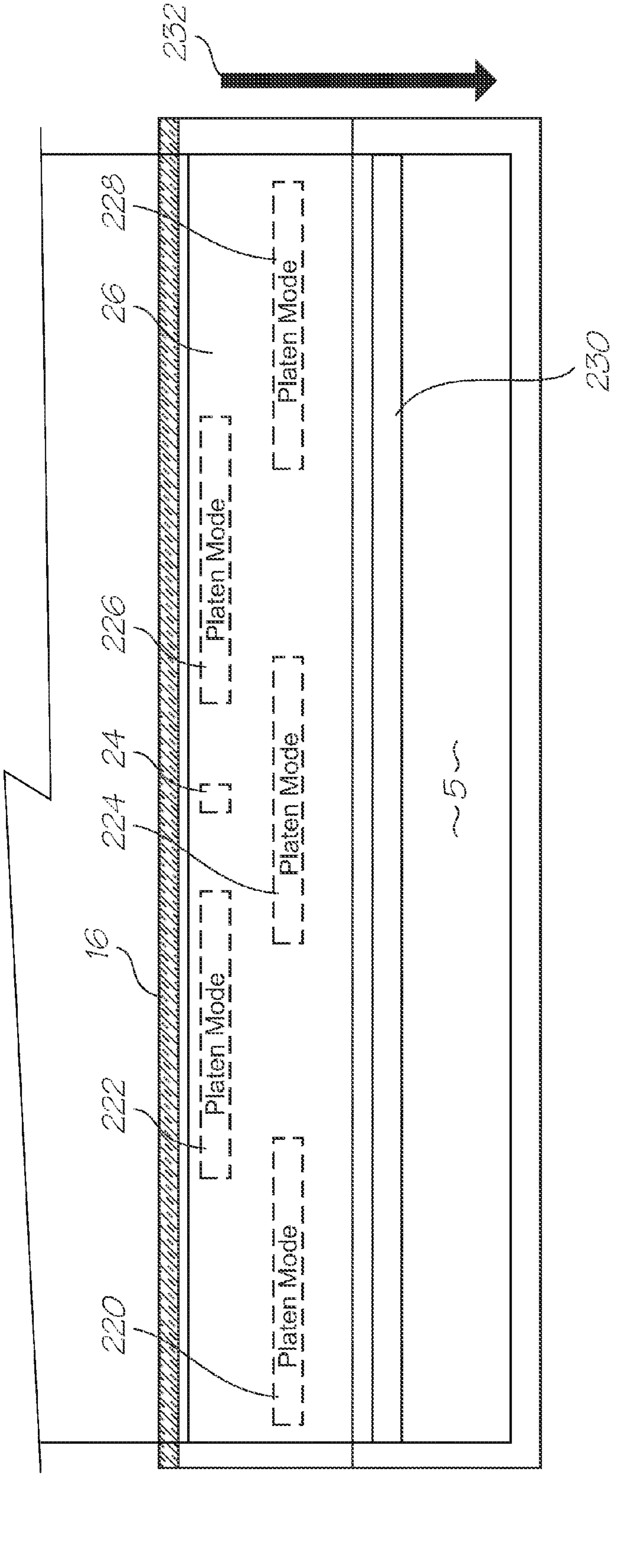
FIG. 22 is a diagram of the fixed vacuum platen covered with a full width media sheet.
Figure 23:
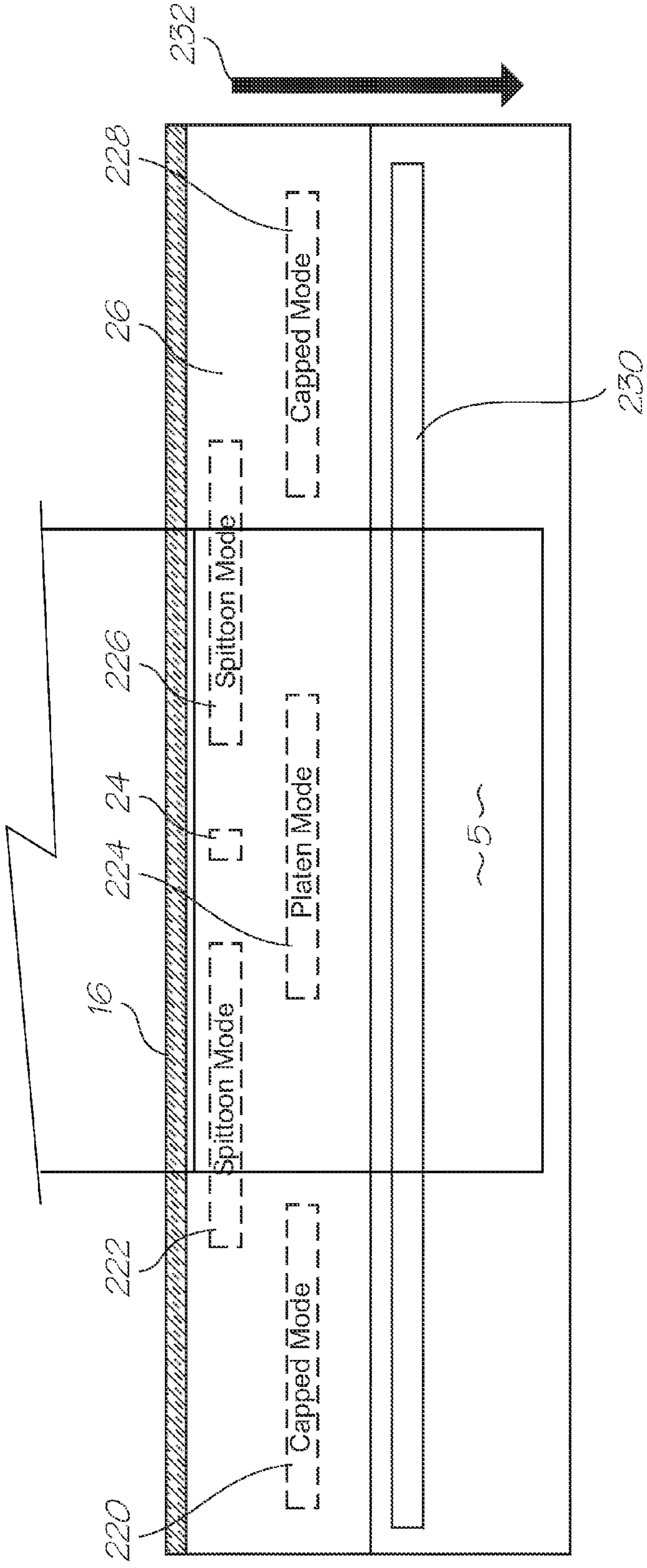
FIG. 23 is a diagram of the fixed vacuum platen when printing media less than the maximum print width.

FIGS. 21 to 23 schematically illustrate the multiple-mode servicing of the printhead assembly. FIG. 21 shows the location of the five service modules 220-228 in the fixed vacuum platen 26 relative to the media encoder wheel 24, the input drive roller 16 and the upper aerosol collection zone 230. When no media is present in the paper path the service modules can be in a capping mode (service modules 220, 222, 224 and 228) or one of the servicing modes (service module 226). The servicing modes are a wiping mode or a spittoon mode. With most of the printhead modules capped, the upper aerosol collection system 34 (see FIG. 4) is deactivated. The supervising driver PCB (see FIG. 39) operates the service modules 220-228 individually to provide a greater variety of service protocols for the pagewidth printhead assembly.

FIG. 22 shows the printer printing a media sheet 5 that covers the maximum width of the media path 54. When completely covered, the service modules 220-228 are in vacuum platen mode (see FIG. 19). In this mode, the service modules 220-228 function as vacuum platens in cooperation with the fixed vacuum platen 26 of the print zone 14. Above the media sheet 5, the upper aerosol collection system 34 draws ink aerosol away.

FIG. 23 shows the printer printing a media sheet 5 that does not cover the maximum width of the media path 54. The media sheet 5 does not completely cover the service modules 222 and 226 and hence they operate in spittoon mode. The printhead modules 44 and 48 (see FIG. 3) have nozzle arrays that are partially ejecting ink in accordance with the print data, and the remainder of the nozzle arrays are printing keep wet drops to prevent these uncapped, non-printing nozzles from drying out. Service module 224 is completely covered by the media sheet 5 and hence operates in the vacuum platen mode. In both the vacuum platen mode and the spittoon mode, air is drawn into the central bores 212 of the vacuum platen 200 as shown in FIG. 19. The printing operation and the generate aerosols which are removed by the upper aerosol removal system 34 and the airflow into the vacuum platen 200 during spittoon mode. This provides a lower aerosol removal system to complement the operation of the upper aerosol removal system 34.

Vacuum Belt Assembly

Figure 24:
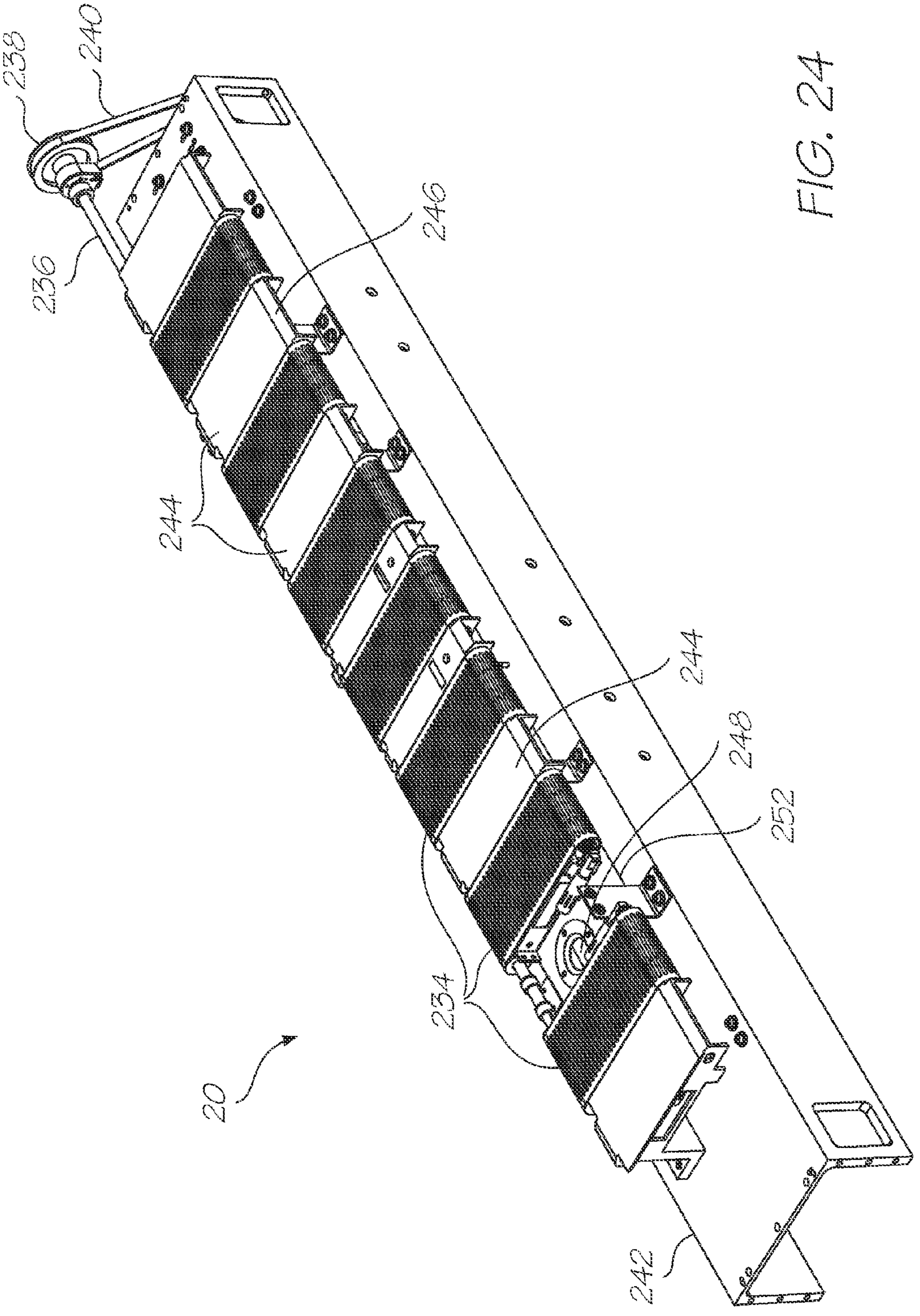
FIG. 24 is a perspective of the vacuum belt assembly.
Figure 25:
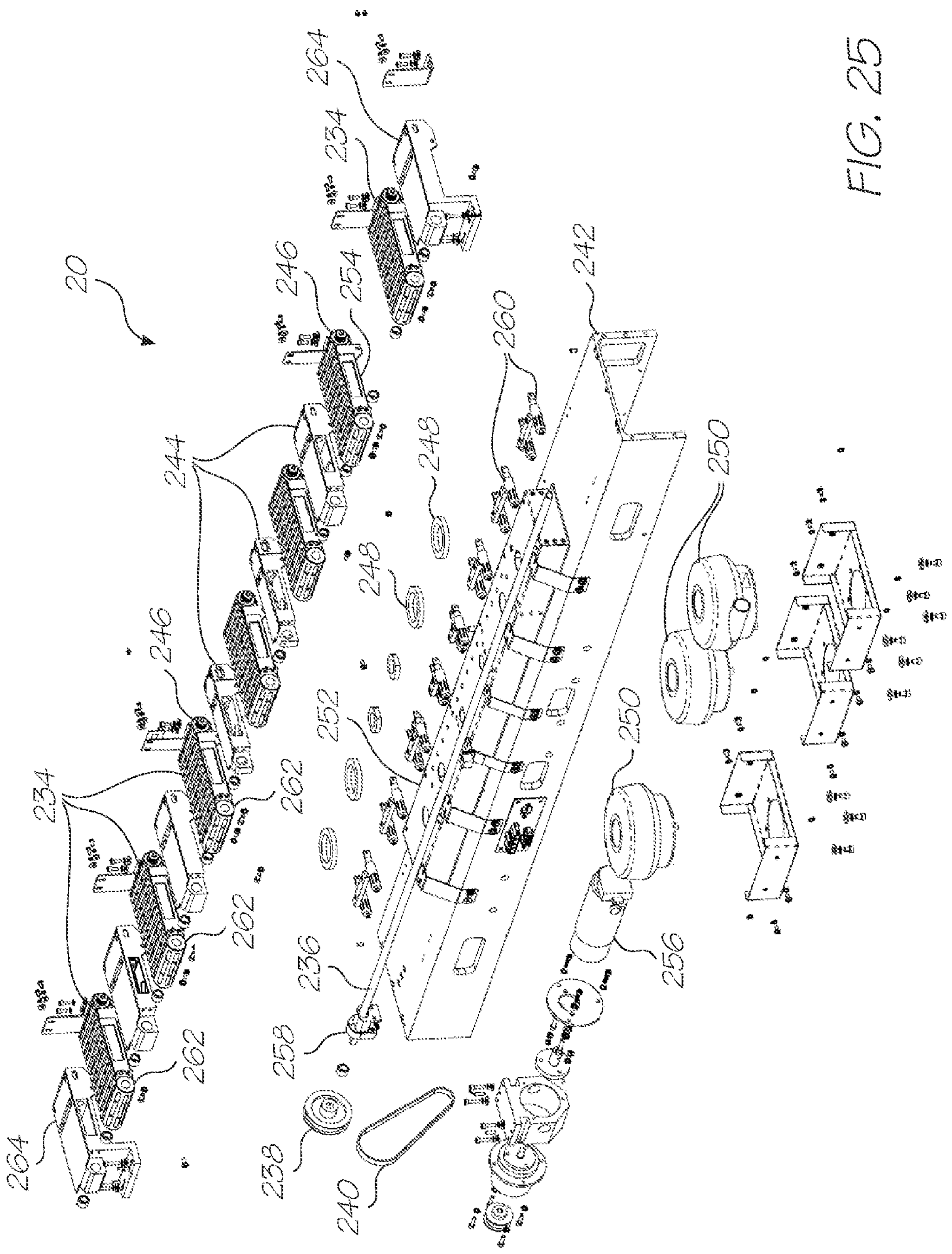
FIG. 25 is an exploded perspective of the vacuum belt assembly.

FIGS. 24 and 25 show the vacuum belt assembly 20. The C-channel chassis 242 supports seven apertured vacuum belts 234. Motor 256 drives pulley 238 via belt 240. Pulley 238 drives the vacuum belt drive shaft 236 which in turn drives the drive rollers 262 for each of the vacuum belts 234. Vacuum belt encoder wheel 258 is mounted to the drive shaft 236 to provide encoder pulses to the supervising driver PCB (see FIG. 39) for generating a nozzle firing clock once the trailing edge of the media sheet has disengaged from the vacuum platen encoder wheel 24 (see FIG. 3).

Opposite the drive rollers 262 are respective idler rollers 246. Each idler roller 246 is biased away from the drive roller 262 by a spring loaded belt tensioner 260 to maintain correct belt tension. Between the drive roller 262 and the idler roller 246 of each vacuum belt 234 is a vacuum belt cavity piece 254 that opens to each side, and to the top section of the apertured belt. Between each vacuum belt cavity piece 254 is a plenum section 244 which opens to each side and the bottom (apart from the two end plenum sections 264 whose outer sides and bottom are closed). At the bottom opening of plenum sections 244 is a plenum chamber intake 248 for the plenum chamber 252.

Three vacuum blowers 250 are mounted under the C-channel chassis 242. Openings (not shown) in the top on the C-channel 242 allow the vacuum blowers 250 to draw a vacuum in the plenum chamber 252. The low pressure in the plenum chamber 252 reduces the air pressure in the plenum sections 244 as well as the vacuum belt cavity pieces 254. Air is drawn through the top section of each vacuum belt 234. When covered by the media sheet, the pressure difference between the interior cavity pieces and atmosphere apply a normal force to the sheet. The vacuum drawn in the plenum chamber is set such that the media sheet can slip relative to the vacuum belts 234 while the media sheet 5 is in the nip of the input drive roller 16 (see FIG. 2).

When the trailing edge of the media disengages the input roller, the feed speed matches the vacuum belt speed. At this stage, the nozzle firing pulses are timed using the vacuum drive shaft encoder wheel 258. This avoids artifacts in the print at the trailing section of the media sheet.

Ink Delivery System

Figure 26:
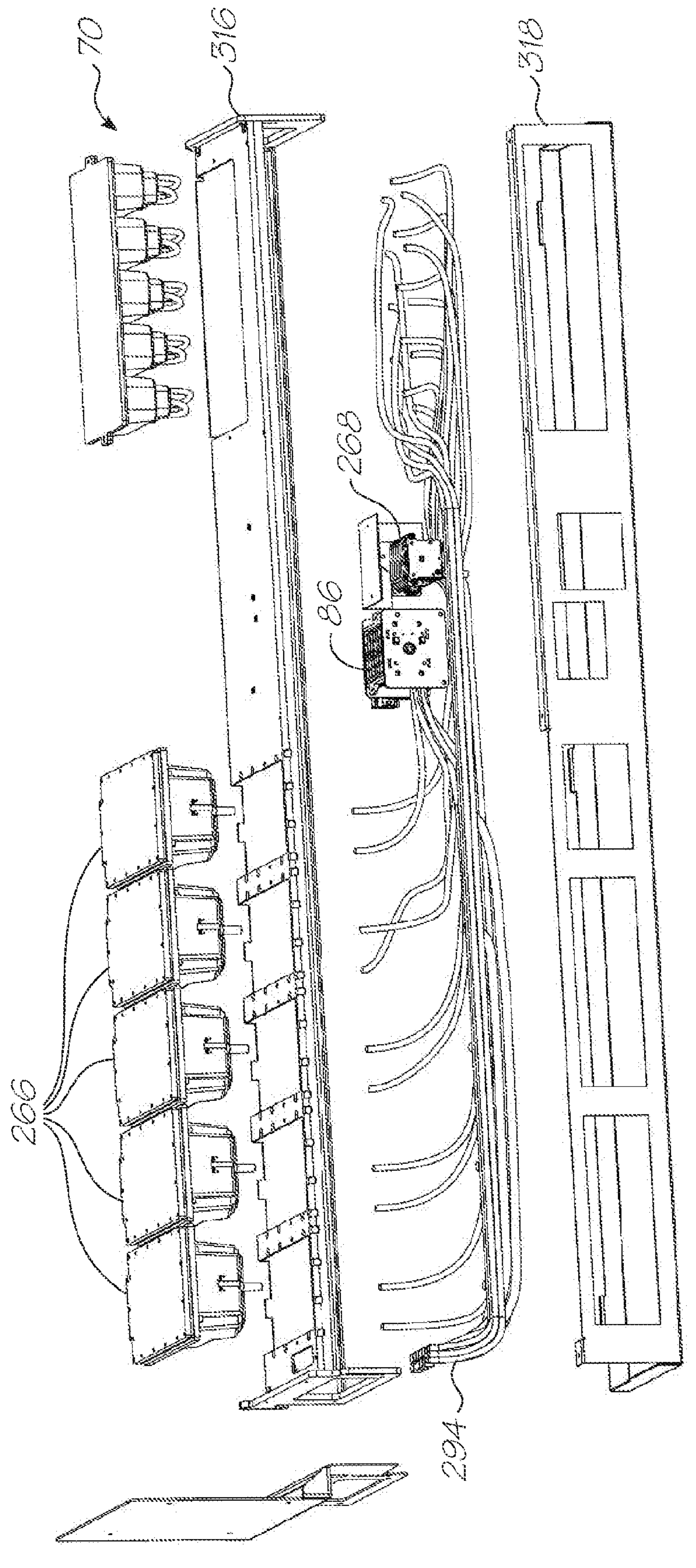
FIG. 26 is an exploded, partial perspective of the ink distribution system.
Figure 27:
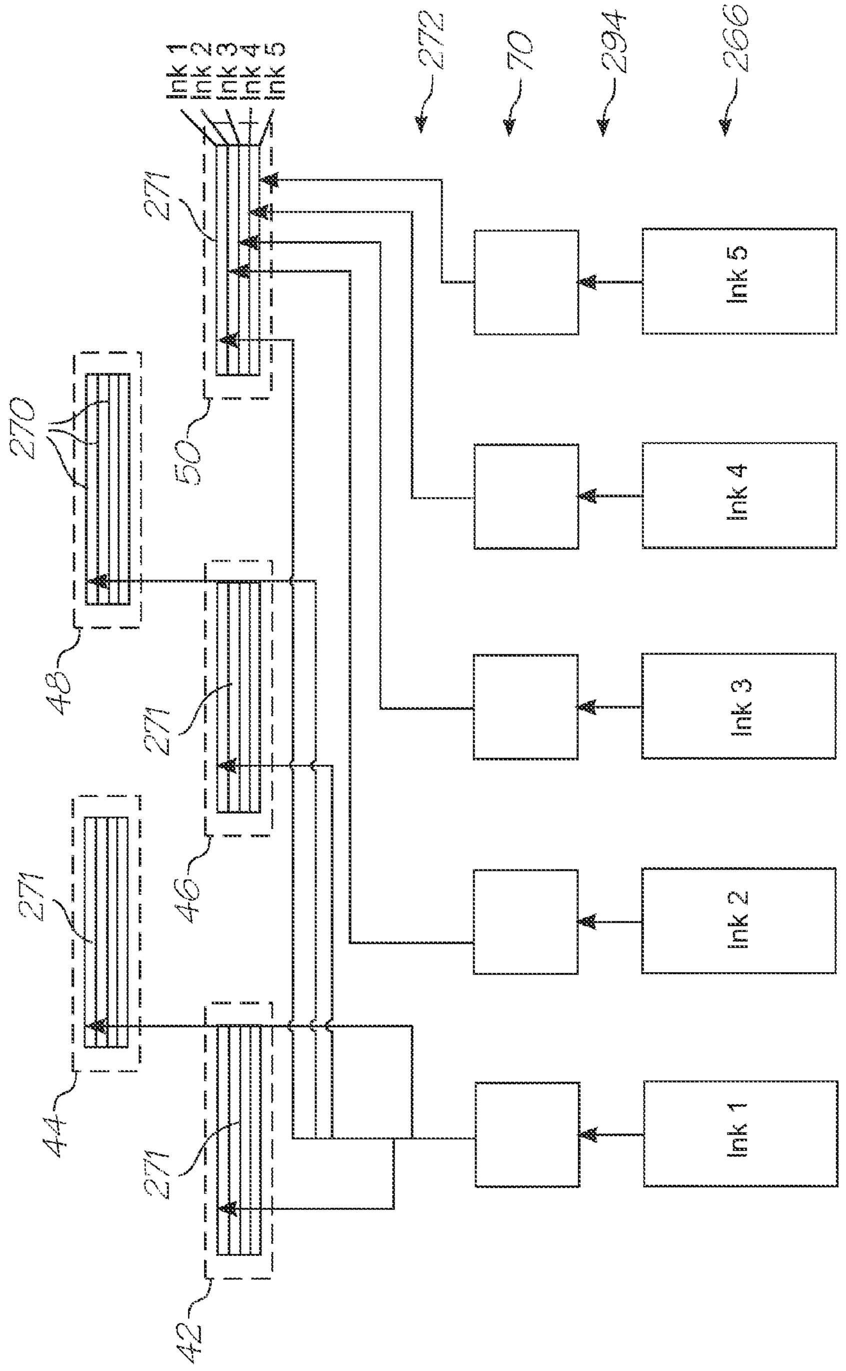
FIG. 27 is a diagram of some of the ink supply circuit.

FIG. 26 is a rear partial-perspective of components from the ink distribution system. The large ink reservoirs 266 are gravity fed by bottles 60 (see FIG. 7). In turn, the accumulator reservoirs 70 are gravity fed by respective ink reservoirs 266. Each accumulator reservoir 70 feeds all printhead modules 42-50 (see FIG. 2) with a single channel of ink. As shown in FIG. 27, the printhead modules arrange the nozzles 271 in columnar groups 270. Each of the parallel columnar nozzle groups 270 correspond to one of the ink containers respectively and one of the accumulator reservoirs 70 respectively. A return line (described later) returns to the accumulator 70 via peristaltic pump 268. Each of the printhead modules 42-50 have a bypass line between the feed line and the return line via a respective pinch valve assembly 86 (described in more detail below). FIG. 27 depicts a small part of the fluid circuit to the printhead modules with valve, sensor and pump omitted. It will be appreciated that the ink delivery system is sophisticated and versatile but requires a systematic tube routing arrangement for ease of maintenance, testing and production.

The structural cross member 316 extends between the left and right side plates 96, 98 (see FIG. 8) of the lower paper path assembly 78. The ink reservoirs 266 are mounted at a higher elevation than the accumulator reservoirs 70, which hang beneath the cross member 316 for gravity feed via the tubes 294. The tubing cover 318 forms a cavity with the cross member 316 to retain the tubing. The accumulator reservoirs 70 are also mounted such that they are at a lower elevation relative to the nozzles 271. In the system described, the ink level in the accumulator reservoirs 70 is maintained about 65 mm to 85 mm below the nozzles 271. This generates a negative hydrostatic pressure in the ink at the nozzles 271 so that an ink meniscus does not bulge outwards which would be prone to leakage through wicking contact with paper dust or similar.

The sequential priming, de-priming and bubble purges of the printhead modules will now be described with reference to the diagrams shown in FIGS. 28 to 33. These diagrams relate to a single ink channel (i.e. color) and show only printhead module 42.

The accumulator reservoir 70 has a float valve 284 that maintains the fluid level 280 within a small range. The float actuator 286 for the float valve 284 is configured to maintain the fluid level 280 about 65 mm to 85 mm below the nozzle elevation 292.

An inclined filter 288 in the accumulator reservoir 70 covers the outlet 320 to the feed line 272. The feed line 272 has a feed branch line 302 to the printhead module 42. Other feed branch lines 314 extend to the remaining printhead modules 44 to 50 (not shown). A feed line valve 298 is in the feed branch line 302 for selectively closing fluid communication between the printhead 42 and the feed line 272.

A return line 274 leads from the return branch lines 304, 414 from the printheads to a peristaltic pump 268 used to prime and de-prime the printheads and to remove bubbles from the system. The feed line 272 also leads to a bypass line 276 which connects the feed line to the return line via a bypass valve 278.

The pump 268 is between two sets of check valves 324 and 326, each with an outflow pump filter 306. This ensures that particulate contaminants from spalling in the pump 268 do not reach the printheads regardless of which direction the pump operating while also allowing the pump to force ink flow through only one filter at any time. Safety pressure relief valves 308 ensure that the check valves 324 and 326 are not compromised. The return line 274 joins the accumulator reservoir at a return line inlet 322 which is positioned about 45 mm to 55 mm above the ink level 280. This allows the pump 268 to generate a hydrostatic pressure difference between the feed line 272 and the return line 274 when the bypass valve 278 is closed.

The return line 274 has a manual three-way valve 310 that can direct flow to a sump instead of the pump 268. This allows manual rectification of ink cross contamination. Similarly, the accumulator feed tube 294 also has a manual three-way valve 312 to divert flow to a sump in the event of gross color cross contamination.

The head space in the accumulator reservoir 70 is vented to atmosphere through valve 290. This valve incorporates a filter to keep airborne particulates from the ink in the accumulator reservoir 70.

Figure 30:
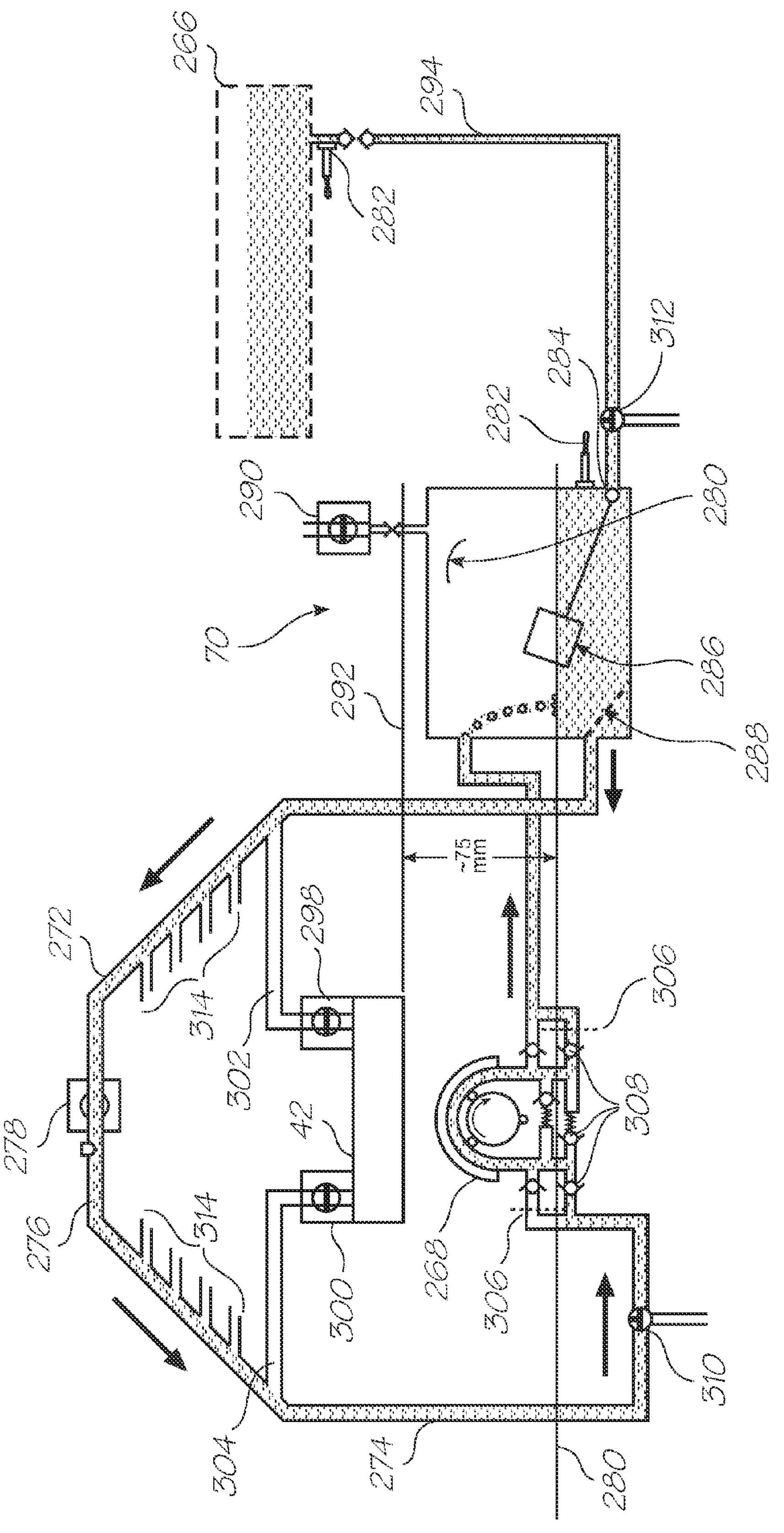

Initially, the bypass valve 278 is open, the feed line valves 298 and the return line valves 300 for each printhead are closed and the pump 268 primes the feed line 272, the bypass line 276 (see FIG. 29) and the return line 274 including the filters 306, the check valve sets 324 and 326, and the pump 268 itself (see FIG. 30). The printheads 42 to 50 are then primed sequentially.

Figure 31:
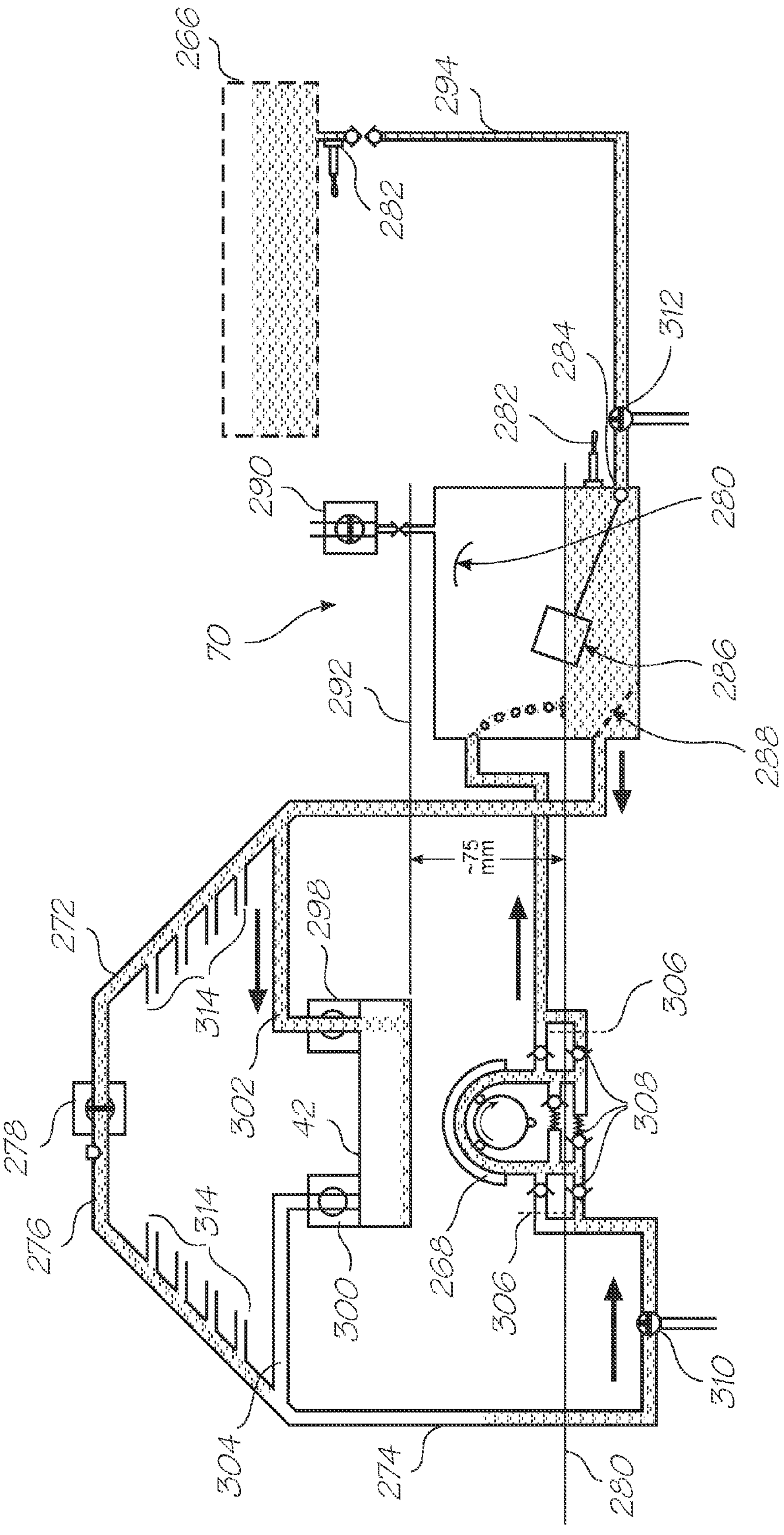
Figure 32:
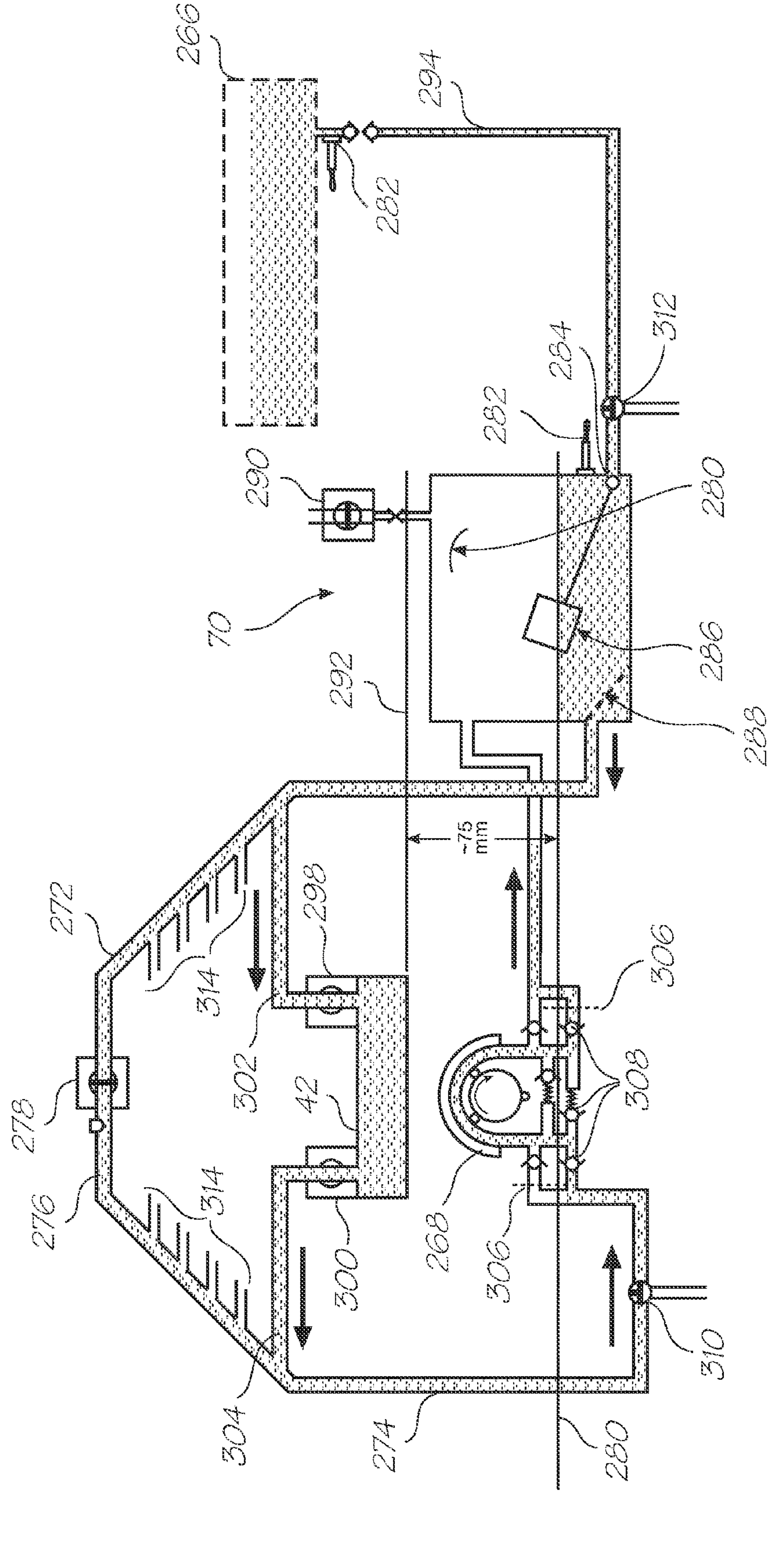

Referring to FIG. 31, the bypass valve 278 is closed and the feed line valve 298 and the return line valve 300 for printhead 42 are opened. The pump 268 pumps forwards (pump rotates clockwise as shown in the figures) and ink is drawn through the feed branch line 302 into the printhead 42. A slug of displaced air is drawn into the return line 274. As shown in FIG. 32, the pump 268 continues until the air is purged from the return line 274. The feed line valve 298 and the return line valve 300 are closed again and the process is repeated for the next printhead to be primed.

Figure 28:
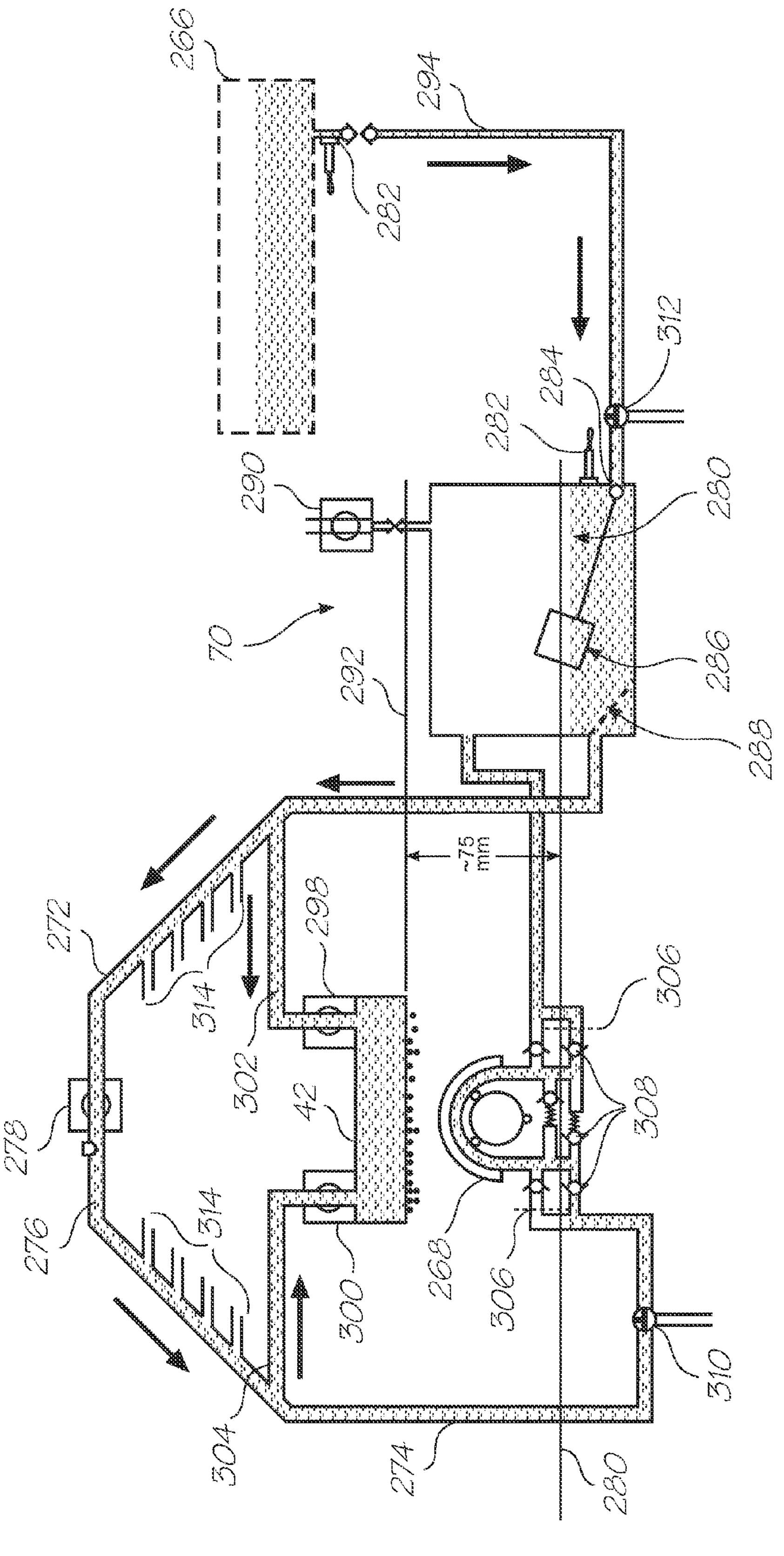
FIGS. 28 to 33 are schematic representations of the priming and depriming protocols.
Figure 29:
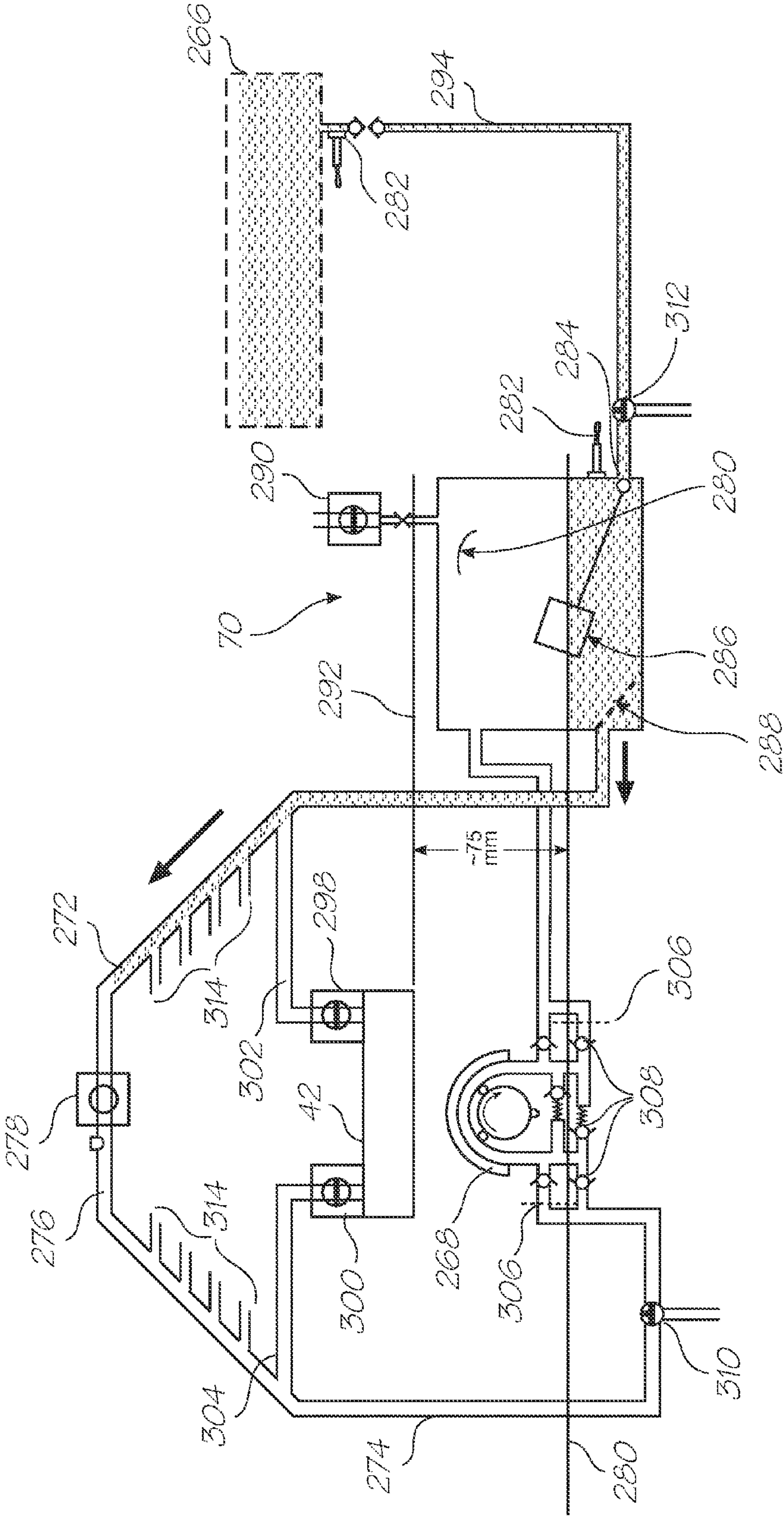

Once all the printheads have been primed, the pump 268 does not operate during printing. FIG. 28 shows fluid flows during a print job. Ink supply to the printheads 42-50 is generated by capillary pressure to refill the nozzles. The capillary action drives the ink refill flowrate by the negative hydrostatic pressure generated by the elevation difference with the accumulator ink level 280 acts to reduce this. In light of this, setting the elevation difference in a workable range that avoids cross contamination at the nozzles but doesn't hinder refill flow rate, is the most practical solution.

Figure 33:
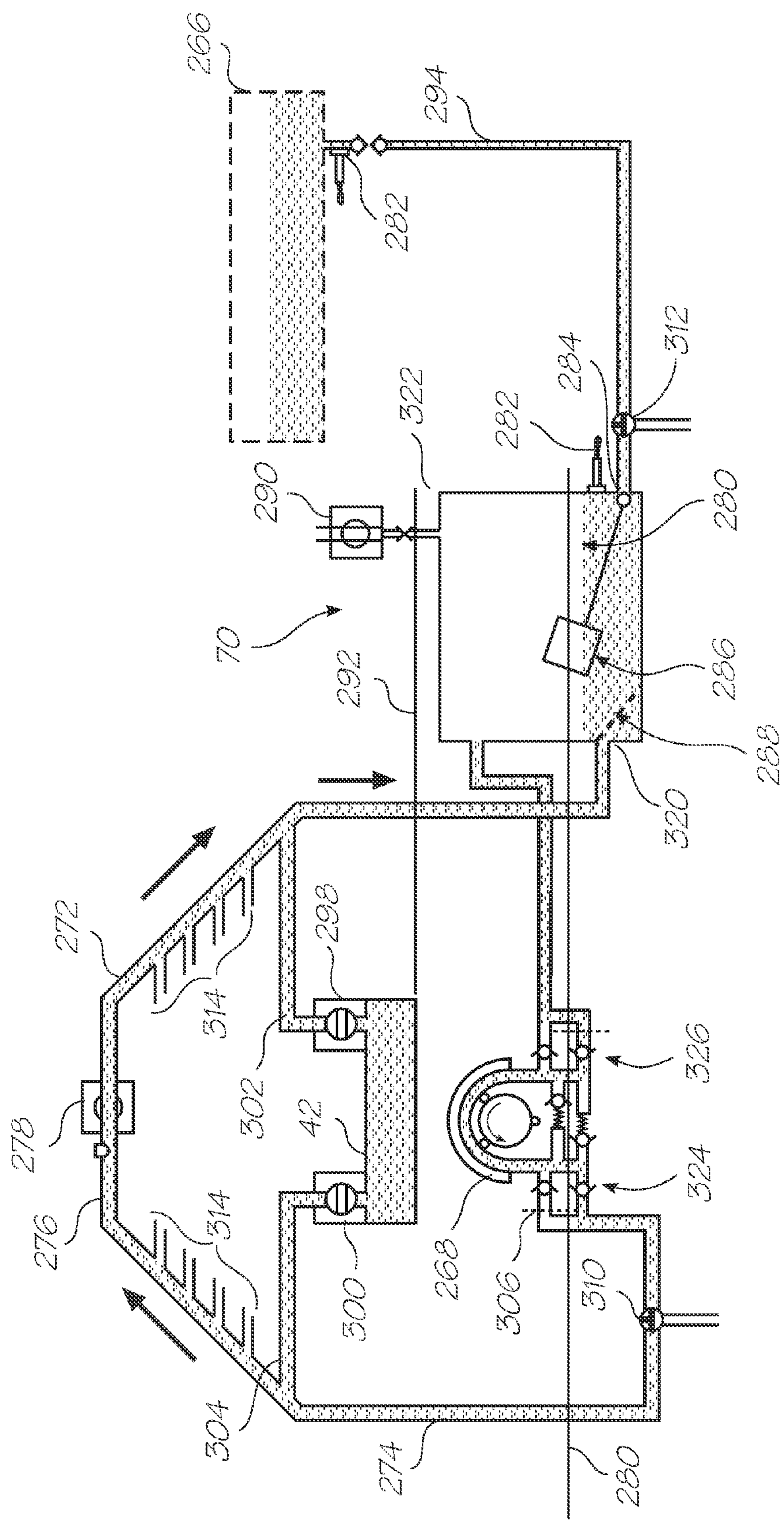

FIG. 33 shows the de-prime protocol. The bypass valve 278 is opened and the feed line valves 298 and the return line valves 300 for all the printheads 42-50 are closed. The pump 268 is run in reverse and air is drawn through the return line 274, the bypass line 276 and the feed line 272. Next it is a simple matter to open the feed line valve 298 and the return line valve 300 for the faulty printhead, close the bypass valve 278 and run the pump 268 in reverse some more to deprime the printhead. Once replaced, the priming protocol is run for each of the printheads 42-50 to ensure stray bubbles in the branch lines are purged.

Pinch Valves

Figure 34:
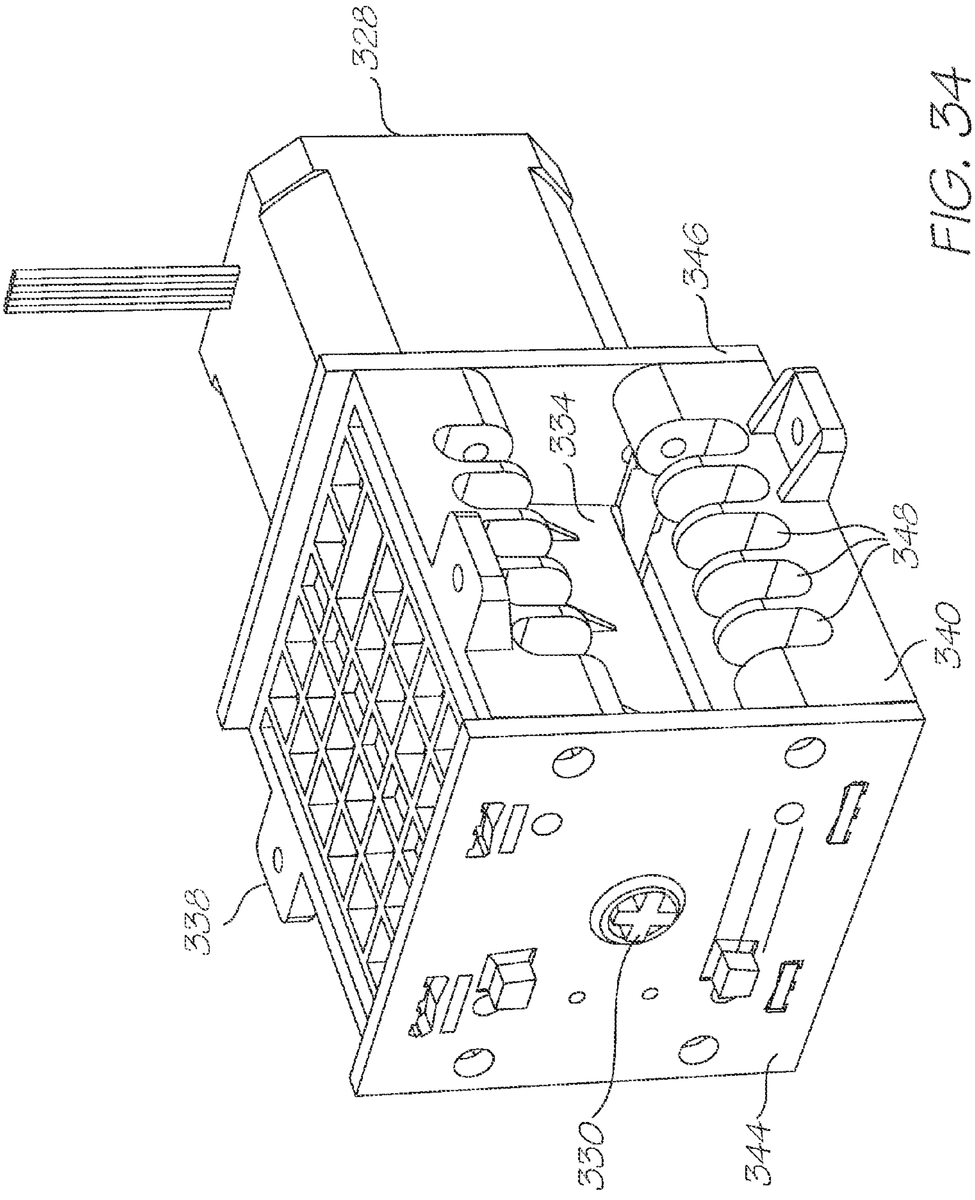
FIG. 34 is a perspective of a pinch valve assembly.
Figure 35:
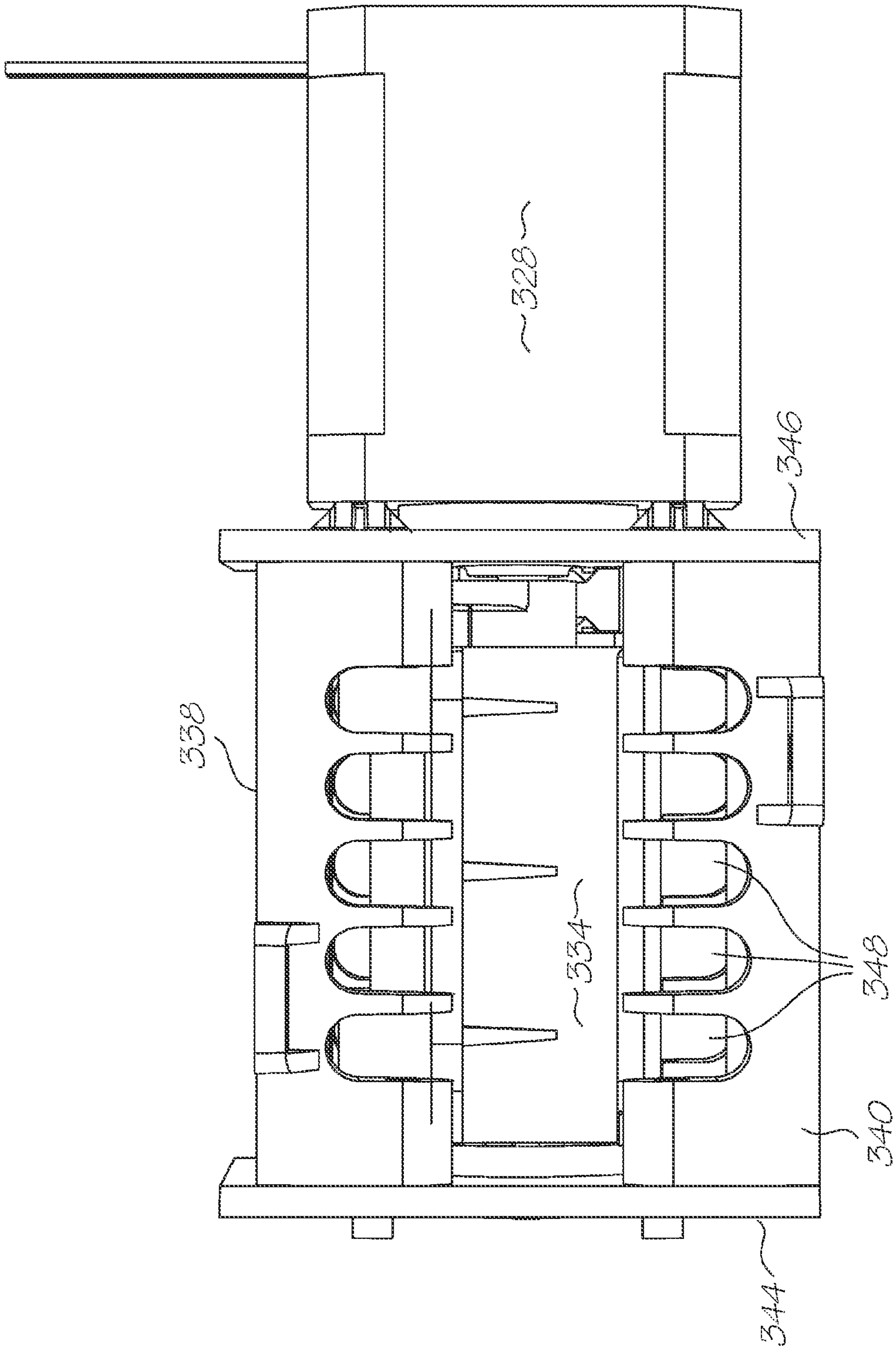
FIG. 35 is a front elevation of the pinch valve assembly.
Figure 36:
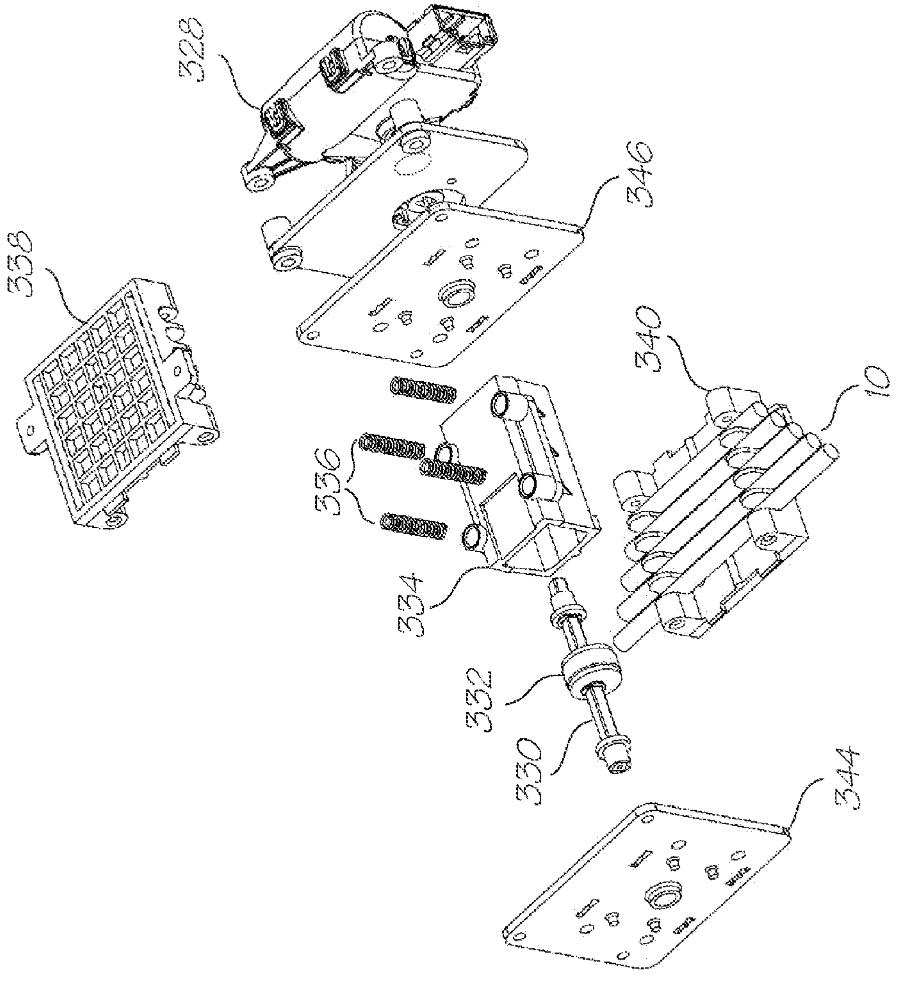
FIG. 36 is an exploded perspective of the pinch valve assembly.

FIGS. 34 to 36 show one of the pinch valve assemblies 86 of the type used widely throughout the ink distribution system. The DC motor 328 drives the cam shaft 330 mounted between the end cap 344 and the side plate 346. The cam shaft 330 extends through the spring plate 334 such that the cam 332 engages the bottom of the spring plate 334 when rotated. The valve base 340 defines five tube openings 348 for the tubes 10.

When the cam 332 engages the spring plate 334 at its minimum radius, the tubes 10 are not compressed or negligibly compressed, and the pinch valve is open. When the cam rotates such that it engages the bottom of the spring plate 334 with it maximum radius, the spring plate presses down on the tubes 10 (with the assistance of the springs 336 compressed against the cover 338) to pinch the tubes shut.

The pinch valves are not the most reliable of valves and a small amount of leakage is not uncommon. However, the pinch valve assemblies 86 have a particularly basic design which reduces their unit cost. This is of great benefit to the wide format printer described herein which uses a multitude of valves throughout the ink distribution system. Furthermore, a completely leak free valve seal is not necessary for the various ink flow control operations. A flow constriction will suffice for raising the upstream pressure in order prime (or de-prime) particular areas of the printer. Hence the shortcomings of the simple and inexpensive pinch valve assemblies 86 are irrelevant to the wide format printer 1 (see FIG. 1) described here.

Accumulator Reservoirs

Figure 37:
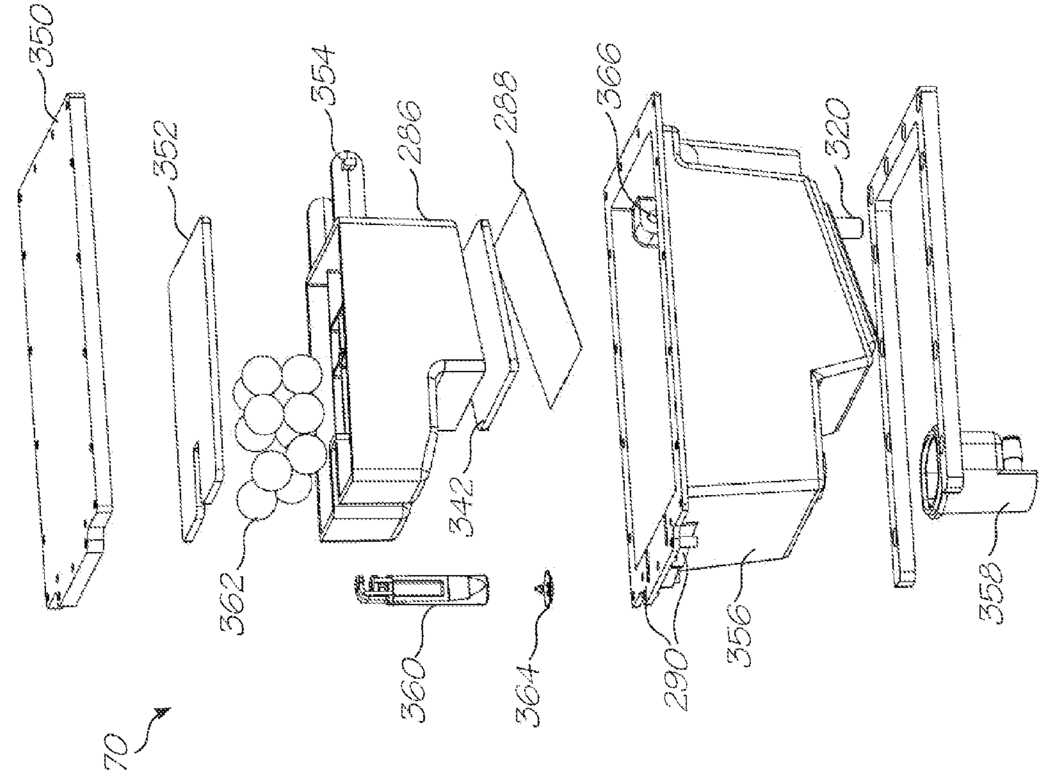
FIG. 37 is an exploded perspective of an accumulator reservoir.
Figure 38:
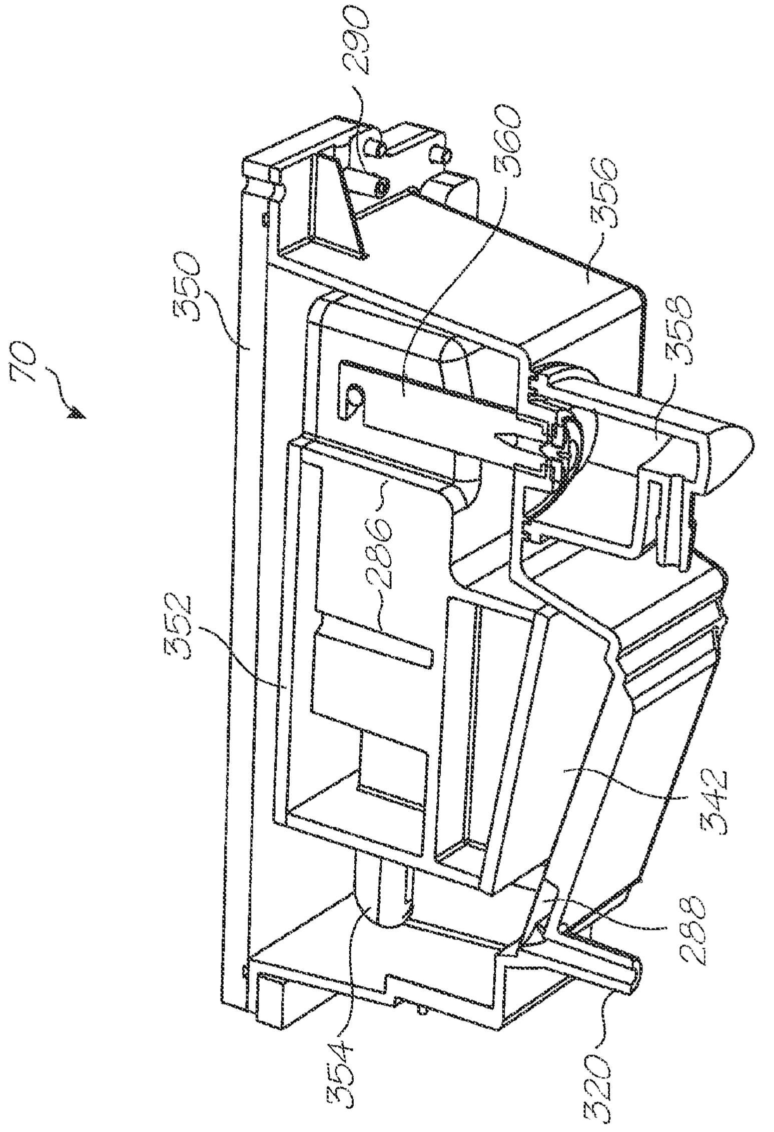
FIG. 38 is a sectioned perspective of an accumulator reservoir.

The accumulator reservoirs 70 are also inexpensive relative to the complexity of their operation. FIGS. 37 and 38 show the separate components of an accumulator reservoir 70. The tank 356 holds the float 286 and the float valve 360. Glass beads 362 may be added to increase the weight/decrease the buoyancy of the float 286. The float is sealed shut with a lid 352 and a floor 342. A pair of lever arms 354 engage a corresponding pair of hinge points 366 within the tank 356 so that the float 286 can angularly displace within the tank 356.

The tank lid 350 seals to open top of the tank 356, but the interior is still vented to atmosphere by the vent valves 290. The inlet manifold 358 seals to the bottom of the tank 356. The outlet is a simple tube 320 which is covered by a one micron filter 288. The valve rod 360 hooks onto the float 286 proximate its free end. At the bottom of the valve rod 360 is an umbrella check valve 364 that seals against an opening in the bottom of the tank 356.

When the ink level in the tank 356 drops, the float 286 lowers and the weight of the ballast marbles 362 force the valve rod 360 to unseal the umbrella valve 364 from the opening. This allows the ink in the inlet manifold 358, under pressure from the ink gravity feed, to flow through the opening into the tank 356. This raises the ink level and hence the float 286 so that the valve rod 360 again lifts the umbrella valve 364 to seal shut the opening in the tank 356.

Control Electronics

Figure 39:
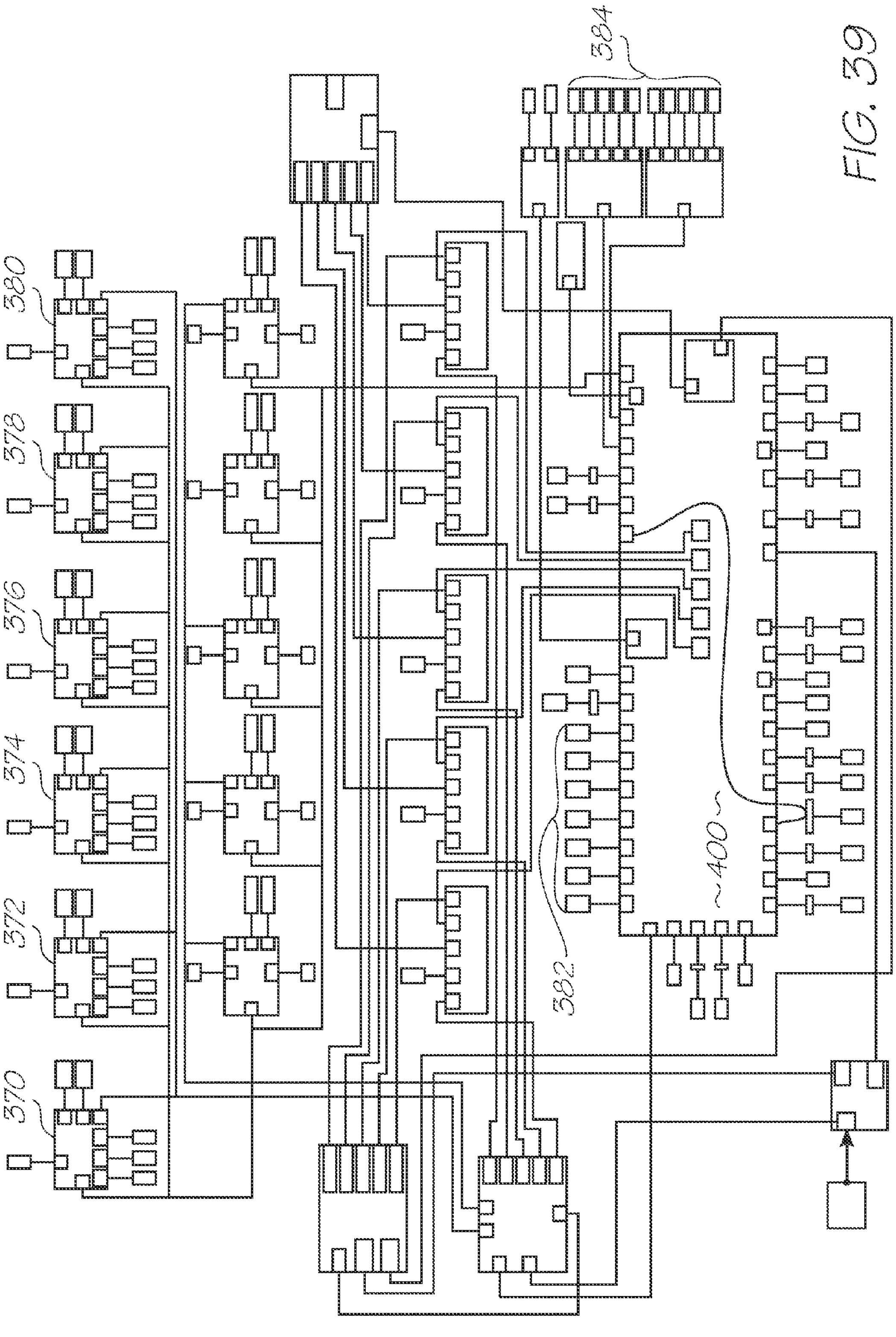
FIG. 39 is a cable diagram of the control electronics for the print engine.

FIG. 39 is a cable diagram of the electrical control systems. All the electrical, electronic and micro-electronic components are directly or indirectly under the control of the supervisor driver PCB 400. Different sub-assemblies may have their components operated by their own PCBs such as the ink distribution pumping sub-system PCB 370, or even the printhead module PCBs 372-380, but this operation is coordinated through the over-riding control of the supervising driver PCB 400.

Other electrically actuated components such as the pinch valve assemblies 384 and the vacuum blowers 382 are directly controlled by the supervising driver PCB 400.

The invention claimed is:

1. A printing system comprising:

a fixed printhead assembly for printing media fed along a media path, the printhead assembly having a plurality of printheads positioned to span the media path;

a fixed vacuum platen positioned opposite the printhead assembly, the fixed vacuum platen having a plurality of apertures defined therein corresponding to the plurality of printheads;

a plurality of service modules for the printhead assembly, each of the service modules being disposed in one of the apertures respectively for servicing one of the printheads respectively, each service module comprising a rotatable carousel and a plurality of different service stations mounted about the carousel;

a plurality of rotation mechanisms corresponding to the plurality of service modules, each rotation mechanism being configured for rotating a respective carousel, relative to the fixed vacuum platen so as to present a selected one of the plurality of different service stations to a respective printhead; and a plurality of lift mechanisms corresponding to the plurality of service modules, each lift mechanism being configured for slidably lifting a respective carousel towards a respective printhead, wherein at least one service station extends proud of the fixed vacuum platen in a lifted position and retracts within a respective aperture in a retracted position.

2. The printing system according to claim 1 wherein one of the service stations is a vacuum platen module corresponding to a platen mode.

3. The printing system according to claim 1 wherein one of the service stations is a capper corresponding a capping mode.

4. The printing system according to claim 1 further comprising:

a drive roller configured to engage and push media into a print zone; and, a movable media engagement assembly configured to engage one side of the media and pull the media while the drive roller remains engaged with the media.

5. The printing system according to claim 4 wherein the movable media engagement assembly has an apertured surface that has a media engagement side and low pressure region at a side opposite the media engagement side.

6. The printing system according to claim 5 wherein the movable media engagement assembly has a vacuum belt configured to receive the media from the print zone.

7. The printing system according to claim 6 wherein during use a leading edge of the media traverses from the drive roller to the vacuum belt during the first time period.

8. The printing system according to claim 7 wherein the drive roller is configured to control a media translation speed until the media disengages from the drive roller.

9. The printing system according to claim 8 wherein the vacuum belt is configured to control the media transport speed subsequent to disengagement of the media from the drive roller.

10. The printing system according to claim 1 further comprising a media encoder positioned in the fixed vacuum platen and configured to produce timing signals for operating the printhead assembly.

11. The printing system according to claim 1 wherein one of the service stations is a wiper corresponding to a wiping mode.

* * * * *